US008619781B2

(12) United States Patent
Patel et al.

(10) Patent No.: US 8,619,781 B2
(45) Date of Patent: *Dec. 31, 2013

(54) BACKPLANE INTERFACE ADAPTER WITH ERROR CONTROL AND REDUNDANT FABRIC

(75) Inventors: Ronak Patel, Santa Clara, CA (US); Ming G. Wong, San Jose, CA (US); Yu-Mei Lin, San Jose, CA (US); Andrew Chang, Los Altos, CA (US); Yuen Fai Wong, San Jose, CA (US)

(73) Assignee: Foundry Networks, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/083,481

(22) Filed: Apr. 8, 2011

(65) Prior Publication Data

US 2011/0268108 A1    Nov. 3, 2011

Related U.S. Application Data

(63) Continuation of application No. 12/400,594, filed on Mar. 9, 2009, now Pat. No. 7,995,580, which is a continuation of application No. 09/988,066, filed on Nov. 16, 2001, now Pat. No. 7,596,139, which is a continuation-in-part of application No. 09/855,038, filed on May 15, 2001, now Pat. No. 7,236,490.

(60) Provisional application No. 60/249,871, filed on Nov. 17, 2000.

(51) Int. Cl.
*H04L 12/28* (2006.01)

(52) U.S. Cl.
USPC .......................... 370/392; 370/229; 370/412

(58) Field of Classification Search
USPC ................ 370/230–232, 235–236, 358–360, 370/362–367, 380, 386–389, 392, 396, 370/401–402, 419–422, 428–429, 463, 503, 370/507, 514
See application file for complete search history.

(56) References Cited

U.S. PATENT DOCUMENTS

| 3,866,175 A | 2/1975 | Seifert, Jr. et al. |
| 4,628,480 A | 12/1986 | Floyd |
| 4,667,323 A | 5/1987 | Engdahl et al. |

(Continued)

FOREIGN PATENT DOCUMENTS

| EP | 1380127 A2 | 1/2004 |
| JP | 2003/289359 A | 10/2003 |

(Continued)

OTHER PUBLICATIONS

U.S. Appl. No. 12/639,762, filed Dec. 16, 2009, Singh.

(Continued)

*Primary Examiner* — Kevin Mew
(74) *Attorney, Agent, or Firm* — Fountainhead Law Group, PC

(57) ABSTRACT

A backplane interface adapter with error control and redundant fabric for a high-performance network switch. The error control may be provided by an administrative module that includes a level monitor, a stripe synchronization error detector, a flow controller, and a control character presence tracker. The redundant fabric transceiver of the backplane interface adapter improves the adapter's ability to properly and consistently receive narrow input cells carrying packets of data and output wide striped cells to a switching fabric.

23 Claims, 50 Drawing Sheets

(56) References Cited

U.S. PATENT DOCUMENTS

| | | | |
|---|---|---|---|
| 4,679,190 A * | 7/1987 | Dias et al. .................... 370/355 |
| 4,683,564 A | 7/1987 | Young et al. |
| 4,698,748 A | 10/1987 | Juzswik et al. |
| 4,723,243 A | 2/1988 | Joshi et al. |
| 4,754,482 A | 6/1988 | Weiss |
| 4,791,629 A | 12/1988 | Burns et al. |
| 4,794,629 A | 12/1988 | Pastyr et al. |
| 4,807,280 A | 2/1989 | Posner et al. |
| 4,876,681 A | 10/1989 | Hagiwara et al. |
| 4,896,277 A | 1/1990 | Vercellotti et al. |
| 4,985,889 A | 1/1991 | Frankish et al. |
| 5,101,404 A | 3/1992 | Kunimoto et al. |
| 5,136,584 A | 8/1992 | Hedlund |
| 5,195,181 A | 3/1993 | Bryant et al. |
| 5,208,856 A | 5/1993 | Leduc et al. |
| 5,224,108 A | 6/1993 | McDysan et al. |
| 5,231,633 A | 7/1993 | Hluchyj et al. |
| 5,280,582 A | 1/1994 | Yang et al. |
| 5,282,196 A | 1/1994 | Clebowicz |
| 5,287,477 A | 2/1994 | Johnson et al. |
| 5,301,192 A | 4/1994 | Henrion |
| 5,307,345 A | 4/1994 | Lozowick et al. |
| 5,323,386 A | 6/1994 | Wiher et al. |
| 5,365,512 A | 11/1994 | Combs et al. |
| 5,377,189 A * | 12/1994 | Clark ........................... 370/462 |
| 5,390,173 A | 2/1995 | Spinney et al. |
| 5,392,279 A | 2/1995 | Taniguchi |
| 5,406,643 A | 4/1995 | Burke et al. |
| 5,408,469 A | 4/1995 | Opher et al. |
| 5,430,442 A | 7/1995 | Kaiser et al. |
| 5,436,893 A | 7/1995 | Barnett |
| 5,461,615 A | 10/1995 | Henrion |
| 5,490,258 A | 2/1996 | Fenner |
| 5,506,840 A | 4/1996 | Pauwels et al. |
| 5,521,923 A | 5/1996 | Willmann et al. |
| 5,539,733 A | 7/1996 | Anderson et al. |
| 5,546,385 A | 8/1996 | Caspi et al. |
| 5,550,816 A | 8/1996 | Hardwick et al. |
| 5,563,948 A | 10/1996 | Diehl et al. |
| 5,566,170 A | 10/1996 | Bakke et al. |
| 5,598,410 A | 1/1997 | Stone |
| 5,600,795 A | 2/1997 | Du |
| 5,619,497 A | 4/1997 | Gallagher et al. |
| 5,640,504 A | 6/1997 | Johnson, Jr. |
| 5,646,878 A | 7/1997 | Samra |
| 5,663,952 A | 9/1997 | Gentry, Jr. |
| 5,663,959 A | 9/1997 | Nakagawa |
| 5,666,353 A | 9/1997 | Klausmeier et al. |
| 5,721,819 A | 2/1998 | Galles et al. |
| 5,732,080 A | 3/1998 | Ferguson et al. |
| 5,740,176 A | 4/1998 | Gupta et al. |
| 5,745,708 A | 4/1998 | Weppler et al. |
| 5,751,710 A | 5/1998 | Crowther et al. |
| 5,802,287 A | 9/1998 | Rostoker et al. |
| 5,815,146 A | 9/1998 | Youden et al. |
| 5,818,816 A * | 10/1998 | Chikazawa et al. ........... 370/225 |
| 5,835,496 A | 11/1998 | Yeung et al. |
| 5,838,684 A | 11/1998 | Wicki et al. |
| 5,862,350 A | 1/1999 | Coulson |
| 5,867,675 A | 2/1999 | Lomelino et al. |
| 5,870,538 A | 2/1999 | Manning et al. |
| 5,872,769 A | 2/1999 | Caldara et al. |
| 5,872,783 A | 2/1999 | Chin |
| 5,875,200 A | 2/1999 | Glover et al. |
| 5,907,566 A | 5/1999 | Benson et al. |
| 5,907,660 A | 5/1999 | Inoue et al. |
| 5,909,686 A | 6/1999 | Muller et al. |
| 5,915,094 A | 6/1999 | Kouloheris et al. |
| 5,920,566 A | 7/1999 | Hendel et al. |
| 5,920,886 A | 7/1999 | Feldmeier |
| 5,936,939 A | 8/1999 | Des Jardins et al. |
| 5,936,966 A | 8/1999 | Ogawa et al. |
| 5,956,347 A | 9/1999 | Slater |
| 5,999,528 A | 12/1999 | Chow et al. |
| 6,000,016 A | 12/1999 | Curtis et al. |
| 6,016,310 A | 1/2000 | Muller et al. |
| 6,023,471 A | 2/2000 | Haddock et al. |
| 6,035,414 A | 3/2000 | Okazawa et al. |
| 6,038,288 A | 3/2000 | Thomas et al. |
| 6,067,298 A | 5/2000 | Shinohara |
| 6,067,606 A | 5/2000 | Holscher et al. |
| 6,076,115 A | 6/2000 | Sambamurthy et al. |
| 6,081,522 A | 6/2000 | Hendel et al. |
| 6,088,356 A | 7/2000 | Hendel et al. |
| 6,094,434 A | 7/2000 | Kotzur et al. |
| 6,104,696 A | 8/2000 | Kadambi et al. |
| 6,104,700 A | 8/2000 | Haddock et al. |
| 6,108,306 A | 8/2000 | Kalkunte et al. |
| 6,118,787 A | 9/2000 | Kalkunte et al. |
| 6,125,417 A | 9/2000 | Bailis et al. |
| 6,128,666 A | 10/2000 | Muller et al. |
| 6,144,668 A | 11/2000 | Bass et al. |
| 6,147,996 A | 11/2000 | Laor et al. |
| 6,151,301 A | 11/2000 | Holden |
| 6,151,497 A | 11/2000 | Yee et al. |
| 6,154,446 A | 11/2000 | Kadambi et al. |
| 6,157,643 A | 12/2000 | Ma |
| 6,160,809 A | 12/2000 | Adiletta et al. |
| 6,172,990 B1 | 1/2001 | Deb et al. |
| 6,178,520 B1 | 1/2001 | DeKoning et al. |
| 6,181,699 B1 | 1/2001 | Crinion et al. |
| 6,185,222 B1 | 2/2001 | Hughes |
| 6,195,335 B1 | 2/2001 | Calvignac et al. |
| 6,201,492 B1 | 3/2001 | Amar et al. |
| 6,222,845 B1 | 4/2001 | Shue et al. |
| 6,243,667 B1 | 6/2001 | Kerr et al. |
| 6,249,528 B1 | 6/2001 | Kothary |
| 6,263,374 B1 | 7/2001 | Olnowich et al. |
| 6,272,144 B1 | 8/2001 | Berenbaum et al. |
| 6,304,903 B1 | 10/2001 | Ward |
| 6,320,859 B1 | 11/2001 | Momirov |
| 6,333,929 B1 | 12/2001 | Drottar et al. |
| 6,335,932 B2 | 1/2002 | Kadambi et al. |
| 6,335,935 B2 | 1/2002 | Kadambi et al. |
| 6,343,072 B1 | 1/2002 | Bechtolsheim et al. |
| 6,351,143 B1 | 2/2002 | Guccione et al. |
| 6,356,550 B1 | 3/2002 | Williams |
| 6,356,942 B1 | 3/2002 | Bengtsson et al. |
| 6,363,077 B1 | 3/2002 | Wong et al. |
| 6,366,557 B1 | 4/2002 | Hunter |
| 6,369,855 B1 | 4/2002 | Chauvel et al. |
| 6,370,579 B1 | 4/2002 | Partridge |
| 6,421,352 B1 | 7/2002 | Manaka et al. |
| 6,424,658 B1 | 7/2002 | Mathur |
| 6,424,659 B2 | 7/2002 | Viswanadham et al. |
| 6,427,185 B1 | 7/2002 | Ryals et al. |
| 6,430,190 B1 | 8/2002 | Essbaum et al. |
| 6,457,175 B1 | 9/2002 | Lerche |
| 6,460,088 B1 | 10/2002 | Merchant |
| 6,463,063 B1 * | 10/2002 | Bianchini et al. ........ 370/395.53 |
| 6,466,608 B1 | 10/2002 | Hong et al. |
| 6,470,436 B1 | 10/2002 | Croft et al. |
| 6,473,433 B1 * | 10/2002 | Bianchini et al. ............. 370/412 |
| 6,477,174 B1 | 11/2002 | Dooley et al. |
| 6,480,477 B1 | 11/2002 | Treadaway et al. |
| 6,490,280 B1 | 12/2002 | Leung |
| 6,493,347 B2 | 12/2002 | Sindhu et al. |
| 6,496,502 B1 | 12/2002 | Fite et al. |
| 6,505,281 B1 | 1/2003 | Sherry |
| 6,510,138 B1 | 1/2003 | Pannell |
| 6,522,656 B1 | 2/2003 | Gridley |
| 6,532,229 B1 | 3/2003 | Johnson et al. |
| 6,532,234 B1 | 3/2003 | Yoshikawa et al. |
| 6,535,504 B1 | 3/2003 | Johnson et al. |
| 6,549,519 B1 | 4/2003 | Michels et al. |
| 6,553,370 B1 | 4/2003 | Andreev et al. |
| 6,556,208 B1 | 4/2003 | Congdon et al. |
| 6,567,404 B1 | 5/2003 | Wilford |
| 6,577,631 B1 | 6/2003 | Keenan et al. |
| 6,587,432 B1 * | 7/2003 | Putzolu et al. ................ 370/229 |
| 6,591,302 B2 | 7/2003 | Boucher et al. |
| 6,601,186 B1 | 7/2003 | Fox et al. |
| 6,606,300 B1 | 8/2003 | Blanc et al. |
| 6,628,650 B1 | 9/2003 | Saite et al. |

(56) References Cited

U.S. PATENT DOCUMENTS

| | | | |
|---|---|---|---|
| 6,629,099 B2 | 9/2003 | Cheng | |
| 6,636,483 B1 | 10/2003 | Pannell | |
| 6,643,269 B1 | 11/2003 | Fan et al. | |
| 6,654,342 B1 * | 11/2003 | Dittia et al. | 370/229 |
| 6,654,346 B1 | 11/2003 | Mahalingaiah et al. | |
| 6,654,370 B1 | 11/2003 | Quirke et al. | |
| 6,654,373 B1 | 11/2003 | Maher, III et al. | |
| 6,654,862 B2 | 11/2003 | Morris | |
| 6,658,002 B1 | 12/2003 | Ross et al. | |
| 6,661,791 B1 | 12/2003 | Brown | |
| 6,671,275 B1 | 12/2003 | Wong et al. | |
| 6,678,248 B1 | 1/2004 | Haddock et al. | |
| 6,681,332 B1 | 1/2004 | Byrne et al. | |
| 6,683,872 B1 | 1/2004 | Saito | |
| 6,687,217 B1 | 2/2004 | Chow et al. | |
| 6,687,247 B1 | 2/2004 | Wilford et al. | |
| 6,690,757 B1 | 2/2004 | Bunton et al. | |
| 6,691,202 B2 | 2/2004 | Vasquez et al. | |
| 6,696,917 B1 | 2/2004 | Heitner et al. | |
| 6,697,359 B1 | 2/2004 | George | |
| 6,697,368 B2 | 2/2004 | Chang et al. | |
| 6,700,894 B1 | 3/2004 | Shung | |
| 6,708,000 B1 | 3/2004 | Nishi et al. | |
| 6,721,229 B1 | 4/2004 | Cole | |
| 6,721,268 B1 | 4/2004 | Ohira et al. | |
| 6,721,313 B1 | 4/2004 | Van Duyne | |
| 6,721,338 B1 | 4/2004 | Sato | |
| 6,731,875 B1 | 5/2004 | Kartalopoulos | |
| 6,735,218 B2 | 5/2004 | Chang et al. | |
| 6,745,277 B1 | 6/2004 | Lee et al. | |
| 6,751,224 B1 | 6/2004 | Parruck et al. | |
| 6,754,881 B2 | 6/2004 | Kuhlmann et al. | |
| 6,765,866 B1 | 7/2004 | Wyatt | |
| 6,775,706 B1 | 8/2004 | Fukumoto et al. | |
| 6,778,546 B1 | 8/2004 | Epps et al. | |
| 6,781,990 B1 | 8/2004 | Puri et al. | |
| 6,792,484 B1 | 9/2004 | Hook | |
| 6,792,502 B1 | 9/2004 | Pandya et al. | |
| 6,798,740 B1 | 9/2004 | Senevirathne et al. | |
| 6,798,933 B2 | 9/2004 | Steinberg | |
| 6,804,220 B2 | 10/2004 | Odenwalder et al. | |
| 6,804,731 B1 | 10/2004 | Chang et al. | |
| 6,804,815 B1 | 10/2004 | Kerr et al. | |
| 6,807,179 B1 | 10/2004 | Kanuri et al. | |
| 6,807,363 B1 | 10/2004 | Abiko et al. | |
| 6,810,046 B2 | 10/2004 | Abbas et al. | |
| 6,813,243 B1 | 11/2004 | Epps et al. | |
| 6,813,266 B1 | 11/2004 | Chiang et al. | |
| 6,816,467 B1 | 11/2004 | Muller et al. | |
| 6,829,682 B2 | 12/2004 | Kirihata et al. | |
| 6,831,923 B1 | 12/2004 | Laor et al. | |
| 6,831,932 B1 | 12/2004 | Boyle et al. | |
| 6,836,808 B2 | 12/2004 | Bunce et al. | |
| 6,839,346 B1 | 1/2005 | Kametani | |
| 6,842,422 B1 | 1/2005 | Bianchini | |
| 6,854,117 B1 | 2/2005 | Roberts | |
| 6,859,438 B2 | 2/2005 | Haddock et al. | |
| 6,865,153 B1 | 3/2005 | Hill et al. | |
| 6,873,630 B1 | 3/2005 | Muller et al. | |
| 6,901,072 B1 | 5/2005 | Wong | |
| 6,912,637 B1 | 6/2005 | Herbst | |
| 6,920,154 B1 | 7/2005 | Achler | |
| 6,925,516 B2 | 8/2005 | Struhsaker et al. | |
| 6,934,305 B1 | 8/2005 | Duschatko et al. | |
| 6,937,606 B2 | 8/2005 | Basso et al. | |
| 6,946,948 B2 | 9/2005 | McCormack et al. | |
| 6,952,419 B1 * | 10/2005 | Cassiday et al. | 370/392 |
| 6,957,258 B2 | 10/2005 | Maher, III et al. | |
| 6,959,007 B1 | 10/2005 | Vogel et al. | |
| 6,961,340 B2 | 11/2005 | Karlsson et al. | |
| 6,961,347 B1 | 11/2005 | Bunton et al. | |
| 6,965,615 B1 | 11/2005 | Kerr et al. | |
| 6,973,092 B1 | 12/2005 | Zhou et al. | |
| 6,978,309 B1 * | 12/2005 | Dorbolo | 709/231 |
| 6,980,552 B1 | 12/2005 | Belz et al. | |
| 6,982,974 B1 | 1/2006 | Saleh et al. | |
| 6,990,102 B1 | 1/2006 | Kaniz et al. | |
| 6,993,032 B1 | 1/2006 | Dammann et al. | |
| 7,005,812 B2 | 2/2006 | Mitchell | |
| 7,009,968 B2 | 3/2006 | Ambe et al. | |
| 7,012,919 B1 | 3/2006 | So et al. | |
| 7,050,430 B2 | 5/2006 | Kalkunte et al. | |
| 7,080,238 B2 | 7/2006 | Van Hoof et al. | |
| 7,082,133 B1 | 7/2006 | Lor et al. | |
| 7,103,041 B1 | 9/2006 | Speiser et al. | |
| 7,106,692 B1 * | 9/2006 | Schulz | 370/230 |
| 7,120,744 B2 | 10/2006 | Klein | |
| 7,124,205 B2 | 10/2006 | Craft et al. | |
| 7,126,956 B2 | 10/2006 | Scholten | |
| 7,130,903 B2 | 10/2006 | Masuda et al. | |
| 7,171,487 B2 | 1/2007 | Herkersdorf et al. | |
| 7,176,911 B1 | 2/2007 | Kidono et al. | |
| 7,185,141 B1 | 2/2007 | James et al. | |
| 7,185,266 B2 | 2/2007 | Blightman et al. | |
| 7,187,687 B1 | 3/2007 | Davis et al. | |
| 7,190,696 B1 | 3/2007 | Manur et al. | |
| 7,191,277 B2 | 3/2007 | Broyles | |
| 7,206,283 B2 | 4/2007 | Chang et al. | |
| 7,212,536 B2 | 5/2007 | Mackiewich et al. | |
| 7,218,637 B1 | 5/2007 | Best et al. | |
| 7,219,293 B2 | 5/2007 | Tsai et al. | |
| 7,228,509 B1 | 6/2007 | Dada et al. | |
| 7,236,490 B2 | 6/2007 | Chang et al. | |
| 7,237,058 B2 | 6/2007 | Srinivasan | |
| 7,249,306 B2 | 7/2007 | Chen | |
| 7,266,117 B1 | 9/2007 | Davis | |
| 7,277,425 B1 | 10/2007 | Sikdar | |
| 7,283,547 B1 | 10/2007 | Hook et al. | |
| 7,286,534 B2 | 10/2007 | Kloth | |
| 7,298,752 B2 | 11/2007 | Moriwaki et al. | |
| 7,324,509 B2 | 1/2008 | Ni | |
| 7,355,970 B2 | 4/2008 | Lor | |
| 7,356,030 B2 | 4/2008 | Chang et al. | |
| 7,366,100 B2 | 4/2008 | Anderson et al. | |
| 7,391,769 B2 | 6/2008 | Rajkumar et al. | |
| 7,414,979 B1 | 8/2008 | Jarvis | |
| 7,428,693 B2 | 9/2008 | Obuchi et al. | |
| 7,468,975 B1 | 12/2008 | Davis | |
| 7,512,127 B2 | 3/2009 | Chang et al. | |
| 7,561,590 B1 | 7/2009 | Walsh | |
| 7,596,139 B2 | 9/2009 | Patel et al. | |
| 7,613,991 B1 | 11/2009 | Bain | |
| 7,636,369 B2 | 12/2009 | Wong | |
| 7,649,885 B1 | 1/2010 | Davis et al. | |
| 7,657,703 B1 | 2/2010 | Singh | |
| 7,738,450 B1 | 6/2010 | Davis | |
| 7,817,659 B2 | 10/2010 | Wong | |
| 7,830,884 B2 | 11/2010 | Davis | |
| 7,948,872 B2 | 5/2011 | Patel et al. | |
| 7,978,702 B2 | 7/2011 | Chang et al. | |
| 7,995,580 B2 | 8/2011 | Patel et al. | |
| 8,448,162 B2 | 5/2013 | Ramanathan et al. | |
| 2001/0001879 A1 | 5/2001 | Kubik et al. | |
| 2001/0007560 A1 | 7/2001 | Masuda et al. | |
| 2001/0026551 A1 | 10/2001 | Horlin | |
| 2001/0048785 A1 | 12/2001 | Steinberg | |
| 2001/0053150 A1 | 12/2001 | Clear et al. | |
| 2002/0001307 A1 | 1/2002 | Nguyen et al. | |
| 2002/0012585 A1 | 1/2002 | Kalkunte et al. | |
| 2002/0040417 A1 | 4/2002 | Winograd et al. | |
| 2002/0054594 A1 | 5/2002 | Hoof et al. | |
| 2002/0054595 A1 | 5/2002 | Ambe et al. | |
| 2002/0069294 A1 | 6/2002 | Herkersdorf et al. | |
| 2002/0073073 A1 | 6/2002 | Cheng | |
| 2002/0085499 A1 | 7/2002 | Toyoyama et al. | |
| 2002/0087788 A1 | 7/2002 | Morris | |
| 2002/0089937 A1 | 7/2002 | Venkatachary et al. | |
| 2002/0089977 A1 | 7/2002 | Chang et al. | |
| 2002/0091844 A1 | 7/2002 | Craft et al. | |
| 2002/0091884 A1 | 7/2002 | Chang et al. | |
| 2002/0105966 A1 | 8/2002 | Patel et al. | |
| 2002/0126672 A1 | 9/2002 | Chow et al. | |
| 2002/0131437 A1 | 9/2002 | Tagore-Brage | |
| 2002/0141403 A1 | 10/2002 | Akahane et al. | |

(56) References Cited

U.S. PATENT DOCUMENTS

| | | |
|---|---|---|
| 2002/0146013 A1 | 10/2002 | Karlsson et al. |
| 2002/0161967 A1 | 10/2002 | Kirihata et al. |
| 2002/0181476 A1 | 12/2002 | Badamo et al. |
| 2002/0191605 A1 | 12/2002 | Lunteren et al. |
| 2003/0009466 A1 | 1/2003 | Ta et al. |
| 2003/0033435 A1 | 2/2003 | Hanner |
| 2003/0043800 A1 | 3/2003 | Sonksen et al. |
| 2003/0043848 A1 | 3/2003 | Sonksen |
| 2003/0048785 A1 | 3/2003 | Calvignac et al. |
| 2003/0061459 A1 | 3/2003 | Aboulenein et al. |
| 2003/0074657 A1 | 4/2003 | Bramley, Jr. |
| 2003/0081608 A1 | 5/2003 | Barri et al. |
| 2003/0095548 A1 | 5/2003 | Yamano |
| 2003/0103499 A1 | 6/2003 | Davis et al. |
| 2003/0103500 A1 | 6/2003 | Menon et al. |
| 2003/0108052 A1 | 6/2003 | Inoue et al. |
| 2003/0110180 A1 | 6/2003 | Calvignac et al. |
| 2003/0115403 A1 | 6/2003 | Bouchard et al. |
| 2003/0120861 A1 | 6/2003 | Calle et al. |
| 2003/0128668 A1 | 7/2003 | Yavatkar et al. |
| 2003/0137978 A1 | 7/2003 | Kanetake |
| 2003/0152084 A1 | 8/2003 | Lee et al. |
| 2003/0152096 A1 | 8/2003 | Chapman |
| 2003/0156586 A1 | 8/2003 | Lee et al. |
| 2003/0159086 A1 | 8/2003 | Arndt |
| 2003/0165160 A1 | 9/2003 | Minami et al. |
| 2003/0169470 A1 | 9/2003 | Alagar et al. |
| 2003/0174719 A1 | 9/2003 | Sampath et al. |
| 2003/0177221 A1 | 9/2003 | Ould-Brahim et al. |
| 2003/0198182 A1 | 10/2003 | Pegrum et al. |
| 2003/0214956 A1 | 11/2003 | Navada et al. |
| 2003/0215029 A1 | 11/2003 | Limberg |
| 2003/0223424 A1 | 12/2003 | Anderson et al. |
| 2003/0227943 A1 | 12/2003 | Hallman et al. |
| 2004/0022263 A1 | 2/2004 | Zhao et al. |
| 2004/0028060 A1 | 2/2004 | Kang |
| 2004/0054867 A1 | 3/2004 | Stravers et al. |
| 2004/0062246 A1 | 4/2004 | Boucher et al. |
| 2004/0088469 A1 | 5/2004 | Levy |
| 2004/0128434 A1 | 7/2004 | Khanna et al. |
| 2004/0141504 A1 | 7/2004 | Blanc |
| 2004/0179548 A1 | 9/2004 | Chang et al. |
| 2004/0190547 A1 | 9/2004 | Gordy et al. |
| 2004/0205393 A1 | 10/2004 | Kitamorn et al. |
| 2004/0208177 A1 | 10/2004 | Ogawa |
| 2004/0223502 A1 | 11/2004 | Wybenga et al. |
| 2004/0264380 A1 | 12/2004 | Kalkunte et al. |
| 2005/0010630 A1 | 1/2005 | Doering et al. |
| 2005/0010849 A1 | 1/2005 | Ryle et al. |
| 2005/0041684 A1 | 2/2005 | Reynolds et al. |
| 2005/0089049 A1 | 4/2005 | Chang et al. |
| 2005/0097432 A1 | 5/2005 | Obuchi et al. |
| 2005/0132132 A1 | 6/2005 | Rosenbluth et al. |
| 2005/0138276 A1 | 6/2005 | Navada et al. |
| 2005/0144369 A1 | 6/2005 | Jaspers |
| 2005/0152324 A1 | 7/2005 | Benveniste |
| 2005/0152335 A1 | 7/2005 | Lodha et al. |
| 2005/0175018 A1 | 8/2005 | Wong |
| 2005/0185577 A1 | 8/2005 | Sakamoto et al. |
| 2005/0185652 A1 | 8/2005 | Iwamoto |
| 2005/0193316 A1 | 9/2005 | Chen |
| 2005/0201387 A1 | 9/2005 | Willis |
| 2005/0226236 A1 | 10/2005 | Klink |
| 2005/0246508 A1 | 11/2005 | Shaw |
| 2005/0249124 A1 | 11/2005 | Elie-Dit-Cosaque et al. |
| 2006/0031610 A1 | 2/2006 | Liav et al. |
| 2006/0034452 A1 | 2/2006 | Tonomura et al. |
| 2006/0077891 A1 | 4/2006 | Smith et al. |
| 2006/0092829 A1 | 5/2006 | Brolin et al. |
| 2006/0092929 A1 | 5/2006 | Chun |
| 2006/0114876 A1 | 6/2006 | Kalkunte |
| 2006/0146374 A1 | 7/2006 | Ng et al. |
| 2006/0165089 A1 | 7/2006 | Klink |
| 2006/0209685 A1 | 9/2006 | Rahman et al. |
| 2006/0221841 A1 | 10/2006 | Lee et al. |
| 2006/0268680 A1 | 11/2006 | Roberts et al. |
| 2007/0038798 A1 | 2/2007 | Bouchard et al. |
| 2007/0088974 A1 | 4/2007 | Chandwani et al. |
| 2007/0179909 A1 | 8/2007 | Channasagara |
| 2007/0208876 A1 | 9/2007 | Davis |
| 2007/0253420 A1 | 11/2007 | Chang et al. |
| 2007/0258475 A1 | 11/2007 | Chinn et al. |
| 2007/0288690 A1 | 12/2007 | Wang et al. |
| 2008/0002707 A1 | 1/2008 | Davis |
| 2008/0025309 A1 | 1/2008 | Swallow |
| 2008/0031263 A1 | 2/2008 | Ervin et al. |
| 2008/0037544 A1 | 2/2008 | Yano et al. |
| 2008/0049742 A1 | 2/2008 | Bansal et al. |
| 2008/0069125 A1 | 3/2008 | Reed et al. |
| 2008/0092020 A1 | 4/2008 | Hasenplaugh et al. |
| 2008/0095169 A1 | 4/2008 | Chandra et al. |
| 2008/0181103 A1 | 7/2008 | Davies |
| 2008/0205407 A1 | 8/2008 | Chang et al. |
| 2008/0307288 A1 | 12/2008 | Ziesler et al. |
| 2009/0175178 A1 | 7/2009 | Yoon et al. |
| 2009/0279423 A1 | 11/2009 | Suresh et al. |
| 2009/0279440 A1 | 11/2009 | Wong et al. |
| 2009/0279441 A1 | 11/2009 | Wong et al. |
| 2009/0279541 A1 | 11/2009 | Wong et al. |
| 2009/0279542 A1 | 11/2009 | Wong et al. |
| 2009/0279546 A1 | 11/2009 | Davis |
| 2009/0279548 A1 | 11/2009 | Davis et al. |
| 2009/0279549 A1 | 11/2009 | Ramanathan et al. |
| 2009/0279558 A1 | 11/2009 | Davis et al. |
| 2009/0279559 A1 | 11/2009 | Wong et al. |
| 2009/0282148 A1 | 11/2009 | Wong et al. |
| 2009/0282322 A1 | 11/2009 | Wong et al. |
| 2009/0287952 A1 | 11/2009 | Patel et al. |
| 2009/0290499 A1 | 11/2009 | Patel et al. |
| 2010/0046521 A1 | 2/2010 | Wong |
| 2010/0061393 A1 | 3/2010 | Wong |
| 2010/0100671 A1 | 4/2010 | Singh |
| 2010/0135313 A1 | 6/2010 | Davis |
| 2010/0161894 A1 | 6/2010 | Singh |
| 2010/0246588 A1 | 9/2010 | Davis |
| 2012/0236722 A1* | 9/2012 | Patel et al. .................. 370/235 |
| 2012/0294312 A1 | 11/2012 | Davis et al. |

FOREIGN PATENT DOCUMENTS

| | | |
|---|---|---|
| JP | 2004-537871 A | 12/2004 |
| WO | WO 01/84728 A1 | 11/2001 |
| WO | WO 02/41544 A3 | 5/2007 |

OTHER PUBLICATIONS

U.S. Appl. No. 12/639,749, filed Dec. 16, 2009, Singh.
U.S. Appl. No. 12/624,300, filed Nov. 23, 2009, Davis et al.
U.S. Appl. No. 12/608,985, filed Oct. 29, 2009, Wong.
U.S. Appl. No. 12/608,972, filed Oct. 29, 2009, Wong.
Final Office Action for U.S. Appl. No. 11/831,950, mailed on Jan. 6, 2010, 21 pages.
Non-Final Office Action for U.S. Appl No. 11/953,742, mailed on Nov. 19, 2009, 51 pages.
Non-Final Office Action for U.S. Appl. No. 11/953,743, mailed on Nov. 23, 2009, 47 pages.
Non-Final Office Action for U.S. Appl. No. 11/953,745, mailed on Nov. 24, 2009, 48 pages.
Non-Final Office Action for U.S. Appl. No. 11/953,751, mailed on Nov. 16, 2009, 55 pages.
Requirement for Restriction/Election for U.S. Appl. No. 11/668,322, mailed on Oct. 29, 2009, 6 pages.
Notice of Allowance for U.S. Appl. No. 10/139,912, mailed on Oct. 19, 2009, 17 pages.
Supplemental Notice of Allowance for U.S. Appl. No. 10/139,912, mailed on Nov. 23, 2009, 4 pages.
Final Office Action for U.S. Appl. No. 11/745,008, mailed on Dec. 30, 2009, 27 pages.
Notice of Allowance for U.S. Appl. No. 11/828,246, mailed on Nov. 16, 2009, 20 pages.
Final Office Action for U.S. Appl. No. 11/621,038, mailed on Dec. 23, 2009, 27 pages.

(56) References Cited

OTHER PUBLICATIONS

Non-Final Office Action for U.S. Appl. No. 11/611,067, mailed on Oct. 16, 2009, 35 pages.
Final Office Action for U.S. Appl. No. 11/611,067, mailed on Dec. 8, 2009, 11 pages.
U.S. Appl. No. 10/139,912, filed May 6, 2002, Davis et al.
U.S. Appl. No. 10/140,749, filed May 6, 2002, Davis et al.
U.S. Appl. No. 10/140,751, filed May 6, 2002, Davis.
U.S. Appl. No. 10/140,752, filed May 6, 2002, Davis et al.
U.S. Appl. No. 10/140,753, filed May 6, 2002, Davis et al.
U.S. Appl. No. 10/141,223, filed May 7, 2002, Veerabadran et al.
U.S. Appl. No. 10/810,208, filed Mar. 26, 2004, Wong et al.
U.S. Appl. No. 10/832,086, filed Apr. 26, 2004, Wong.
U.S. Appl. No. 11/118,697, filed Apr. 28, 2005, Singh.
U.S. Appl. No. 11/586,991, filed Oct. 25, 2006, Ramanathan et al.
U.S. Appl. No. 11/646,845, filed Dec. 27, 2006, Ramanathan et al.
U.S. Appl. No. 11/621,038, filed Jan. 8, 2007, Davis.
U.S. Appl. No. 11/724,965.
U.S. Appl. No. 11/779,714, filed Jul. 18, 2007, Wong et al.
U.S. Appl. No. 11/779,778, filed Jul. 18, 2007, Wong et al.
U.S. Appl. No. 11/828,246, filed Jul. 25, 2007, Davis.
U.S. Appl. No. 11/831,950, filed Jul. 31, 2007, Suresh et al.
U.S. Appl. No. 11/953,742, filed Dec. 10, 2007, Wong et al.
U.S. Appl. No. 11/953,743, filed Dec. 10, 2007, Wong et al.
U.S. Appl. No. 11/953,745, filed Dec. 10, 2007, Wong et al.
U.S. Appl. No. 11/953,751, filed Dec. 10, 2007, Wong et al.
U.S. Appl. No. 12/400,594, filed Mar. 9, 2009, Patel et al.
U.S. Appl. No. 12/400,645, filed Mar. 9, 2009, Patel et al.
U.S. Appl. No. 12/417,913, filed: Apr. 3, 2009, Patel et al.
10 Gigabit Ethernet—Technology Overview White Paper, Sep. 2001, 16 pages.
10 Gigabit Ethernet Alliance, Interconnection with Wide Area Networks, Version 1.0, Mar. 2002, 6 pages.
"IEEE Standard for Information technology—Telecommunications and information exchange between systems—Local and metropolitan area network—common specifications. Part 3: Media Access Control (MAC) Bridges," ANSI/IEEE Standard 802.1D, 1998,373, pp. 1998 Edition, IEEE.
Belhadj et al., "Feasibility of a 100GE MAC", PowerPoint Presentation, IEEE Meeting Nov. 2006, Nov. 13-15, 2006, 18 pages.
Braun et al., "Fast incremental CRC updates for IP over ATM networks," IEEE Workshop on High Performance Switching and Routing, 2001, 6 pages.
Degermark, et al., "Small Forwarding Tables for Fast Routing Lookups," ACM Computer Communications Review, Oct. 1997, 12 pages, vol. 27 No. 4.
BigIron Architecture Technical Brief, Oct. 1998, 15 pages, Version 1.0, Foundry Networks.
BigIron Architecture Technical Brief, Oct. 1998, 15 pages, Version 1.02, Foundry Networks.
BigIron Architecture Technical Brief, Dec. 1998, 14 pages, Version 1.03, Foundry Networks,.
BigIron Architecture Technical Brief, May 1999, 15 pages, Version 2.0, Foundry Networks.
BigIron Architecture Technical Brief, May, 1999, 15 pages, Version 2.01, Foundry Networks.
BigIron Architecture Technical Brief, Jul. 2001, 16 pages, Version 2.02, Foundry Networks.
"Foundry Networks, Next Generation Terabit System Architecture—The High Performance Revolution for 10 Gigabit Networks," Nov. 17, 2003, 27 pages.
"JetCore™ Based Chassis Systems—An Architecture Brief on NetIron, BigIron, and FastIron Systems," IronClad Network Performance, Jan. 17, 2003, 27 pages, Foundry Networks, Inc.
"Gigabit Ethernet Alliance, Accelerating the Standard for Speed," 1998, 19 pages, Gigabit Ethernet Alliance.
Kichorowsky, et al., "Mindspeed Switch Fabric Offers the Most Comprehensive Solution for Multi-Protocol Networking Equipment," Apr. 30, 2001, 3 pages.
Matsumoto, et al., "Switch Fabrics Touted at Interconnects Conference," Aug. 21, 2000, 2 pages, at URL: http://www.eetimes.com/story/OEG20008210011, printed on Aug. 12, 2002.
McAuley, et al., "Fast Routing Table Lookup Using CAMs," Proceedings of INFOCOM, Mar.-Apr. 1993, pp. 1382-1391.
Mier Communications, Inc., "Lab Testing Summary Report—Product Category: Layer-3 Switches, Vendor Tested:, Product Tested: Foundry Networks, BigIron 4000," Report No. 231198, Oct. 1998, 6 pages.
Mier Communications, Inc.,"Lab Testing Summary Report—Product Category: Gigabit Backbone Switches, Vendor Tested: Foundry Networks, Product Tested: BigIron 4000," Report No. 210998, Sep. 1998, 6 pages.
"17×17 3.2 Gbps Crosspoint Switch with Input Egualization—M21110," Feb. 1, 2001, 2 pages, Mindspeed—A Conexant Business.
"Switch Fabric Chipset—CX27300 iScale.TM.," Apr. 30, 2001, 2 pages, Mindspeed—A Conexant Business.
Newton, Newton's Telecom Dictionary, CMP Books, Mar. 2004, 20th Ed., p. 617.
Satran et al., "Out of Order Incremental CRC Computation," IEEE Transactions on Computers,Feb. 25, 2003,11 pages, vol. 54, issue 9.
Spurgeon, "Ëthernet, The Definitive Guide," O'Reilly & Associates, Inc., Sebastapol, CA, Feb. 2000.
"Foundry Networks, Inc.—BigIron 4000, Layer 2 & Layer 3 Interoperability Evaluation," Oct. 1999, 4 pages, No. 199133, The Tolly Group.
"Foundry Networks, Inc.—BigIron 8000 Gigabit Ethernet Switching Router, Layer 2 & Layer 3 Performance Evaluation," May 1999, 4 pages, No. 199111, The Tolly Group.
International Search Report of the International Searching Authority for Application No. PCT/US03/08719, mailed Jun. 19, 2003. 1 page.
International Preliminary Examination Report for Application No. PCT/US2001/043113, mailed Oct. 21, 2003, 6pages.
Written Opinion of the International Searching Authority for Application No. PCT/US2001/043113, mailed May 1, 2003, 6 pages.
International Search Report for Application No. PCT/US2001/043113, mailed Dec. 13, 2002, 2 pages.
Non-Final Office Action for U.S. Appl. No. 09/855,024. mailed Jun. 4, 2002, 10 pages.
Final Office Action for U.S. Appl. No. 09/855,024, mailed Jan. 15, 2003, 20 pages.
Advisory Action for U.S. Appl. No. 09/855,024, mailed May 2, 2003.
Notice of Allowance for U.S. Appl. No. 09/855,024, mailed Nov. 3, 2003.
Notice of Allowance for U.S. Appl. No. 09/855,024, mailed Dec. 15, 2003. 6 pages.
Non-Final Office Action for U.S. Appl. No. 10/810,301, mailed Mar. 17, 2005,11 pages.
Non-Final Office Action for U.S. Appl. No. 10/810,301, mailed Feb. 16, 2006, 12 pages.
Notice of Allowance for U.S. Patent Appl. No. 10/810,301, mailed Jul. 28, 2006, 5 pages.
Notice of Allowance for U.S. Appl. No. 10/810,301, mailed Feb. 6, 2007, 9 pages.
Non-Final Office Action for U.S. Appl. No. 09/855,025, mailed Nov. 23, 2004, 17 pages.
Non-Final Office Action for U.S. Appl. No. 09/855,031, mailed May 22, 2002.
Non-Final Office Action for U.S. Appl. No. 09/855,031, mailed Dec. 10, 2002.
Final Office Action for U.S. Appl. No. 09/855,031, mailed Jul. 30, 2003.
Notice of Allowance for U.S. Appl. No. 09/855,031, mailed Nov. 4, 2003.
Non-Final Office Action for U.S. Appl. No. 10/736,680, mailed Feb. 16, 2006, 18 pages.
Final Office Action for U.S. Appl. No. 10/736,680, mailed Aug. 3, 2006, 10 pages.
Notice of Allowance for U.S. Appl. No. 10/736,680, mailed Feb. 22, 2007, 12 pages.
Non-Final Office Action for U.S. Appl. No. 10/210,041, mailed Sep. 10, 2003, 12 pages.

(56) References Cited

OTHER PUBLICATIONS

Final Office Action for U.S. Appl. No. 10/210,041, mailed Jan. 7, 2004, 14 pages.
Non-Final Office Action for U.S. Appl. No. 10/210,041, mailed Mar. 11, 2004, 12 pages.
Final Office Action for U.S. Appl. No. 10/210,041, mailed Jul. 7, 2004, 13 pages.
Non-Final Office Action for U.S. Appl. No. 10/210,041, mailed Feb. 9, 2005, 7 pages.
Final Office Action for U.S. Appl. No. 10/210,041, mailed Aug. 24, 2005, 7 pages.
Advisory Action for U.S. Appl. No. 10/210,041, mailed Dec. 13, 2005, 4 pages.
Non-Final Office Action for U.S. Appl. No. 10/210,108, mailed Jun. 12, 2003, 6 pages.
Notice of Allowance for U.S. Appl. No. 10/210,108, mailed Oct. 7, 2003.
Requirement for Restriction/Election for U.S. Appl. No. 10/438,545, mailed Oct. 31, 2003.
Non-Final Office Action for U.S. Appl. No. 10/438,545, mailed Dec. 12, 2003, 7 pages.
Notice of Allowance for U.S. Appl. No. 10/438,545, mailed Jun. 15, 2004, 4 pages.
Non-Final Office Action for U.S. Appl. No. 11/611,067, mailed Feb. 20, 2009, 11 pages.
Non-Final Office Action for U.S. Appl. No. 11/615,769, mailed Apr. 15, 2009, 11 pages.
Non-Final Office Action for U.S. Appl. No. 10/832,086, mailed Sep. 19, 2007, 12 pages.
Final Office Action for U.S. Appl. No. 10/832,086, mailed May 1, 2008, 31 pages.
Advisory Action for U.S. Appl. No. 10/832,086, mailed Jul. 21, 2008, 4 pages.
Non-Final Office Action for U.S. Appl. No. 10/832,086, mailed Sep. 18, 2008, 18 pages.
Non Final Office Action for U.S. Appl. No. 10/832,086, mailed Apr. 1, 2009, 17 pages.
Non-Final Office Action for U.S. Appl. No. 11/586,991, mailed Oct. 2, 2008, 23 pages.
Non-Final Office Action for U.S. Appl. No. 10/810,208, mailed Jul. 16, 2007, 24 pages.
Non-Final Office Action for U.S. Appl. No. 10/810,208, mailed Dec. 18, 2007, 40 pages.
Final Office Action for U.S. Appl. No. 10/810,208, mailed Jun. 11, 2008, 34 pages.
Advisory Action for U.S. Appl. No. 10/810,208, mailed Aug. 27, 2008, 4 pages.
Non-Final Office Action for U.S. Appl. No. 10/810,208, mailed Feb. 13, 2009, 17 pages.
Requirement for Restriction/Election for U.S. Appl. No. 10/140,752, mailed May 18, 2006, 8 pages.
Non-Final Office Action for U.S. Appl. No. 10/140,752, mailed Dec. 14, 2006, 17 pages.
Non-Final Office Action for U.S. Appl. No. 10/140,752, mailed Apr. 23, 2007, 6 pages.
Non-Final Office Action for U.S. Appl. No. 10/140,752, mailed Jan. 24, 2008, 8 pages.
Notice of Allowance of U.S. Appl. No. 10/140,752, mailed Jul. 24, 2008, 14 pages.
Notice of Allowance of U.S. Appl. No. 10/140,752, mailed Sep. 10, 2008, 4 pages.
Non-Final Office Action for U.S. Appl. No. 11/668,322, mailed Mar. 23, 2009, 19 pages.
Non-Final Office Action for U.S. Appl. No. 11/854,486, mailed Jul. 20, 2009, 29 pages.
Non-Final Office Action for U.S. Appl. No. 10/139,912, mailed Jan. 25, 2006, 14 pages.
Final Office Action for U.S. Appl. No. 10/139,912, mailed Aug. 11, 2006, 26 pages.
Non-Final Office Action for U.S. Appl. No. 10/139,912, mailed Apr. 20, 2007, 20 pages.
Final Office Action for U.S. Appl. No. 10/139,912, mailed Nov. 28, 2007, 20 pages.
Non-Final Office Action for U.S. Appl. No. 10/139,912, mailed Aug. 1, 2008, 21 pages.
Notice of Allowance for U.S. Appl. No. 10/139,912, mailed Feb. 5, 2009, 8 pages.
Notice of Allowance for U.S. Appl. No. 10/139,912, mailed Jun. 8, 2009, 8 pages.
Requirement for Restriction/Election for U.S. Appl. No. 10/140,751, mailed Apr. 27, 2006, 5 pages.
Non-Final Office Action for U.S. Appl. No. 10/140,751, mailed Aug. 10, 2006, 15 pages.
Final Office Action for U.S. Appl. No. 10/140,751, mailed Apr. 10, 2007, 16 pages.
Non-Final Office Action for U.S. Appl. No. 10/140,751, mailed Oct. 30, 2007, 14 pages.
Final Office Action for U.S. Appl. No. 10/140,751, mailed May 28, 2008, 19 pages.
Non-Final Office Action for U.S. Appl. No. 10/140,751, mailed Sep. 17, 2008, 15 pages.
Final Office Action for U.S. Appl. No. 10/140,751, mailed Mar. 17, 2009, 17 pages.
Advisory Action for U.S. Appl. No. 10/140,751, mailed Jun. 1, 2009, 3 pages.
Non-Final Office Action for U.S. Appl. No. 11/745,008, mailed May 14, 2009, 27 pages.
Non-Final Office Action for U.S. Appl. No. 10/141,223, mailed Feb. 23, 2006, 25 pages.
Non-Final Office Action for U.S. Appl. No. 10/141,223, mailed Feb. 13, 2007, 29 pages.
Final Office Action for U.S. Appl. No. 10/141,223, mailed Aug. 21, 2007, 25 pages.
Non-Final Office Action for U.S. Appl. No. 10/141,223, mailed Dec. 28, 2007, 13 pages.
Non-Final Office Action for U.S. Appl. No. 10/141,223, mailed Sep. 3, 2008, 22 pages.
Non-Final Office Action for U.S. Appl. No. 10/139,831, mailed Oct. 17, 2005, 7 pages.
Notice of Allowance for U.S. Appl. No. 10/139,831, mailed Feb. 9, 2006, 7 pages.
Non-Final Office Action for U.S. Appl. No. 10/139,831, mailed Jun. 27, 2006, 9 pages.
Final Office Action for U.S. Appl. No. 10/139,831, mailed Nov. 28, 2006, 17 pages.
Notice of Allowance for U.S. Appl. No. 10/139,831, mailed Jun. 14, 2007, 26 pages.
Notice of Allowance for U.S. Appl. No. 10/139,831, mailed Jun. 26, 2007, 25 pages.
Non-Final Office Action for U.S. Appl. No. 11/828,246, mailed Jun. 15, 2009, 26 pages.
Non-Final Office Action for U.S. Appl. No. 10/140,088, mailed Apr. 27, 2006, 13 pages.
Notice of Allowance for U.S. Appl. No. 10/140,088, mailed Sep. 7, 2006, 13 pages.
Notice of Allowance for U.S. Appl. No. 10/140,088, mailed Oct. 24, 2006, 8 pages.
Notice of Allowance for U.S. Appl. No. 10/140,088, mailed Jan. 11, 2007, 5 pages.
Non-Final Office Action for U.S. Appl. No. 11/621,038, mailed Apr. 23, 2009, 44 pages.
Non-Final Office Action for U.S. Appl. No. 10/140,749, mailed Aug. 10, 2006, 22 pages.
Final Office Action for U.S. Appl. No. 10/140,749, mailed Jun. 27, 2007, 23 pages.
Final Office Action for U.S. Appl. No. 10/140,749, mailed Jan. 8, 2008, 23 pages.
Non-Final Office Action for U.S. Appl. No. 10/140,749, mailed Jun. 6, 2008, 28 pages.
Final Office Action for U.S. Appl. No. 10/140,749, mailed Dec. 8, 2008, 30 pages.

(56) References Cited

OTHER PUBLICATIONS

Non-Final Office Action for U.S. Appl. No. 10/140,749, mailed May 27, 2009, 38 pages.
Non-Final Office Action for U.S. Appl. No. 10/140,753, mailed Apr. 20, 2006, 11 pages.
Final Office Action for U.S. Appl. No. 10/140,753, mailed Jan. 10, 2007, 27 pages.
Non-Final Office Action for U.S. Appl. No. 10/140,753, mailed Aug. 22, 2007, 14 pages.
Non-Final Office Action for U.S. Appl. No. 10/140,753, mailed Jan. 8, 2008, 14 pages.
Final Office Action for U.S. Appl. No. 10/140,753, mailed Aug. 25, 2008, 22 pages.
Requirement for Restriction/Election for U.S. Appl. No. 11/000,359, mailed Jun. 20, 2008, 7 pages.
Non-Final Office Action for U.S. Appl. No. 11/000,359, mailed Oct. 23, 2008, 28 pages.
Non-Final Office Action for U.S. Appl. No. 11/000,359, mailed May 29, 2009, 14 pages.
Requirement for Restriction/Election for U.S. Appl. No. 11/118,697, mailed Jun. 2, 2009, 8 pages.
Non-Final Office Action for U.S. Appl. No. 09/855,038, mailed Jun. 2, 2005, 14 pages.
Final Office Action for U.S. Appl. No. 09/855,038, mailed Feb. 7, 2006, 8 pages.
Non-Final Office Action for U.S. Appl. No. 09/855,038, mailed Oct. 4, 2006, 14 pages.
Notice of Allowance for U.S. Appl. No. 09/855,038, mailed Apr. 26, 2007, 8 pages.
Requirement for Restriction/Election for U.S. Appl. No. 09/988,066, mailed Dec. 13, 2005, 7 pages.
Non-Final Office Action for U.S. Appl. No. 09/988,066, mailed Jul. 14, 2006, 17 pages.
Non-Final Office Action for U.S. Appl. No. 09/988,066, mailed Apr. 6, 2007, 22 pages.
Final Office Action for U.S. Appl. No. 09/988,066, mailed Oct. 31, 2007, 16 pages.
Advisory Action for U.S. Appl. No. 09/988,066, mailed May 28, 2008, 4 pages.
Notice of Allowance for U.S. Appl. No. 09/988,066, mailed Oct. 30, 2008, 16 pages.
Notice of Allowance for U.S. Appl. No. 09/988,066, mailed Jan. 9, 2009.
Non Final Office Action U.S. Appl. No. 11/804,977, mailed Jan. 14, 2008, 13 pages.
Notice of Allowance for U.S. Appl. No. 11/804,977, mailed Nov. 19, 2008, 17 pages.
Non-Final Office Action for U.S. Appl. No. 09/855,015, mailed Oct. 28, 2004, 12 pages.
Non-Final Office Action for U.S. Appl. No. 09/855,015, mailed Jan. 12, 2006, 6 pages.
Notice of Allowance for U.S. Appl. No. 09/855,015, mailed Sep. 8, 2006, 3 pages.
Requirement for Restriction/Election for U.S. Appl. No. 09/855,015, mailed Nov. 3, 2006, 6 pages.
Notice of Allowance for U.S. Appl. No. 09/855,015, mailed Jan. 7, 2008, 4 pages.
Supplemental Notice of Allowance for U.S. Appl. No. 09/855,015, mailed Feb. 4, 2008, 3 pages.
U.S. Appl. No. 12/198,697, filed Aug. 26, 2008, Hsu et al.
U.S. Appl. No. 12/505,390, filed Jul. 17, 2009, Patel et al.
Final Office Action for U.S. Appl. No. 10/832,086, mailed on Sep. 29, 2009, 26 pages.
Non-Final Office Action for U.S. Appl. No. 11/831,950, mailed on Aug. 18, 2009, 49 pages.
Non-Final Office Action for U.S. Appl. No. 11/779,714, mailed on Sep. 1, 2009, 58 pages.
Non-Final Office Action for U.S. Appl. No. 10/810,208, mailed on Aug. 24, 2009, 38 pages.
Non-Final Office Action for U.S. Appl. No. 10/140,751, mailed on Sep. 28, 2009, 34 pages.
Notice of Allowance for U.S. Appl. No. 11/000,359, mailed on Sep. 22, 20009, 17 pages.
Notice of Allowance for U.S. Appl. No. 11/118,697, mailed on Sep. 30, 2009, 41 pages.
Advisory Action for U.S. Appl. No. 11/831,950, mailed on Mar. 4, 2010, 4 pages.
Non-Final Office Action for U.S. Appl. No. 11/779,714, mailed on Mar. 31, 2010, 26 pages.
Non-Final Office Action for U.S. Appl. No. 10/810,208, mailed on Feb. 5, 2010, 13 pages.
Final Office Action for U.S. Appl. No. 11/668,322, mailed on Feb. 24, 2010, 33 pages.
Non-Final Office Action for U.S. Appl. No. 11/854,486, mailed on Jan. 12, 2010, 23 pages.
Final Office Action for U.S. Appl. No. 10/140,751, mailed on Mar. 25, 2010, 29 pages.
Non-Final Office Action for U.S. Appl. No. 12/198,697, mailed on Feb. 2, 2010, 50 pages.
Final Office Action for U.S. Appl. No. 10/140,749, mailed on Jan. 13, 2010, 44 pages.
Final Office Action for U.S. Appl. No. 11/615,769, mailed on Jan. 22, 2010, 34 pages.
Final Office Action for U.S. Appl. No. 11/953,742, mailed on Jun. 14, 2010, 21 pages.
Final Office Action for U.S. Appl. No. 11/953,743, mailed on Jul. 15, 2010, 21 pages.
Non-Final Office Action for U.S. Appl. No. 11/953,745, mailed on Jun. 14, 2010, 19 pages.
Final Office Action for U.S. Appl. No. 11/953,751, mailed on Jun. 25, 2010, 24 pages.
Notice of Allowance for U.S. Appl. No. 10/810,208, mailed on Jul. 15, 2010, 15 pages.
Non-Final Office Action for U.S. Appl. No. 11/668,322, mailed on Jun. 22, 2010, 16 pages.
Notice of Allowance for U.S. Appl. No. 11/854,486, mailed on Jul. 13, 2010, 12 pages.
Advisory Action for U.S. Appl. No. 11/745,008, mailed on Apr. 21, 2010, 8 pages.
Notice of Allowance for U.S. Appl. No. 11/621,038, mailed on Apr. 28, 2010, 15 pages.
Final Office Action for U.S. Appl. No. 12/198,697, mailed on Aug. 2, 2010, 55 pages.
Non-Final Office Action for U.S. Appl. No. 12/400,594, mailed on May 14, 2010, 53 pages.
Non-Final Office Action for U.S. Appl. No. 12/070,893, mailed on Jun. 10, 2010, 44 pages.
Advisory Action for U.S. Appl. No. 11/615,769, mailed on May 25, 2010, 3 pages.
Notice of Allowance for U.S. Appl. No. 11/615,769, mailed on Jul. 12, 2010, 14 pages.
Non-Final Office Action for U.S. Appl. No. 11/646,845, mailed on Oct. 4, 2010, 48 pages.
Final Office Action for U.S. Appl. No. 11/779,714, mailed on Nov. 9, 2010, 24 pages.
Non-Final Office Action for U.S. Appl. No. 12/198,697, mailed on Oct. 25, 2010, 36 pages.
Non-Final Office Action for U.S. Appl. No. 12/198,710, mailed on Sep. 28, 2010, 15 pages.
U.S. Appl. No. 12/795,492, filed Jun. 7, 2010, Davis et al.
U.S. Appl. No. 12/702,031, filed Feb. 8, 2010, Davis.
U.S. Appl. No. 12/466,277, filed May 14, 2009, Lin.
U.S. Appl. No. 12/198,710, filed Aug. 26, 2008, Zhang et al.
U.S. Appl. No. 12/883,073, filed Sep. 15, 2010, Davis.
U.S. Appl. No. 12/900,279, filed Oct. 7, 2010, Bansal et al.
Requirement for Restriction/Election for U.S. Appl. No. 12/639,749, mailed on Dec. 7, 2010, 3 pages.
Non-Final Office Action for U.S. Appl. No. 12/639,762, mailed on Sep. 1, 2010, 40 pages.
Final Office Action for U.S. Appl. No. 12/400,594, mailed on Oct. 28, 2010, 13 pages.

(56) References Cited

OTHER PUBLICATIONS

Non-Final Office for U.S. Appl. No. 12/400,645, mailed on Sep. 1, 2010, 45 pages.
Non-Final Office Action for U.S. Appl. No. 12/505,390, mailed on Sep. 1, 2010, 45 pages.
Final Office Action for U.S. Appl. No. 12/070,893, mailed on Nov. 24, 2010, 11 pages.
Non-Final Office Action for U.S. Appl. No. 10/140,751, mailed Dec. 20, 2010, 23 pages.
Notice of Allowance for U.S. Appl. No. 12/400,645, mailed on Jan. 26, 2011, 14 pages.
U.S. Appl. No. 12/880,518, filed Sep. 13, 2010, Wong.
U.S. Appl. No. 13/152,715, filed Jun. 3, 2011, Chang.
U.S. Appl. No. 13/488,229, filed Jun. 4, 2012, Patel.
Non-Final Office Action for U.S. Appl. No. 13/548,116 mailed on Apr. 15, 2013, 8 pages
Non-Final Office Action for U.S. Appl. No. 12/900,279 mailed on Apr. 11, 2013, 7 pages
Non-Final Office Action for U.S. Appl. No. 12/608,985 mailed on May 31, 2013, 9 pages
Notice of Allowance for U.S. Appl. No. 12/198,710 mailed on May 28, 2013, 10 pages.
Notice of Allowance for U.S. Appl. No. 12/684,022 mailed on Aug. 20, 2013, 10 pages.
Non-Final Office Action for U.S. Appl. No. 13/398,725 mailed on Aug. 30, 2013, 8 pages.
Non-Final Office Action for U.S. Appl. No. 10/832,086 mailed on Sep. 9, 2013, 13 pages.
Non-Final Office Action for U.S. Appl. No. 12/608,972 mailed on Sep. 16, 2013, 6 pages.
Final Office Action for U.S. Appl. No. 12/900,279 mailed on Sep. 27, 2013, 8 pages.
Non-Final Office Action for U.S. Appl. No. 13/458,650 mailed on Oct. 2, 2013, 5 pages.
Notice of Allowance for U.S. Appl. No. 11/745,008 mailed on Oct. 7, 2013, 9 pages.
Final Office Action for U.S. Appl. No. 12/624,300 mailed on Oct. 31, 2013, 16 pages.

\* cited by examiner

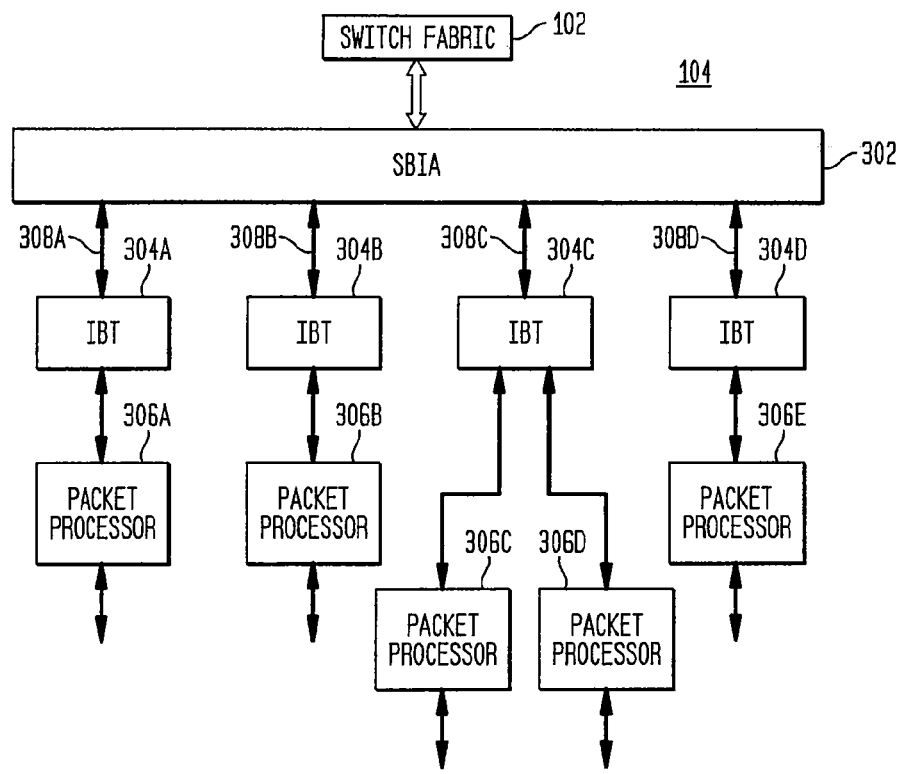
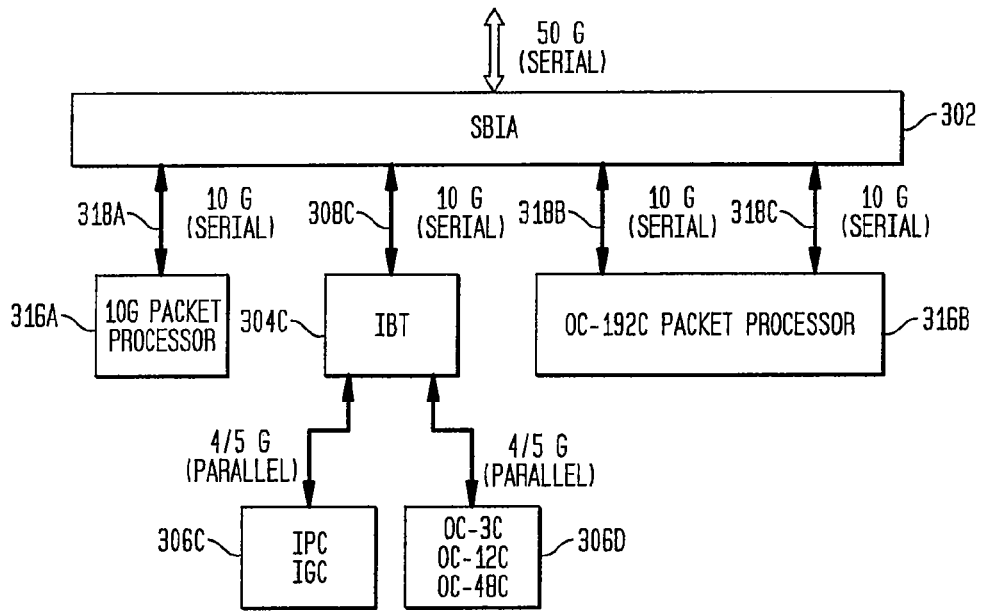

| LANE 0 | LANE 1 | LANE 2 | LANE 3 |
|---|---|---|---|
| CONTROL INFORMATION | STATE INFORMATION | RESERVED | RESERVED |
| D0 | D1 | D2 | D3 |
| D4 | D5 | D6 | D7 |
| D8 | D9 | D10 | D11 |
| D12 | D13 | D14 | D15 |
| ⋮ | ⋮ | ⋮ | ⋮ |
| D28 | D29 | D30 | D31 |

1310

| STATE INFORMATION | |
|---|---|
| NAME | DESCRIPTION |
| SLOT NUMBER | DESTINATION SLOT NUMBER WHERE CELL DATA BEING SENT |
| PAYLOAD STATE | RESERVED, SOP, DATA, ABORT |
| SOURCE OR DESTINATION PACKET PROCESSOR IDENTIFIER | ENCODED NUMBER IDENTIFYING A SOURCE OR DESTINATION PACKET PROCESSOR |
| RESERVED | RESERVED |

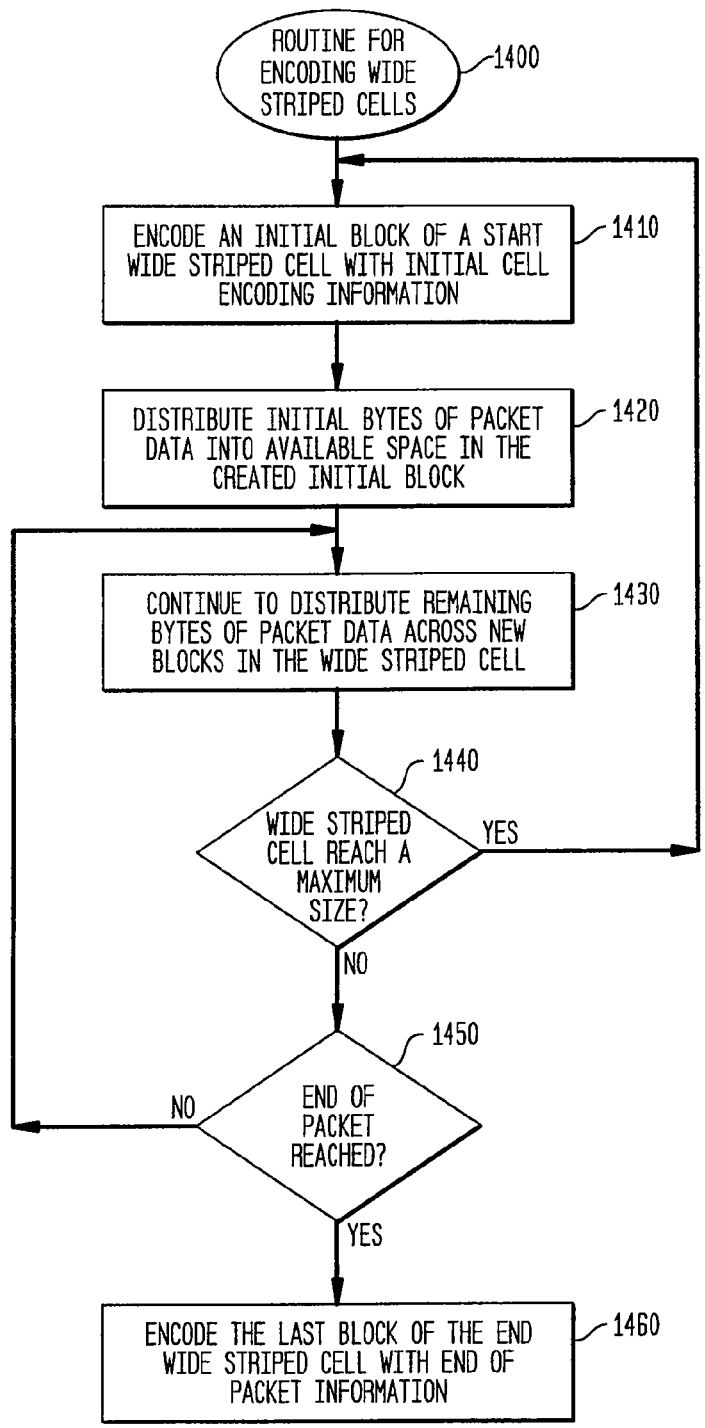

FIG. 15A

| CYCLE | STRIPE 1 | | | | STRIPE 2 | | | | STRIPE 3 | | | | STRIPE 4 | | | | STRIPE 5 | | | |
|---|---|---|---|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 | L0 | L1 | L2 | L3 |
| 1 | K0 | STATE | D0 | D1 | K0 | STATE | D2 | D3 | K0 | STATE | D4 | D5 | K0 | STATE | D6 | D7 | K0 | STATE | RES | RES |
| 2 | D8 | | | | | | | | | | | | | | | | | | | D27 |
| 3 | D28 | | | | | | | | | | | | | | | | | | | D47 |
| 4 | D48 | | | | | | | | | | | | | | | | | | | D67 |
| 5 | D68 | | | | | | | | | | | | | | | | | | | D87 |
| 6 | D88 | | | | | | | | | | | | | | | | | | | D107 |
| 7 | D108 | | | | | | | | | | | | | | | | | | | D127 |
| 8 | D128 | | | | | | | | | | | | | | | | | | | D147 |

| STATE INFORMATION | |
|---|---|
| NAME | DESCRIPTION |
| SLOT NUMBER | DESTINATION SLOT NUMBER FOR BIA TO CROSSPOINT SWITCH DIRECTION SOURCE SLOT NUMBER FOR CROSSPOINT SWITCH TO BIA DIRECTION |
| PAYLOAD STATE | ENCODED PAYLOAD STATE INFORMATION (RESERVED, SOA, DATA, ABORT) |
| RESERVED | RESERVED |

FIG. 15C

END OF PACKET ENCODING INFORMATION

1. EOP DURING CYCLE 1 (i.e. DURING TRANSMISSION OF STATE INFORMATION)

| 1 | K0 | state | D0 | D1 | K0 | state | D2 | D3 | K0 | state | K1 | K1 | K0 | state | RES | RES |
|---|----|----|----|----|----|----|----|----|----|----|----|----|----|----|----|----|

NOTE THAT THE K0, STATE, AND RESERVED BYTES ARE ALL PRESERVED, AS IN ANY OTHER CYCLE 1 TRANSMISSION. THE K1 CHARACTER IS TREATED AS DATA

2. EOP DURING CYCLE n (n!=0)

| 1 | K0 | state | D0 | D1 | K0 | state | D2 | D3 | K0 | state | D4 | D5 | K0 | state | D6 | D7 | K0 | state | RES | RES |
|---|----|----|----|----|----|----|----|----|----|----|----|----|----|----|----|----|----|----|----|----|
| 2 | D8 | | | | | | | | | | | | | | | | | | | |
| 3 | D28 | | D32 | D33 | | | | | | | | | | | | | | | | D27 |
| | | | | | | | | | | | | | | | | | | | | K1 |

3. EOP AT BLOCK BOUNDARY DURING CYCLE n (n!=0)

| 1 | K0 | state | D0 | D1 | K0 | state | D2 | D3 | K0 | state | D4 | D5 | K0 | state | D6 | D7 | K0 | state | RES | RES |
|---|----|----|----|----|----|----|----|----|----|----|----|----|----|----|----|----|----|----|----|----|
| 2 | D8 | | | | | | | | | | | | | | | | | | | |
| 3 | K1 | K1 | K1 | K1 | K1 | K1 | K1 | K1 | K1 | K1 | K1 | K1 | K1 | K1 | K1 | K1 | K1 | K1 | | D27 |
| | | | | | | | | | | | | | | | | | | | | K1 |

NOTE THAT WHEN n>0, THE BLOCK BOUNDARY FOR DATA IS IN LANE 3 STRIPE 5. HOWEVER, FOR n=0, THE BLOCK BOUNDARY FOR DATA IS IN LANE 3 OF STRIPE 4.

4. EOP at cell boundary

| 6 | D88 |
|---|-----|
| 7 | D108 |
| 8 | D128 |

| | | | | | | | | | | | | | | | | | | | D107 |
|---|---|---|---|---|---|---|---|---|---|---|---|---|---|---|---|---|---|---|---|
| | | | | | | | | | | | | | | | | | | | D127 |
| 1 | K0 | state | K1 | K1 | K0 | state | K1 | K1 | K0 | state | K1 | K1 | K0 | state | K1 | K1 | K0 | state | RES | RES | D147 |

FIG. 15D

| CYCLE | STRIPE 1 | | | | STRIPE 2 | | | | STRIPE 3 | | | | STRIPE 4 | | | | STRIPE 5 | | | |
|---|---|---|---|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 | L0 | L1 | L2 | L3 |
| 1 | K0 | P1 | D0 | D1 | | | | | | | | | | | | | | | | |
| 2 | D8 | | | D11 | | | | | | | | | | | | | | | | |
| 3 | D28 | | | D31 | K0 | P1 | D2 | D3 | | | | | | | | | | | | |
| 4 | D48 | | | D51 | D12 | | | D15 | | | | | K0 | P1 | D6 | D7 | | | | |
| 5 | D68 | | | D71 | D32 | | | D35 | | | | | D20 | | | D23 | | | | |
| 6 | D88 | | | D91 | D52 | | | D55 | K0 | P1 | D4 | D5 | D40 | | | D43 | | | | |
| 7 | D108 | | | D111 | D72 | | | D75 | D16 | | | D19 | D60 | | | D63 | K0 | P1 | RES | RES |
| 8 | D128 | | | D131 | D92 | | | D95 | D36 | | | D39 | D80 | | | D83 | D24 | | | D27 |

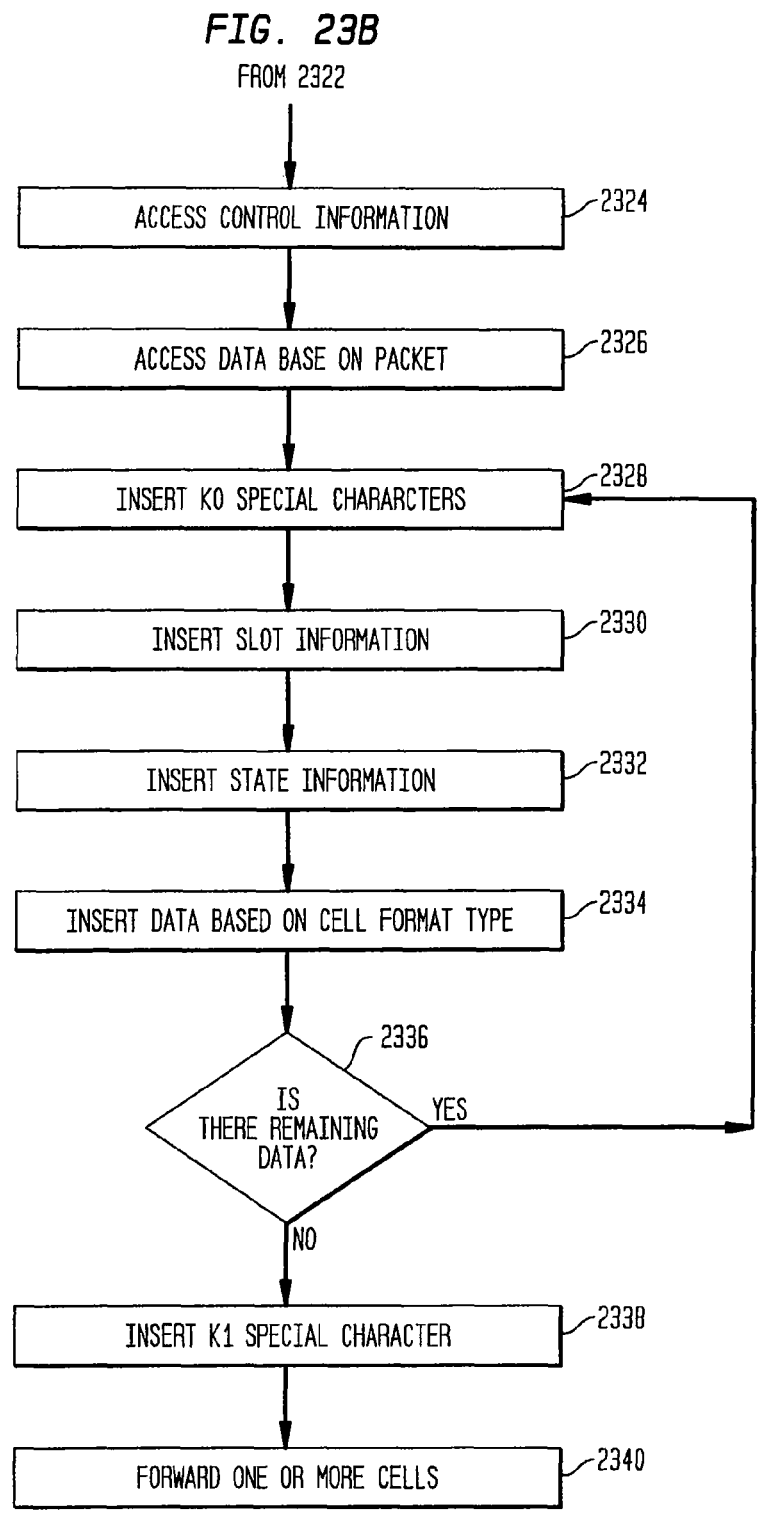

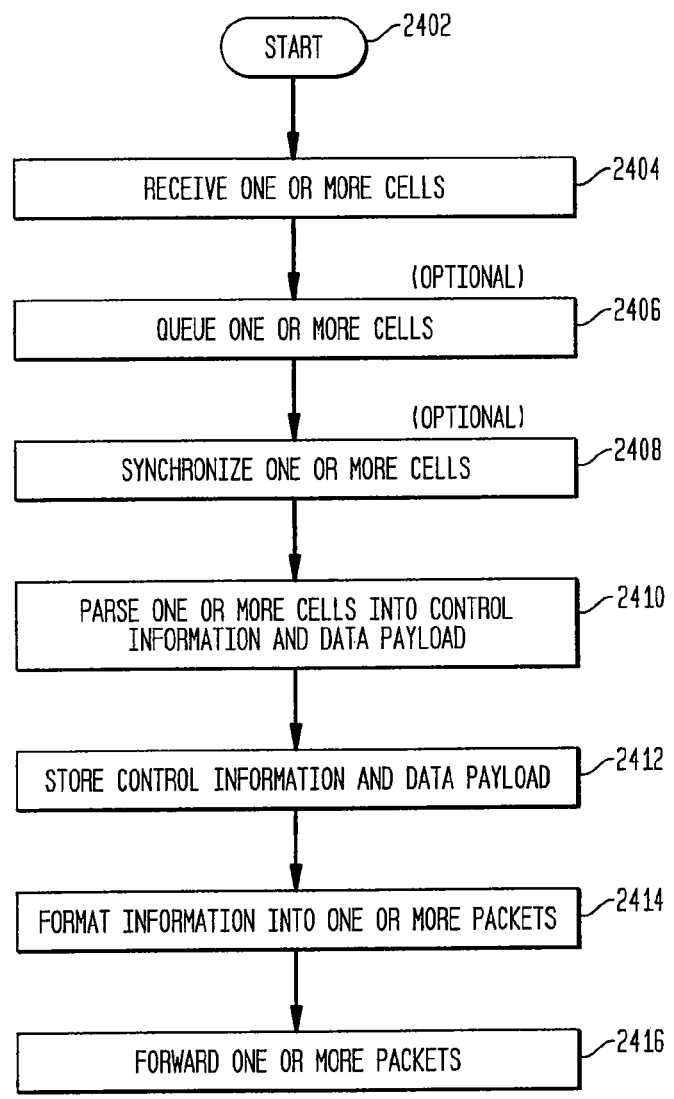

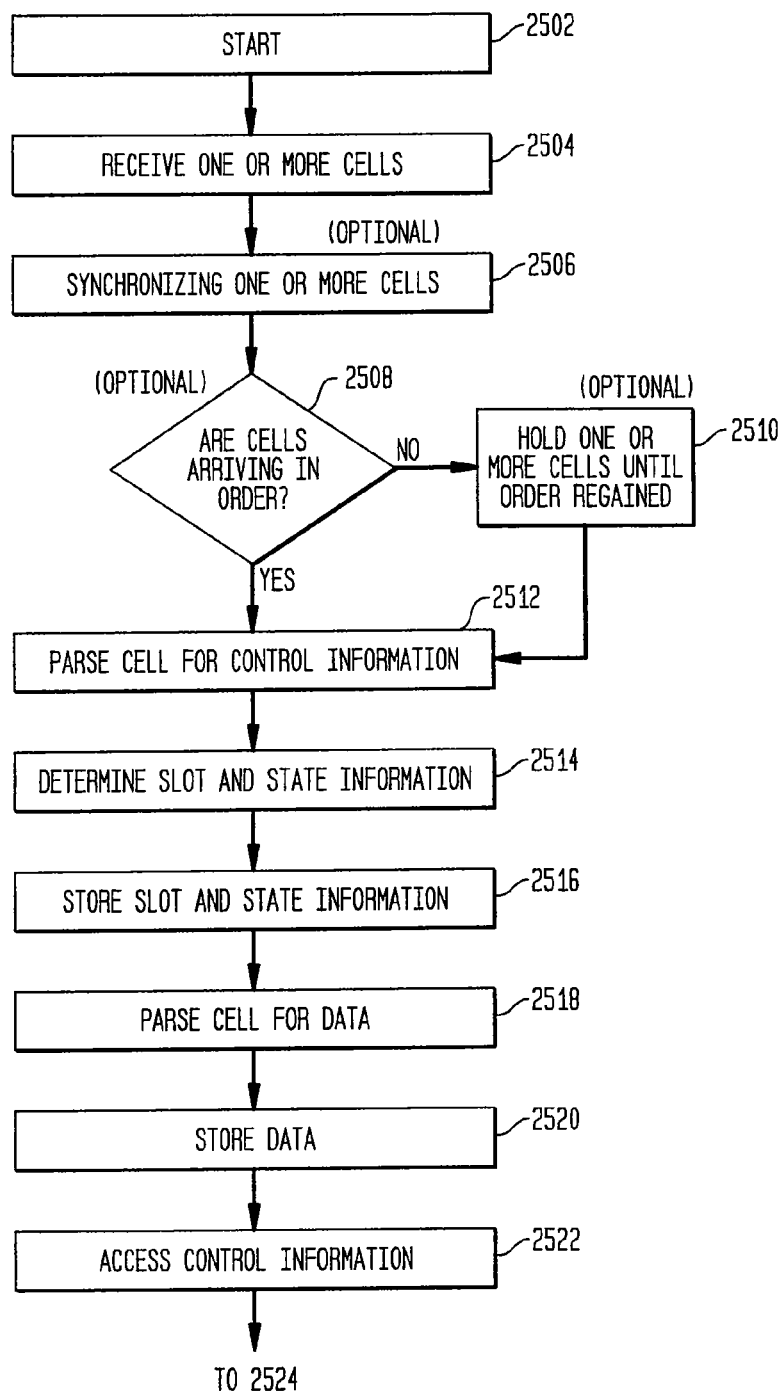

Link 2853 Error Condition

3400A

| cycle | Stripe 1 | | | | Stripe 2 | | | | Stripe 3 | | | | Stripe 4 | | | | Stripe 5 | | | |
|---|---|---|---|---|---|---|---|---|---|---|---|---|---|---|---|---|---|---|---|---|
| | L0 | L1 | L2 | L3 | L0 | L1 | L2 | L3 | L0 | L1 | L2 | L3 | L0 | L1 | L2 | L3 | L0 | L1 | L2 | L3 |
| 1 | K2 | State | K2 | K2 | K2 | State | K2 | K2 | K2 | State | K2 | K2 | K2 | State | K2 | K2 | K2 | state | K2 | K2 |

BACKPLANE INTERFACE ADAPTER WITH ERROR CONTROL AND REDUNDANT FABRIC

This application is a continuation application of U.S. Ser. No. 12/400,594, filed Mar. 9, 2009, which is a continuation application of U.S. application Ser. No. 09/988,066, filed Nov. 16, 2001, which is a continuation-in-part application of U.S. application Ser. No. 09/855,038, filed May 15, 2001, U.S. application Ser. No. 09/988,066 claims the benefit of provisional U.S. Application No. 60/249,871, filed Nov. 17, 2000, and U.S. application Ser. No. 09/855,038 claims the benefit of provisional U.S. Application No. 60/249,871, filed Nov. 17, 2000, which are all incorporated by reference herein in their entireties.

CROSS-REFERENCE TO RELATED APPLICATIONS

This patent application is potentially related to the following co-pending U.S. utility patent applications, which are all herein incorporated by reference in their entireties:

"High-Performance Network Switch," Ser. No. 09/855,031, filed May 15, 2001.

"Method and System for Encoding Striped Cells," Ser. No. 09/855,024, filed May 15, 2001.

"Method and System for Translating Data Formats," Ser. No. 09/855,025, filed May 15, 2001.

"Network Switch Cross Point," Ser. No. 09/855,015, filed May 15, 2001.

BACKGROUND OF THE INVENTION

1. Field of the Invention

The invention relates generally to network switches.

2. Related Art

A network switch is a device that provides a switching function (i.e., it determines a physical path) in a data communications network. Switching involves transferring information, such as digital data packets or frames, among entities of the network. Typically, a switch is a computer having a plurality of circuit cards coupled to a backplane. In the switching art, the circuit cards are typically called "blades." The blades are interconnected by a "switch fabric." Each blade includes a number of physical ports that couple the switch to the other network entities over various types of media, such as Ethernet, FDDI (Fiber Distributed Data Interface), or token ring connections. A network entity includes any device that transmits and/or receives data packets over such media.

The switching function provided by the switch typically includes receiving data at a source port from a network entity and transferring the data to a destination port. The source and destination ports may be located on the same or different blades. In the case of "local" switching, the source and destination ports are on the same blade. Otherwise, the source and destination ports are on different blades and switching requires that the data be transferred through the switch fabric from the source blade to the destination blade. In some case, the data may be provided to a plurality of destination ports of the switch. This is known as a multicast data transfer.

Switches operate by examining the header information that accompanies data in the data frame. The header information includes the international standards organization (ISO) 7-layer OSI (open-systems interconnection model). In the OSI model, switches generally route data frames based on the lower level protocols such as Layer 2 or Layer 3. In contrast, routers generally route based on the higher level protocols and by determining the physical path of a data frame based on table look-ups or other configured forwarding or management routines to determine the physical path (i.e., route).

Ethernet is a widely used lower-layer network protocol that uses broadcast technology. The Ethernet frame has six fields. These fields include a preamble, a destination address, source address, type, data and a frame check sequence. In the case of an Ethernet frame, the digital switch will determine the physical path of the frame based on the source and destination addresses. Standard Ethernet operates at a 10 Mbps data rate. Another implementation of Ethernet known as "Fast Ethernet" (FE) has a data rate of 100 Mbps. Yet another implementation of FE operates at 10 Gbps.

A digital switch will typically have physical ports that are configured to communicate using different protocols at different data rates. For example, a blade within a switch may have certain ports that are 10 Mbps, or 100 Mbps ports. It may have other ports that conform to optical standards such as SONET and are capable of such data rates as 10 Gbps.

A performance of a digital switch is often assessed based on metrics such as the number of physical ports that are present, and the total bandwidth or number of bits per second that can be switched without blocking or slowing the data traffic. A limiting factor in the bit carrying capacity of many switches is the switch fabric. For example, one conventional switch fabric was limited to 8 gigabits per second per blade. In an eight blade example, this equates to 64 gigabits per second of traffic. It is possible to increase the data rate of a particular blade to greater than 8 gigabits per second. However, the switch fabric would be unable to handle the increased traffic.

It is desired to take advantage of new optical technologies and increase port densities and data rates on blades. However, what is needed is a switch and a switch fabric capable of handling higher bit rates and providing a maximum aggregate bit carrying capacity well in excess of conventional switches.

SUMMARY OF THE INVENTION

The present invention provides a high-performance network switch. Serial link technology is used in a switching fabric. Serial data streams, rather than parallel data streams, are switched in a switching fabric. Blades output serial data streams in serial pipes. A serial pipe can be a number of serial links coupling a blade to the switching fabric. The serial data streams represent an aggregation of input serial data streams provided through physical ports to a respective blade. Each blade outputs serial data streams with in-band control information in multiple stripes to the switching fabric.

In one embodiment, the serial data streams carry packets of data in wide striped cells across multiple stripes. Wide striped cells are encoded. In-band control information is carried in one or more blocks of a wide cell. For example, the initial block of a wide cell includes control information and state information. Further, the control information and state information is carried in each stripe. In particular, the control information and state information is carried in each sub-block of the initial block of a wide cell. In this way, the control information and state information is available in-band in the serial data streams (also called stripes). Control information is provided in-band to indicate traffic flow conditions, such as, a start of cell, an end of packet, abort, or other error conditions.

A wide cell has one or more blocks. Each block extends across five stripes. Each block has a size of twenty bytes made up of five sub-blocks each having a size of four bytes. In one example, a wide cell has a maximum size of eight blocks (160 bytes) which can carry 148 bytes of payload data and 12 bytes of in-band control information. Packets of data for full-duplex traffic can be carried in the wide cells at a 50 Gbps rate in each direction through one slot of the digital switch. According to one feature, the choice of maximum wide cell block size of 160 bytes as determined by the inventors allows a 4×10 Gbps Ethernet (also called 4×10 GE) line rate to be maintained through the backplane interface adapter. This line rate is maintained for Ethernet packets having a range of sizes accepted in the Ethernet standard including, but not limited to, packet sizes between 84 and 254 bytes.

In one embodiment, a digital switch has a plurality of blades coupled to a switching fabric via serial pipes. The switching fabric can be provided on a backplane and/or one or more blades. Each blade outputs serial data streams with in-band control information in multiple stripes to the switching fabric. The switching fabric includes a plurality of cross points corresponding to the multiple stripes. Each cross point has a plurality of port slices coupled to the plurality of blades. In one embodiment five stripes and five cross points are used. Each blade has five serial links coupled to each of the five cross points respectively. In one example implementation, the serial pipe coupling a blade to switching fabric is a 50 Gbps serial pipe made up of five 10 Gbps serial links. Each of the 10 Gbps serial links is coupled to a respective cross point and carries a serial data stream. The serial data stream includes a data slice of a wide cell that corresponds to one stripe.

In one embodiment of the present invention, each blade has a backplane interface adapter (BIA). The BIA has three traffic processing flow paths. The first traffic processing flow path extends in traffic flow direction from local packet processors toward a switching fabric. The second traffic processing flow path extends in traffic flow direction from the switching fabric toward local packet processors. A third traffic processing flow path carried local traffic from the first traffic processing flow path. This local traffic is sorted and routed locally at the BIA without having to go through the switching fabric.

The BIA includes one or more receivers, wide cell generators, and transmitters along the first path. The receivers receive narrow input cells carrying packets of data. These narrow input cells are output from packet processor(s) and/or from integrated bus translators (IBTs) coupled to packet processors. The BIA includes one or more wide cell generators. The wide cell generators generate wide striped cells carrying the packets of data received by the BIA in the narrow input cells. The transmitters transmit the generated wide striped cells in multiple stripes to the switching fabric.

According to the present invention, the wide cells extend across multiple stripes and include in-band control information in each stripe. In one embodiment, each wide cell generator parses each narrow input cell, checks for control information indicating a start of packet, encodes one or more new wide striped cells until data from all narrow input cells of the packet is distributed into the one or more new wide striped cells, and writes the one or more new wide striped cells into a plurality of send queues.

In one example, the BIA has four deserializer receivers, 56 wide cell generators, and five serializer transmitters. The four deserializer receivers receive narrow input cells output from up to eight originating sources (that is, up to two IBTs or packet processors per deserializer receiver). The 56 wide cell generators receive groups of the received narrow input cells sorted based on destination slot identifier and originating source. The five serializer transmitters transmit the data slices of the wide cell that corresponds to the stripes.

According to a further feature, a BIA can also include a traffic sorter which sorts received narrow input cells based on a destination slot identifier. In one example, the traffic sorter comprises both a global/traffic sorter and a backplane sorter. The global/traffic sorter sorts received narrow input cells having a destination slot identifier that identifies a local destination slot from received narrow input cells having destination slot identifier that identifies global destination slots across the switching fabric. The backplane sorter further sorts received narrow input cells having destination slot identifiers that identify global destination slots into groups based on the destination slot identifier.

In one embodiment, the BIA also includes a plurality of stripe send queues and a switching fabric transmit arbitrator. The switching fabric transmit arbitrator arbitrates the order in which data stored in the stripe send queues is sent by the transmitters to the switching fabric. In one example, the arbitration proceeds in a round-robin fashion. Each stripe send queue stores a respective group of wide striped cells corresponding a respective originating source packet processor and a destination slot identifier. Each wide striped cell has one or more blocks across multiple stripes. During a processing cycle, the switching fabric transmit arbitrator selects a stripe send queue and pushes the next available cell (or even one or more blocks of a cell at time) to the transmitters. Each stripe of a wide cell is pushed to the respective transmitter for that stripe.

The BIA includes one or more receivers, wide/narrow cell translators, and transmitters along the second path. The receivers receive wide striped cells in multiple stripes from the switching fabric. The wide striped cells carry packets of data. The translators translate the received wide striped cells to narrow input cells carrying the packets of data. The transmitters then transmit the narrow input cells to corresponding destination packet processors or IBTs. In one example, the five deserializer receivers receive five sub-blocks of wide striped cells in multiple stripes. The wide striped cells carrying packets of data across the multiple stripes and including destination slot identifier information.

In one embodiment, the BIA further includes stripe interfaces and stripe receive synchronization queues. Each stripe interface sorts received sub-blocks in each stripe based on originating slot identifier information and stores the sorted received sub-blocks in the stripe receive synchronization queues.

The BIA further includes along the second traffic flow processing path an arbitrator, a striped-based wide cell assembler, and the narrow/wide cell translator. The arbitrator arbitrates an order in which data stored in the stripe receive synchronization queues is sent to the striped-based wide cell assembler. The striped-based wide cell assembler assembles wide striped cells based on the received sub-blocks of data. A narrow/wide cell translator then translates the arbitrated received wide striped cells to narrow input cells carrying the packets of data.

A second level of arbitration is also provided according to an embodiment of the present invention. The BIA further includes destination queues and a local destination transmit arbitrator in the second path. The destination queues store narrow cells sent by a local traffic sorter (from the first path) and the narrow cells translated by the translator (from the second path. The local destination transmit arbitrator arbitrates an order in which narrow input cells stored in the destination queues is sent to serializer transmitters. Finally, the serializer transmitters then that transmits the narrow input cells to corresponding IBTs and/or source packet processors (and ultimately out of a blade through physical ports).

According to a further feature of the present invention, system and method for encoding wide striped cells is provided. The wide cells extend across multiple stripes and include in-band control information in each stripe. State information, reserved information, and payload data may also be included in each stripe. In one embodiment, a wide cell generator encodes one or more new wide striped cells.

The wide cell generator encodes an initial block of a start wide striped cell with initial cell encoding information. The initial cell encoding information includes control information (such as, a special K0 character) and state information provided in each sub-block of an initial block of a wide cell. The wide cell generator further distributes initial bytes of packet data into available space in the initial block. Remaining bytes of packet data are distributed across one or more blocks in of the first wide striped cell (and subsequent wide cells) until an end of packet condition is reached or a maximum cell size is reached. Finally, the wide cell generator further encodes an end wide striped cell with end of packet information that varies depending upon the degree to which data has filled a wide striped cell. In one encoding scheme, the end of packet information varies depending upon a set of end of packet conditions including whether the end of packet occurs at the end of an initial block, within a subsequent block after the initial block, at a block boundary, or at a cell boundary.

According to a further embodiment of the present invention, a method for interfacing serial pipes carrying packets of data in narrow input cells and a serial pipe carrying packets of data in wide striped cells includes receiving narrow input cells, generating wide striped cells, and transmitting blocks of the wide striped cells across multiple stripes. The method can also include sorting the received narrow input cells based on a destination slot identifier, storing the generated wide striped cells in corresponding stripe send queues based on a destination slot identifier and an originating source packet processor, and arbitrating the order in which the stored wide striped cells are selected for transmission.

In one example, the generating step includes parsing each narrow input cell, checking for control information that indicates a start of packet, encoding one or more new wide striped cells until data from all narrow input cells carrying the packet is distributed into the one or more new wide striped cells, and writing the one or more new wide striped cells into a plurality of send queues. The encoding step includes encoding an initial block of a start wide striped cell with initial cell encoding information, such as, control information and state information. Encoding can further include distributing initial bytes of packet data into available space in an initial block of a first wide striped cell, adding reserve information to available bytes at the end of the initial block of the first wide striped cell, distributing remaining bytes of packet data across one or more blocks in the first wide striped cell until an end of packet condition is reached or a maximum cell size is reached, and encoding an end wide striped cell with end of packet information. The end of packet information varies depending upon a set of end of packet conditions including whether the end of packet occurs at the end of an initial block, in any block after the initial block, at a block boundary, or at a cell boundary.

The method also includes receiving wide striped cells carrying packets of data in multiple stripes from a switching fabric, translating the received wide striped cells to narrow input cells carrying the packets of data, and transmitting the narrow input cells to corresponding source packet processors. The method further includes sorting the received sub-blocks in each stripe based on originating slot identifier information, storing the sorted received sub-blocks in stripe receive synchronization queues, and arbitrating an order in which data stored in the stripe receive synchronization queues is assembled. Additional steps are assembling wide striped cells in the order of the arbitrating step based on the received sub-blocks of data, translating the arbitrated received wide striped cells to narrow input cells carrying the packets of data, and storing narrow cells in a plurality of destination queues. In one embodiment, further arbitration is performed including arbitrating an order in which data stored in the destination queues is to be transmitted and transmitting the narrow input cells in the order of the further arbitrating step to corresponding source packet processors and/or IBTs.

The present invention further provides error detection and recovery. Such errors can include stripe synchronization errors. In one embodiment, an administrative module includes a level monitor, stripe synchronization error detector, a flow controller, and a control character presence tracker. The level monitor monitors data received at a receiving blade. The stripe synchronization error detector detects a stripe synchronization error based on the amount of data monitored by the level monitor. Example stripe synchronization errors include an incoming link error, a cross-point failure, and an outgoing link error. In one example, the data received at a receiving blade is sorted based on stripe and source information and stored in a set of data structures (e.g., FIFOs). The level monitor monitors the levels of data stored in each data structure. The stripe synchronization error detector detects at least one of an overflow and underflow condition in the amount of data received on a respective stripe from a particular source.

The flow controller initiates a recovery routine to re-synchronize data across the stripes in response to detection of a stripe synchronization error. The control character presence tracker identifies the presence of a K2 character during the recovery routine.

The present invention further includes a method for detecting stripe synchronization error in a network switch, including the steps of: sorting data received at a receiving slot based on stripe and source information; storing the sorted data in a set of data structures; monitoring the levels of data stored in each data structure; and detecting at least one of an overflow and underflow condition in the amount of data received on a respective stripe from a particular source. The source information can identify a slot that sent the data across a switching fabric of the network switch, or can identify a source packet processor that sent the data from a slot across a switching fabric of the network switch.

The present invention further includes a method for maintaining synchronization of striped cell traffic, comprising the steps of: sending a common character in striped cells in all lanes for a predetermined number of cycles; evaluating the common control characters received at stripe receive synchronization queues; and detecting when an in-synch condition is present that indicates the stripe receive synchronization queues have been cleared.

The present invention further includes a method for managing out-of-synchronization traffic flow through a crosspoint switch in a switching fabric, comprising: monitoring the level of stripe-receive-synchronization queues; determining whether an out-of-synchronization condition exists; and initiating a re-synchronization routine when said out-of-synchronization condition exists. The re-synchronization routine can include the steps of: sending a common character in striped cells in all lanes for a predetermined number of cycles; evaluating the common control characters received at stripe receive synchronization queues; and detecting when an in-synch condition is present that indicates the stripe receive synchronization queues have been cleared.

According to another embodiment of the present invention, a redundant switching system is provided. The redundant switching system, includes two switching blades and at least one ingress/egress blade (or slave blade). Each switching blade has a plurality of cross points corresponding to respective stripes of serial data streams. Each ingress/egress blade is coupled to each switching blade through a backplane connection. Each ingress/egress blade also includes a plurality of redundant fabric transceivers (RFTs). The RFTs can switch traffic between the cross points on the two switching blades. This provides redundancy.

In one embodiment, a redundant fabric transceiver is coupled to a bus interface adapter and includes one or more first and second ports, a multiplexer, a downlink transceiver, and an uplink transceiver. The multiplexer selects communication data from similar data for transmission. The downlink transceiver receives, conditions, and transmits the communication data. The uplink transceiver also receives, conditions, and transmits communication data. A register module can be used that includes condition information that indicates operations for at least one of the downlink transceiver and the uplink transceiver, wherein the condition information includes configuration and parameter settings for received and transmitted data.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

In the drawings:

FIG. 3A is a diagram of blade used in the high-performance network switch of FIG. 1 according to an embodiment of the present invention.

FIG. 3B shows a configuration of blade according another embodiment of the present invention.

FIG. 13 is a diagram illustrating a narrow cell and state information used in the narrow cell according to an embodiment of the present invention.

FIG. 14 is a flowchart of a routine for encoding wide striped cells according to an embodiment of the present invention.

FIG. 15A is a diagram illustrating encoding in a wide striped cell according to an embodiment of the present invention.

FIG. 15B is a diagram illustrating state information used in a wide striped cell according to an embodiment of the present invention.

FIG. 15C is a diagram illustrating end of packet encoding information used in a wide striped cell according to an embodiment of the present invention.

FIG. 15D is a diagram illustrating an example of a cell boundary alignment condition during the transmission of wide striped cells in multiple stripes according to an embodiment of the present invention.

Figure 23A:
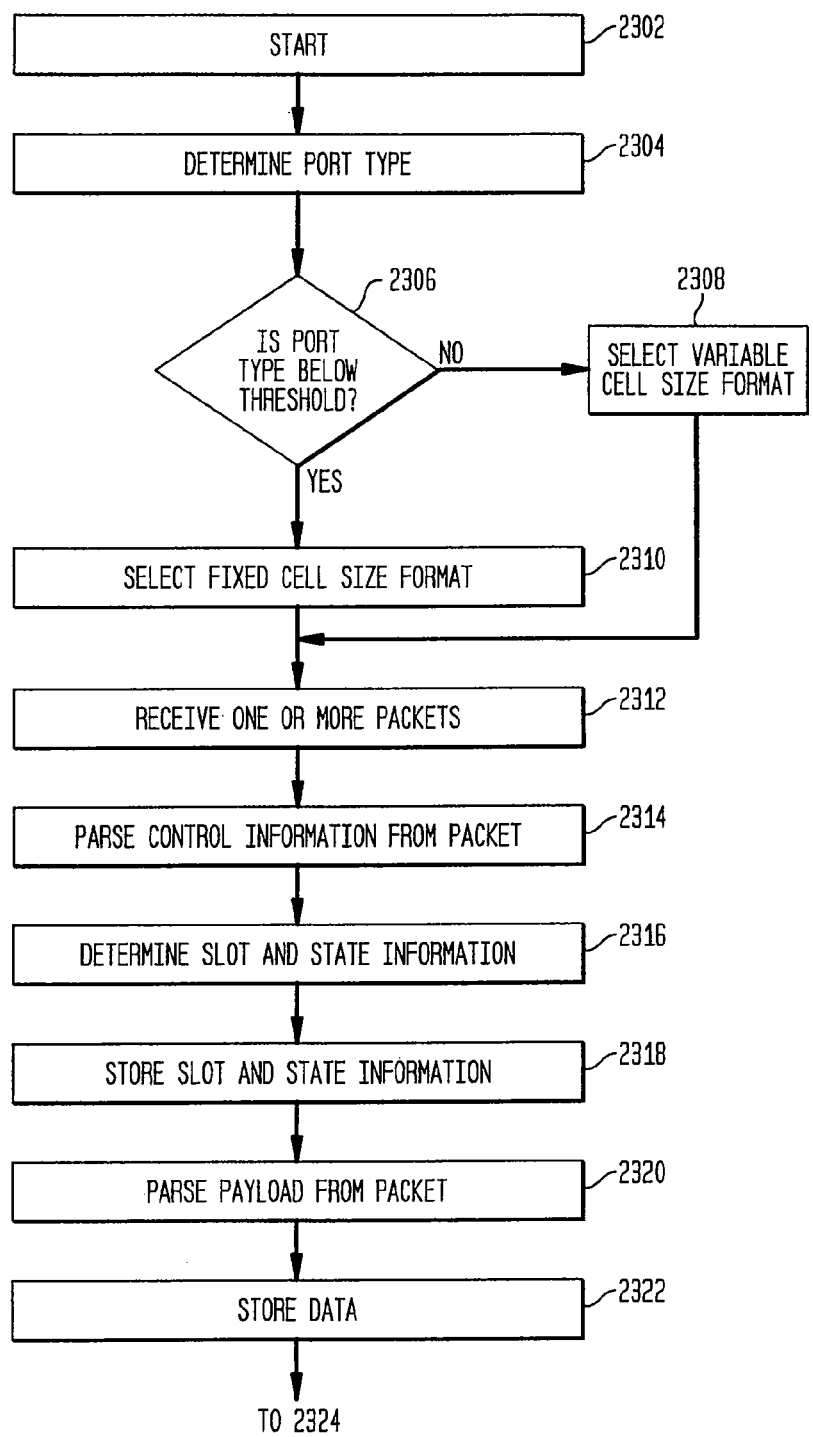

FIGS. 23A-B illustrates a detailed flow diagram of the encoding process of the bus translator according to one embodiment of the present invention.

FIG. 24 illustrates a flow diagram of the decoding process of the bus translator according to one embodiment of the present invention.

Figure 25B:
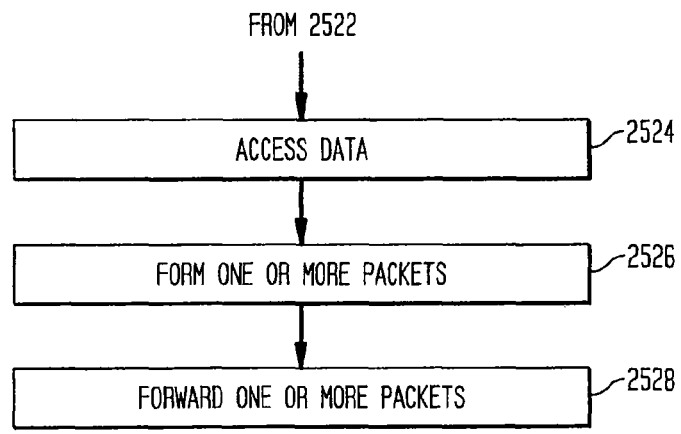

FIGS. 25A-B illustrates a detailed flow diagram of the decoding process of the bus translator according to one embodiment of the present invention.

Figure 26:
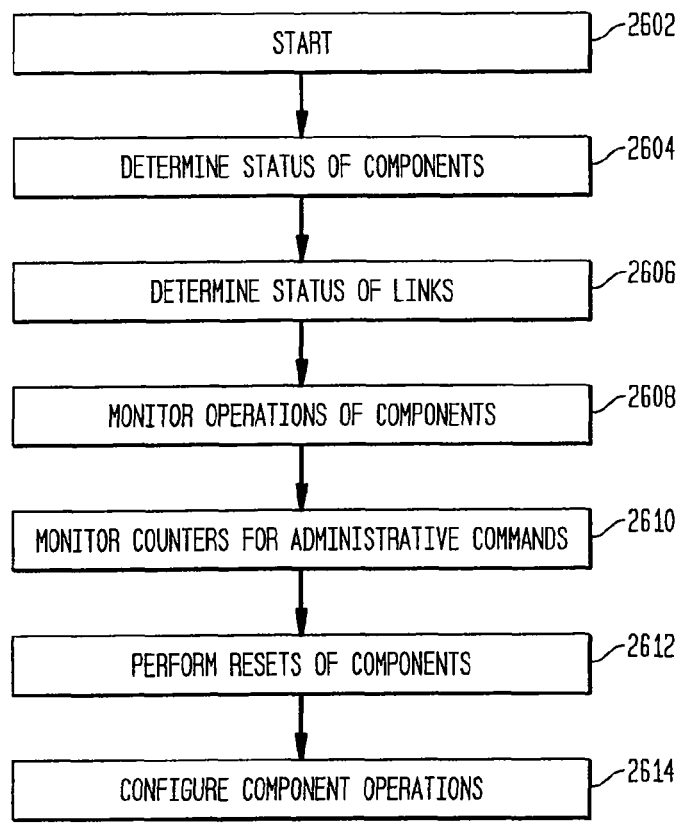

FIG. 26 illustrates a flow diagram of the administrating process of the bus translator according to one embodiment of the present invention.

FIGS. 27A-27E show a routine for processing data in port slice based on wide cell encoding and a flow control condition according to one embodiment of the present invention.

Figure 28A:
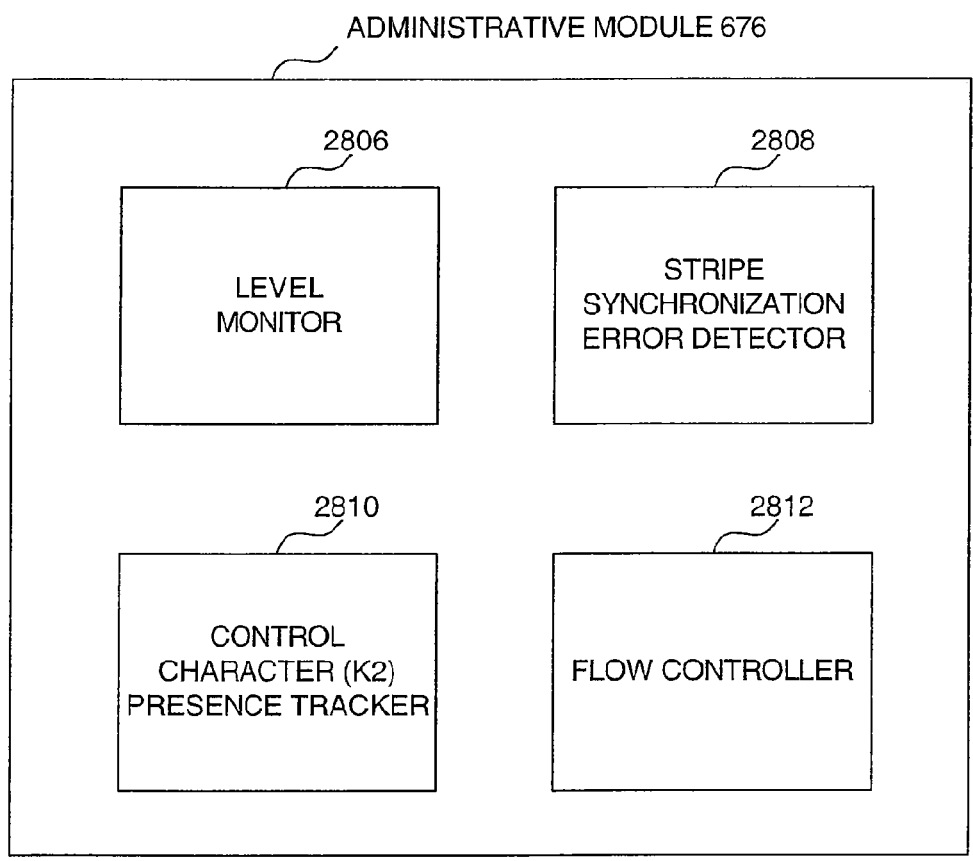

FIG. 28A shows a block diagram of an administrative module according to one embodiment of the present invention.

Figure 28B:
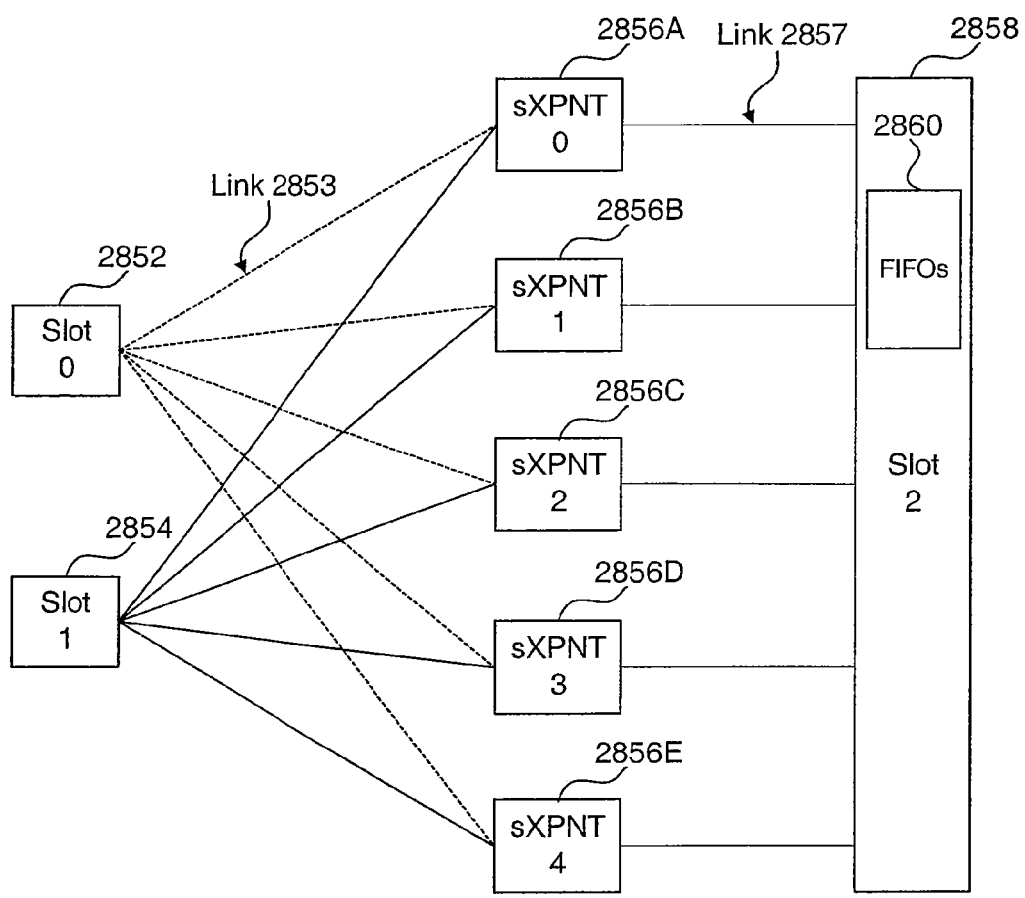

FIG. 28B shows a block diagram of the cross point architecture according to one embodiment of the present invention.

Figure 29:
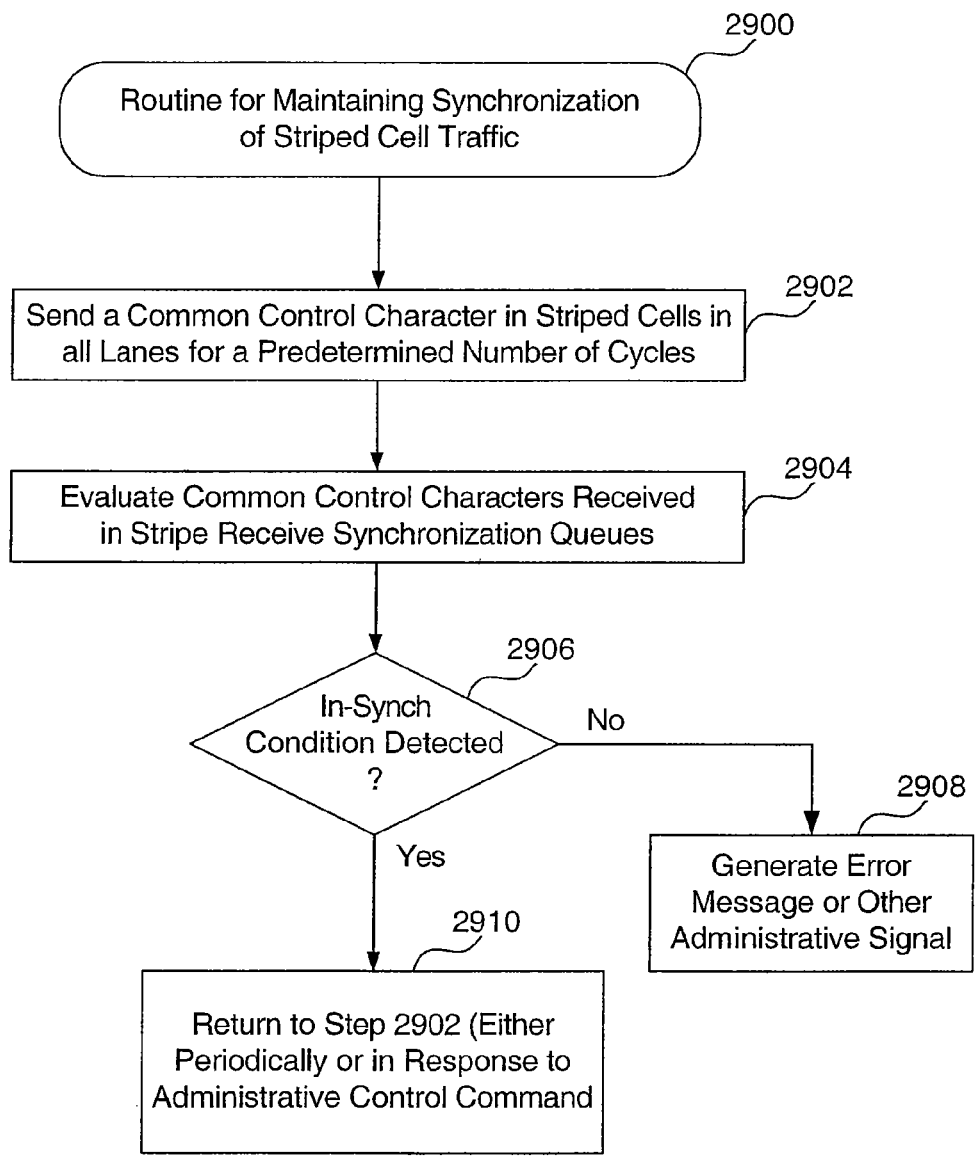

FIG. 29 illustrates a routine for maintaining synchronization of striped cell traffic according to one embodiment of the present invention.

Figure 30:
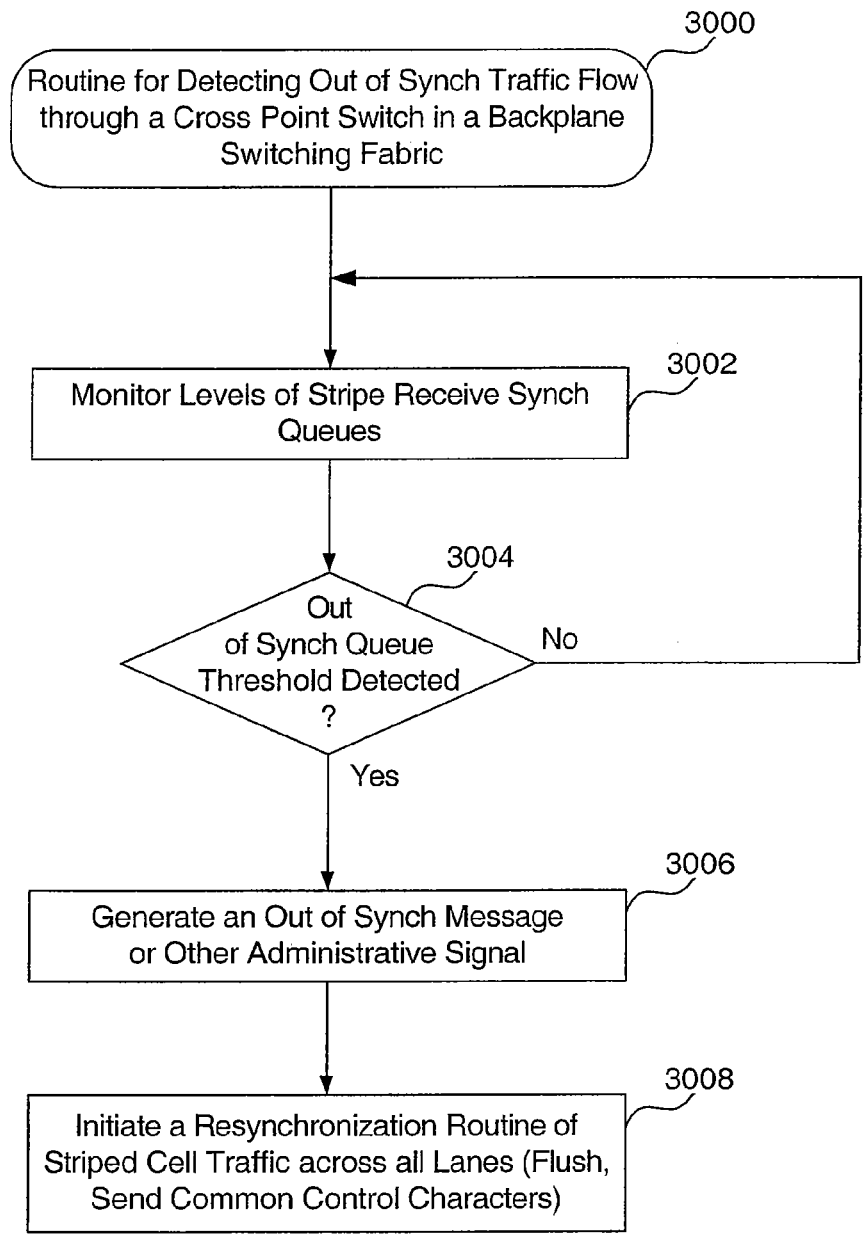

FIG. 30 illustrates a routine for detecting out of synchronization traffic flow through a cross point switch with a backplane switching fabric according to one embodiment of the present invention.

Figure 31:
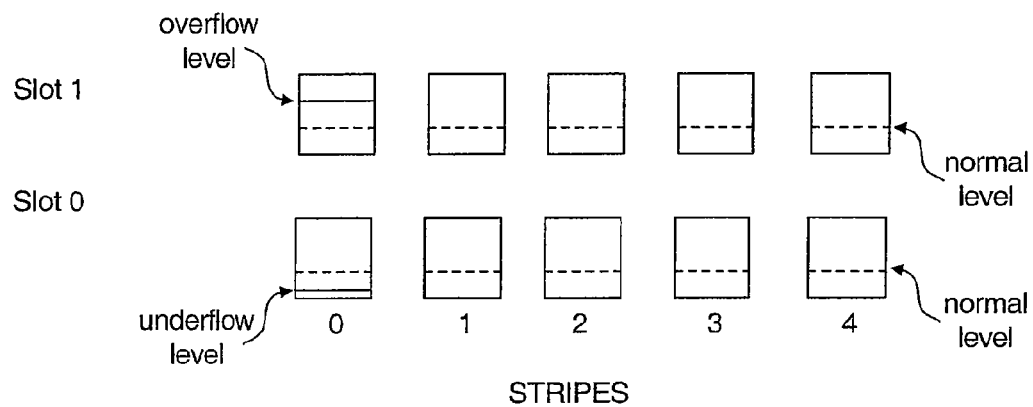

FIG. 31 shows an example of how an error condition in an incoming link is evident in the levels of data present in receiving blade synch queues sorted by stripe and source according to one embodiment of the present invention.

Figure 32A:
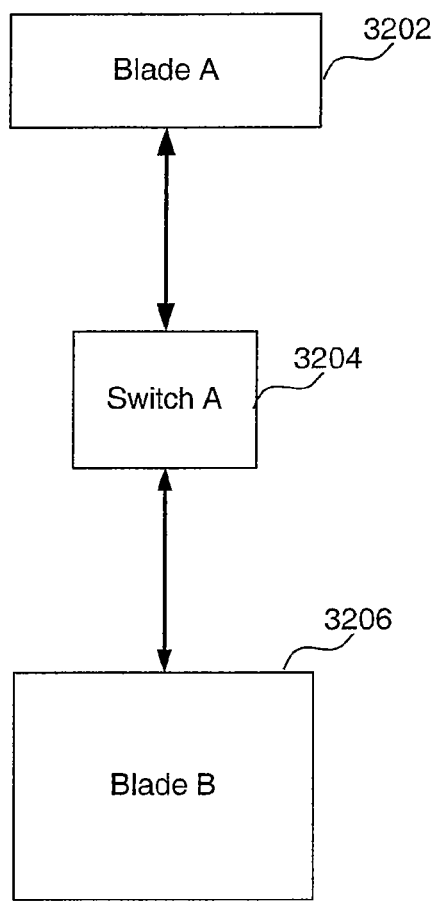
Figure 32B:
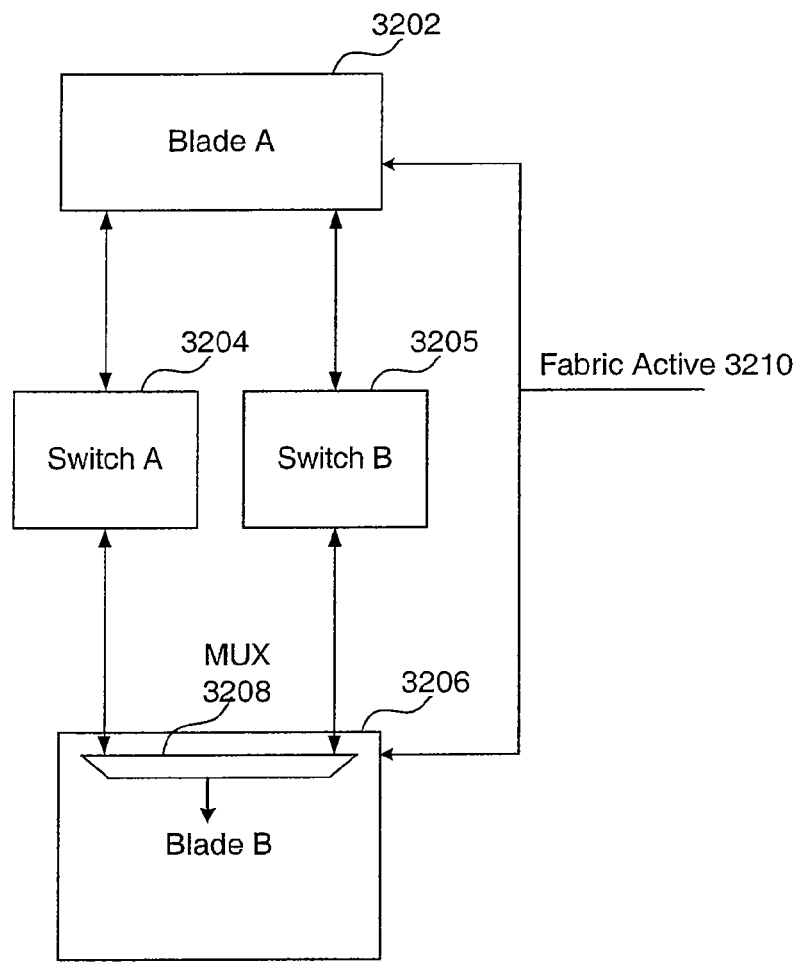

FIGS. 32A-B show block diagrams of example architectures according to embodiments of the present invention.

Figure 33A:
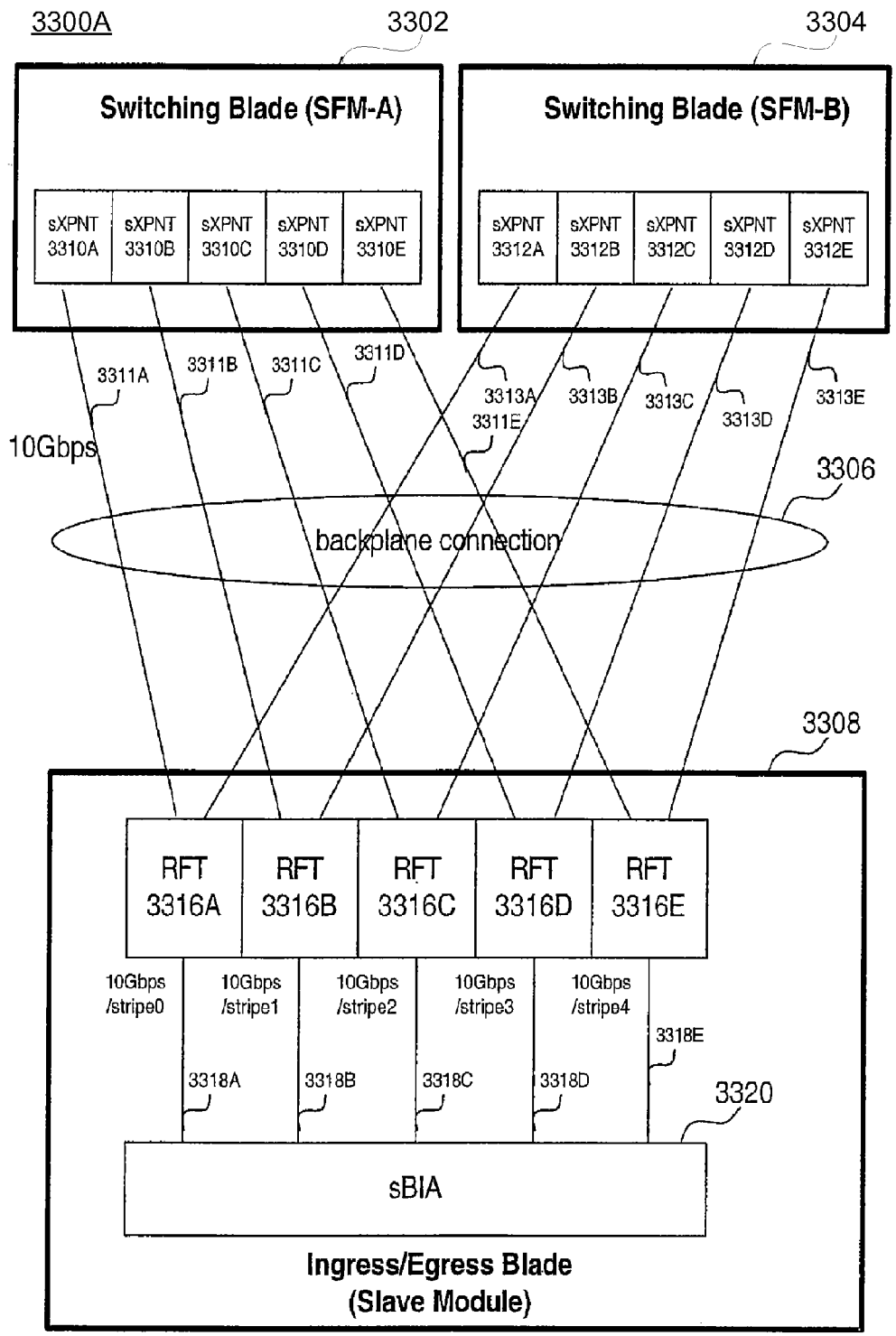

FIG. 33A shows a block diagram of a redundant fabric transceiver enabled blade module according to one embodiment of the present invention.

Figure 33B:
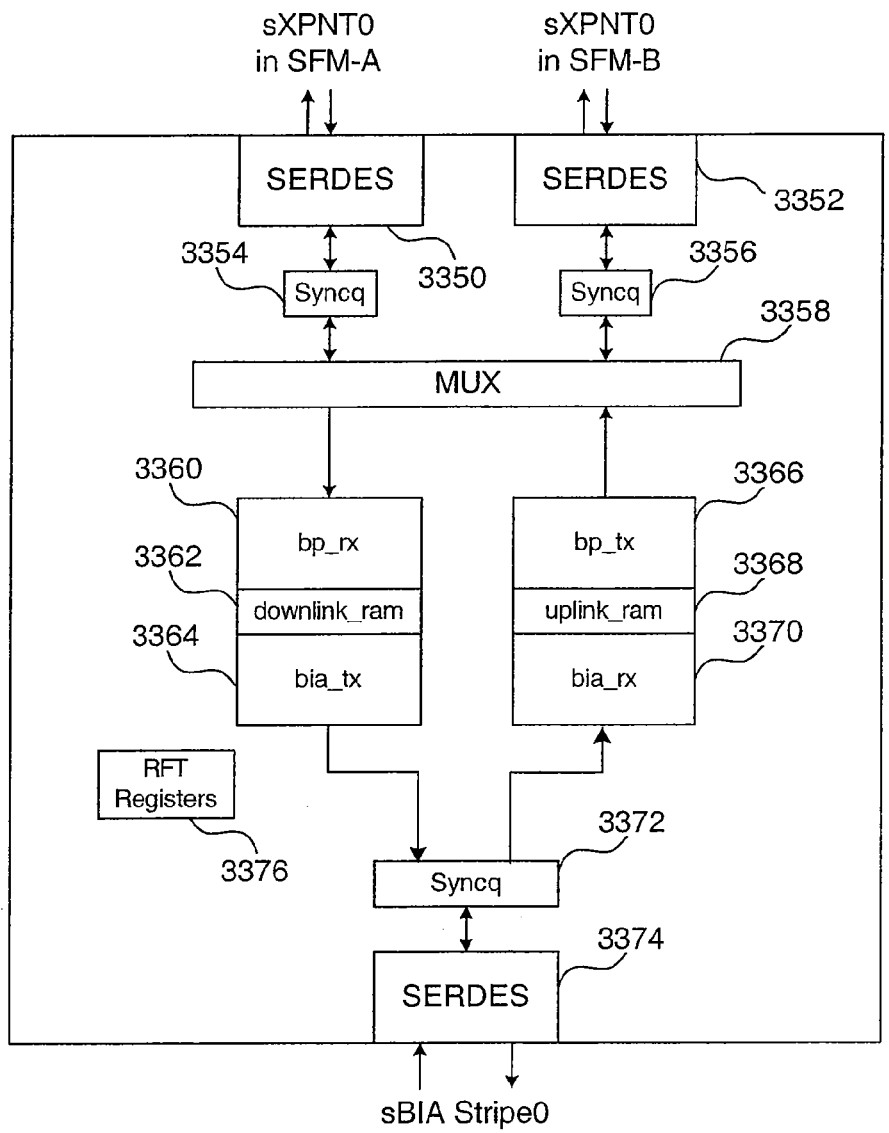

FIG. 33B shows a block diagram of a redundant fabric transceiver according to one embodiment of the present invention.

FIG. 34A shows a table showing the cell characters across five stripes according to one embodiment of the present invention.

Figure 34B:
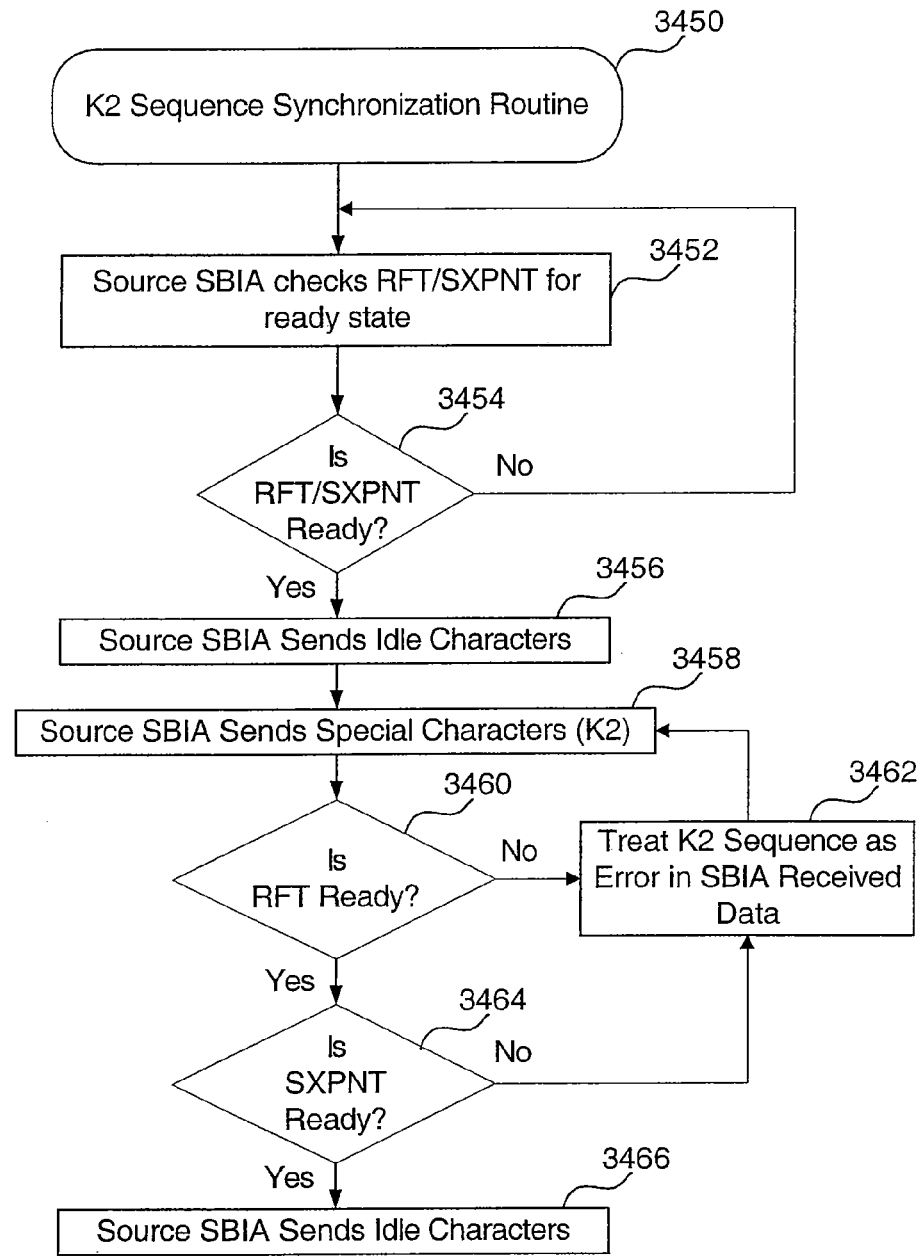

FIG. 34B illustrates a routine for a K2 (special character) synchronization sequence according to one embodiment of the present invention.

Figure 35:
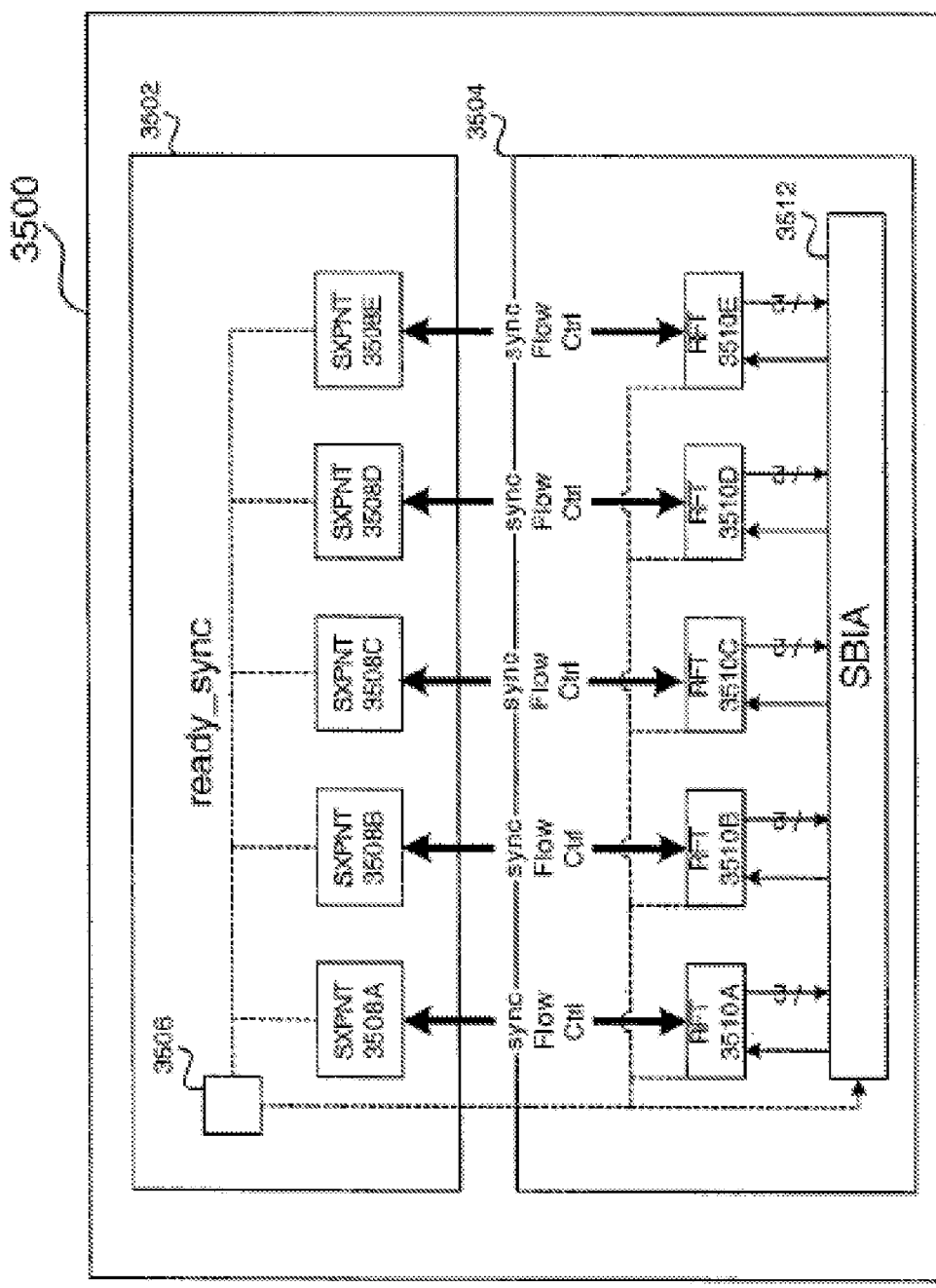

FIG. 35 shows a block diagram of a synchronous flow control implementation of the redundant fabric transceivers according to one embodiment of the present invention.

Figure 36:
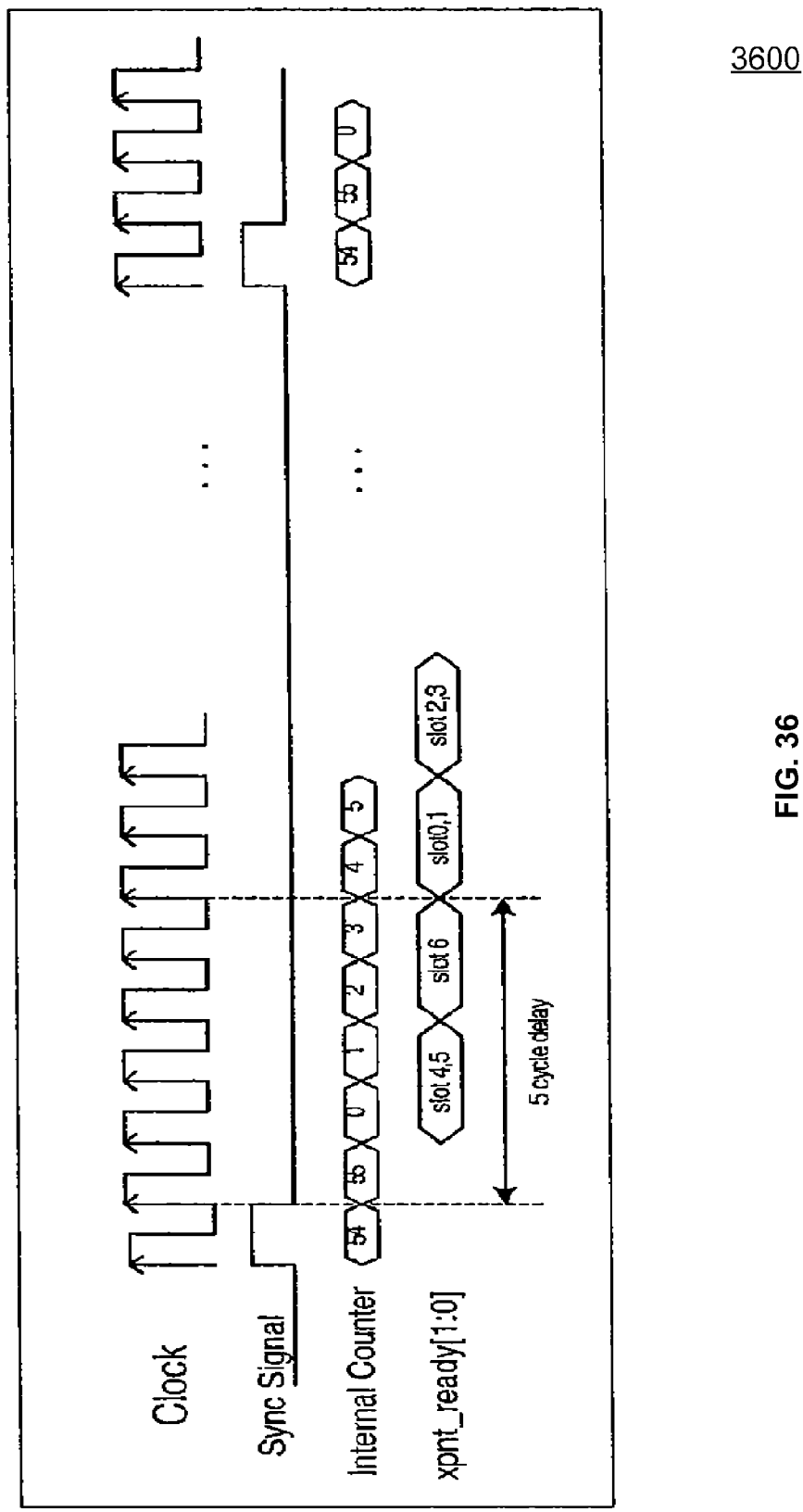

FIG. 36 shows a timing diagram of the time domain multiplexing of a synchronous flow control implementation according to one embodiment of the present invention.

Figure 37:
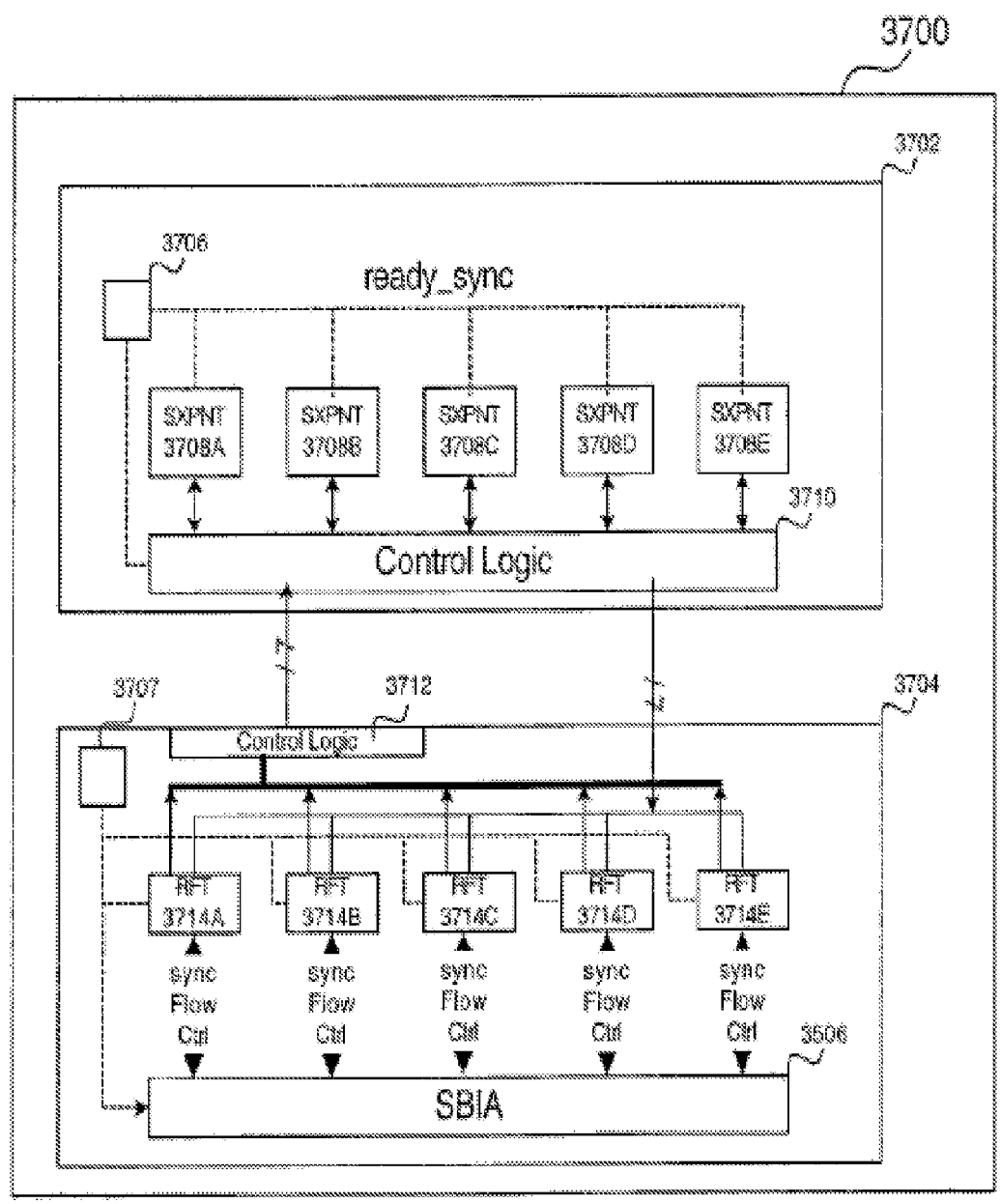

FIG. 37 shows a block diagram of an asynchronous flow control implementation of the redundant fabric transceivers according to one embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents
I. Overview and Discussion
II. Terminology
III. Digital Switch Architecture
    A. Cross Point Architecture
    B. Port Slice Operation with Wide Cell Encoding and Flow Control
    C. Backplane Interface Adapter
    D. Overall Operation of Backplane Interface Adapter
    E. First Traffic Processing Path
    F. Narrow Cell Format
    G. Traffic Sorting
    H. Wide Striped Cell Generation
    I. Encoding Wide Striped Cells
    J. Initial Block Encoding
    K. End of Packet Encoding
    L. Switching Fabric Transmit Arbitration
    M. Cross Point Processing of Stripes
    N. Second Traffic Processing Path
    O. Cell Boundary Alignment
    P. Packet Alignment
    Q. Wide Striped Cell Size at Line Rate
    R. IBT and Packet Processing
    S. Narrow Cell and Packet Encoding Processes
    T. Administrative Process and Error Control
    U. Reset and Recovery Procedures
IV. Control Logic
V. Conclusion

I. OVERVIEW AND DISCUSSION

The present invention is a high-performance digital switch. Blades are coupled through serial pipes to a switching fabric. Serial link technology is used in the switching fabric. Serial data streams, rather than parallel data streams, are switched through a loosely striped switching fabric. Blades output serial data streams in the serial pipes. A serial pipe can be a number of serial links coupling a blade to the switching fabric. The serial data streams represent an aggregation of input serial data streams provided through physical ports to a respective blade. Each blade outputs serial data streams with in-band control information in multiple stripes to the switching fabric. In one embodiment, the serial data streams carry packets of data in wide striped cells across multiple loosely-coupled stripes. Wide striped cells are encoded. In-band control information is carried in one or more blocks of a wide striped cell.

In one implementation, each blade of the switch is capable of sending and receiving 50 gigabit per second full-duplex traffic across the backplane. This is done to assure line rate, wire speed and non-blocking across all packet sizes.

The high-performance switch according to the present invention can be used in any switching environment, including but not limited to, the Internet, an enterprise system, Internet service provider, and any protocol layer switching (such as, Layer 2, Layer 3, or Layers 4-7 switching).

The present invention is described in terms of this example environment. Description in these terms is provided for convenience only. It is not intended that the invention be limited to application in these example environments. In fact, after reading the following description, it will become apparent to a person skilled in the relevant art how to implement the invention in alternative environments known now or developed in the future.

II. TERMINOLOGY

To more clearly delineate the present invention, an effort is made throughout the specification to adhere to the following term definitions as consistently as possible.

The terms "switch fabric" or "switching fabric" refer to a switchable interconnection between blades. The switch fabric can be located on a backplane, a blade, more than one blade, a separate unit from the blades, or on any combination thereof.

The term "packet processor" refers to any type of packet processor, including but not limited to, an Ethernet packet processor. A packet processor parses and determines where to send packets.

The term "serial pipe" refers to one or more serial links. In one embodiment, not intended to limit the invention, a serial pipe is a 10 Gbps serial pipe and includes four 2.5 Gbps serial links.

The term "serial link" refers to a data link or bus carrying digital data serially between points. A serial link at a relatively high bit rate can also be made of a combination of lower bit rate serial links.

The term "stripe" refers to one data slice of a wide cell. The term "loosely-coupled" stripes refers to the data flow in stripes which is autonomous with respect to other stripes. Data flow is not limited to being fully synchronized in each of the stripes, rather, data flow proceeds independently in each of the stripes and can be skewed relative to other stripes.

III. DIGITAL SWITCH ARCHITECTURE

Figure 1:
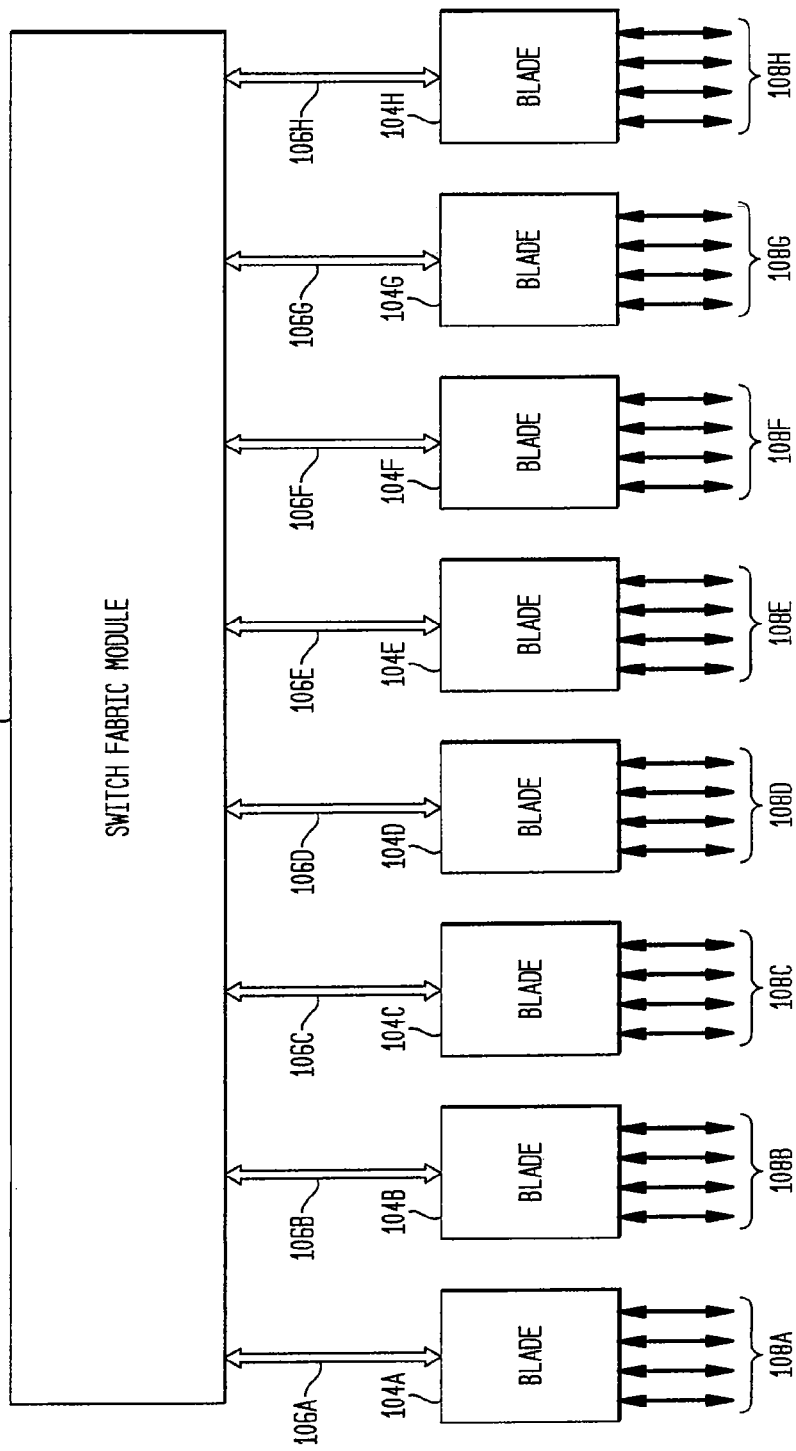
FIG. 1 is a diagram of a high-performance network switch according to an embodiment of the present invention.

An overview of the architecture of the switch 100 of the invention is illustrated in FIG. 1. Switch 100 includes a switch fabric 102 (also called a switching fabric or switching fabric module) and a plurality of blades 104. In one embodiment of the invention, switch 100 includes 8 blades 104a-104h. Each blade 104 communicates with switch fabric 102 via serial pipe 106. Each blade 104 further includes a plurality of physical ports 108 for receiving various types of digital data from one or more network connections.

In a preferred embodiment of the invention, switch 100 having 8 blades is capable of switching of 400 gigabits per second (Gbps) full-duplex traffic. As used herein, all data rates are full-duplex unless indicated otherwise. Each blade 104 communicates data at a rate of 50 Gbps over serial pipe 106.

Figure 2:
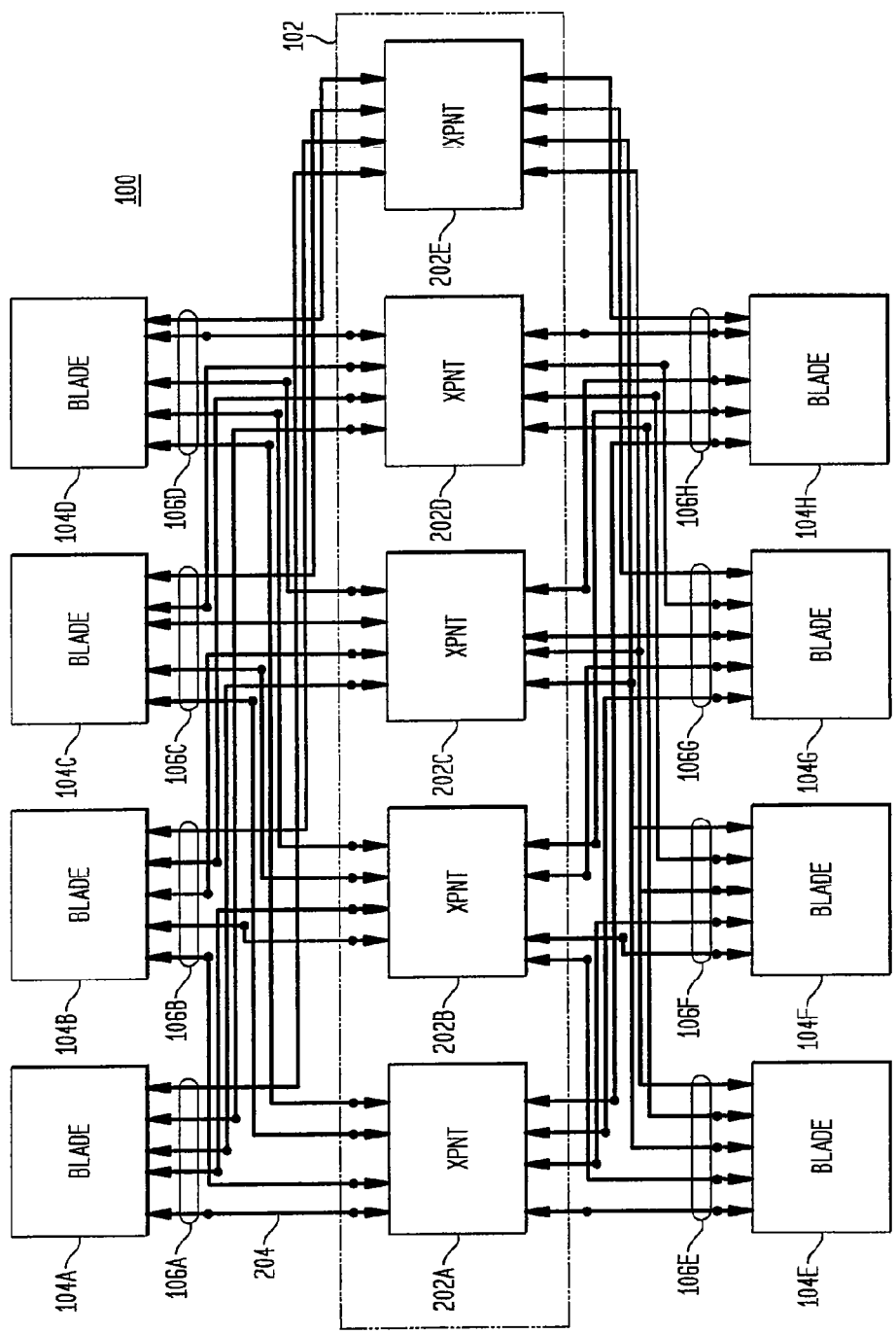
FIG. 2 is a diagram of a high-performance network switch showing a switching fabric having cross point switches coupled to blades according to an embodiment of the present invention.

Switch 100 is shown in further detail in FIG. 2. As illustrated, switch fabric 102 comprises five cross points 202. Data sent and received between each blade and switch fabric 102 is striped across the five cross point chips 202A-202E. Each cross point 202A-202E then receives one stripe or ⅕ of the data passing through switch fabric 102. As depicted in FIG. 2, each serial pipe 106 of a blade 104 is made up of five serial links 204. The five serial links 204 of each blade 104 are coupled to the five corresponding cross points 202. In one example, each of the serial links 204 is a 10G serial link, such as, a 10G serial link made up of 4-2.5 Gbps serial links. In this way, serial link technology is used to send data across the backplane 102.

Each cross point 202A-202E is an 8-port cross point. In one example, each cross point 2202A-E receives eight 10G streams of data. Each stream of data corresponds to a particular stripe. The stripe has data in a wide-cell format which includes, among other things, a destination port number (also called a destination slot number) and special in-band control information. The in-band control information includes special K characters, such as, a K0 character and K1 character.

The K0 character delimits a start of new cell within a stripe. The K1 character delimits an end of a packet within the stripe. Such encoding within each stripe, allows each cross point 202A-202E to operate autonomously or independently of other cross points. In this way, the cross points 202A-202E and their associated stripes are loosely-coupled.

In each cross point 202, there are a set of data structures, such as data FIFOs (First in First out data structures). The data structures store data based on the source port and the destination port. In one embodiment, for an 8-port cross point, 56 data FIFOs are used. Each data FIFO stores data associated with a respective source port and destination port. Packets coming to each source port are written to the data FIFOs which correspond to a source port and a destination port associated with the packets. The source port is associated with the port (and port slice) on which the packets are received. The destination port is associated with a destination port or slot number which is found in-band in data sent in a stripe to a port.

In embodiments of the present invention, the switch size is defined as one cell and the cell size is defined to be either 8, 28, 48, 68, 88, 108, 128, or 148 bytes. Each port (or port slice) receives and sends serial data at a rate of 10 Gbps from respective serial links. Each cross point 202A-202E has a 160 Gbps switching capacity (160 Gbps=10 Gbps*8 ports*2 directions full-duplex). Such cell sizes, serial link data rate, and switching capacity are illustrative and not necessarily intended to limit the present invention. Cross-point architecture and operation is described further below.

In attempting to increase the throughput of switches, conventional wisdom has been to increase the width of data buses to increase the "parallel processing" capabilities of the switch and to increase clock rates. Both approaches, however, have met with diminishing returns. For example, very wide data buses are constrained by the physical limitations of circuit boards. Similarly, very high clock rates are limited by characteristics of printed circuit boards. Going against conventional wisdom, the inventors have discovered that significant increases in switching bandwidth could be obtained using serial link technology in the backplane.

In the preferred embodiment, each serial pipe 106 is capable of carrying full-duplex traffic at 50 Gbps, and each serial link 204 is capable of carrying full-duplex traffic at 10 Gbps. The result of this architecture is that each of the five cross points 202 combines five 10 gigabit per second serial links to achieve a total data rate of 50 gigabits per second for each serial pipe 106. Thus, the total switching capacity across backplane 102 for eight blades is 50 gigabits per second times eight times two (for duplex) or 800 gigabits per second. Such switching capacities have not been possible with conventional technology using synched parallel data buses in a switching fabric.

An advantage of such a switch having a 50 Gbps serial pipe to backplane 102 from a blade 104 is that each blade 104 can support across a range of packet sizes four 10 Gbps Ethernet packet processors at line rate, four Optical Channel OC-192C at line rate, or support one OC-768C at line rate. The invention is not limited to these examples. Other configurations and types of packet processors and can be used with the switch of the present invention as would be apparent to a person skilled in the art given this description.

Referring now to FIG. 3A, the architecture of a blade 104 is shown in further detail. Blade 104 comprises a backplane interface adapter (BIA) 302 (also referred to as a "super backplane interface adapter" or SBIA), a plurality of Integrated Bus Translators (IBT) 304 and a plurality of packet processors 306. BIA 302 is responsible for striping the data across the five cross points 202 of backplane 102. In a preferred embodiment, BIA 302 is implemented as an application-specific circuit (ASIC). BIA 302 receives data from packet processors 306 through IBTs 304 (or directly from compatible packet processors). BIA 302 may pass the data to backplane 102 or may perform local switching between the local ports on blade 104. In a preferred embodiment, BIA 302 is coupled to four serial links 308. Each serial link 308 is coupled to an IBT 304.

Each packet processor 306 includes one or more physical ports. Each packet processor 306 receives inbound packets from the one or more physical ports, determines a destination of the inbound packet based on control information, provides local switching for local packets destined for a physical port to which the packet processor is connected, formats packets destined for a remote port to produce parallel data and switches the parallel data to an IBT 304. Each IBT 304 receives the parallel data from each packet processor 306. IBT 304 then converts the parallel data to at least one serial bit streams. IBT 304 provides the serial bit stream to BIA 302 via a pipe 308, described herein as one or more serial links. In a preferred embodiment, each pipe 308 is a 10 Gb/s XAUI interface.

In the example illustrated in FIG. 3A, packet processors 306C and 306D comprise 24-ten or 100 megabit per second Ethernet ports, and two 1000 megabit per second or 1 Gbps Ethernet ports. Before the data is converted, the input data packets are converted to 32-bit parallel data clock data 133 MHz to achieve a four Gbps data rate. The data is placed in cells (also called "narrow cells") and each cell includes a header which merges control signals in-band with the data stream. Packets are interleaved to different destination slots every 32 by cell boundary.

Also in the example of FIG. 3A, IBT 304C is connected to packet processors 306C and 306D. In this example, IBT 304A is connected to a packet processor 306A. This may be, for example, a ten gigabit per second OC-192 packet processor. In these examples, each IBT 304 will receive as its input a 64-bit wide data stream clocked at 156.25 MHz. Each IBT 304 will then output a 10 gigabit per second serial data stream to BIA 302. According to one narrow cell format, each cell includes a 4 byte header followed by 32 bytes of data. The 4 byte header takes one cycle on the four XAUI lanes. Each data byte is serialized onto one XAUI lane.

BIA 302 receives the output of IBTs 304A-304D. Thus, BIA 302 receives 4 times 10 Gbps of data. Or alternatively, 8 times 5 gigabit per second of data. BIA 302 runs at a clock speed of 156.25 MHz. With the addition of management overhead and striping, BIA 302 outputs 5 times 10 gigabit per second data streams to the five cross points 202 in backplane 102.

BIA 302 receives the serial bit streams from IBTs 304, determines a destination of each inbound packet based on packet header information, provides local switching between local IBTs 304, formats data destined for a remote port, aggregates the serial bit streams from IBTs 304 and produces an aggregate bit stream. The aggregated bit stream is then striped across the five cross points 202A-202E.

FIG. 3B shows a configuration of blade 104 according another embodiment of the present invention. In this configuration, BIA 302 receives output on serial links from a 10 Gbps packet processor 316A, IBT 304C, and an Optical Channel OC-192C packet processor 316B. IBT 304 is further coupled to packet processors 306C, 306D as described above. 10 Gbps packet processor 316A outputs a serial data stream of narrow input cells carrying packets of data to BIA 302 over serial link 318A. IBT 304C outputs a serial data stream of narrow input cells carrying packets of data to BIA 302 over serial link 308C. Optical Channel OC-192C packet processor 316B outputs two serial data streams of narrow input cells carrying packets of data to BIA 302 over two serial links 318B, 318C.

A. Cross Point Architecture

Figure 4:
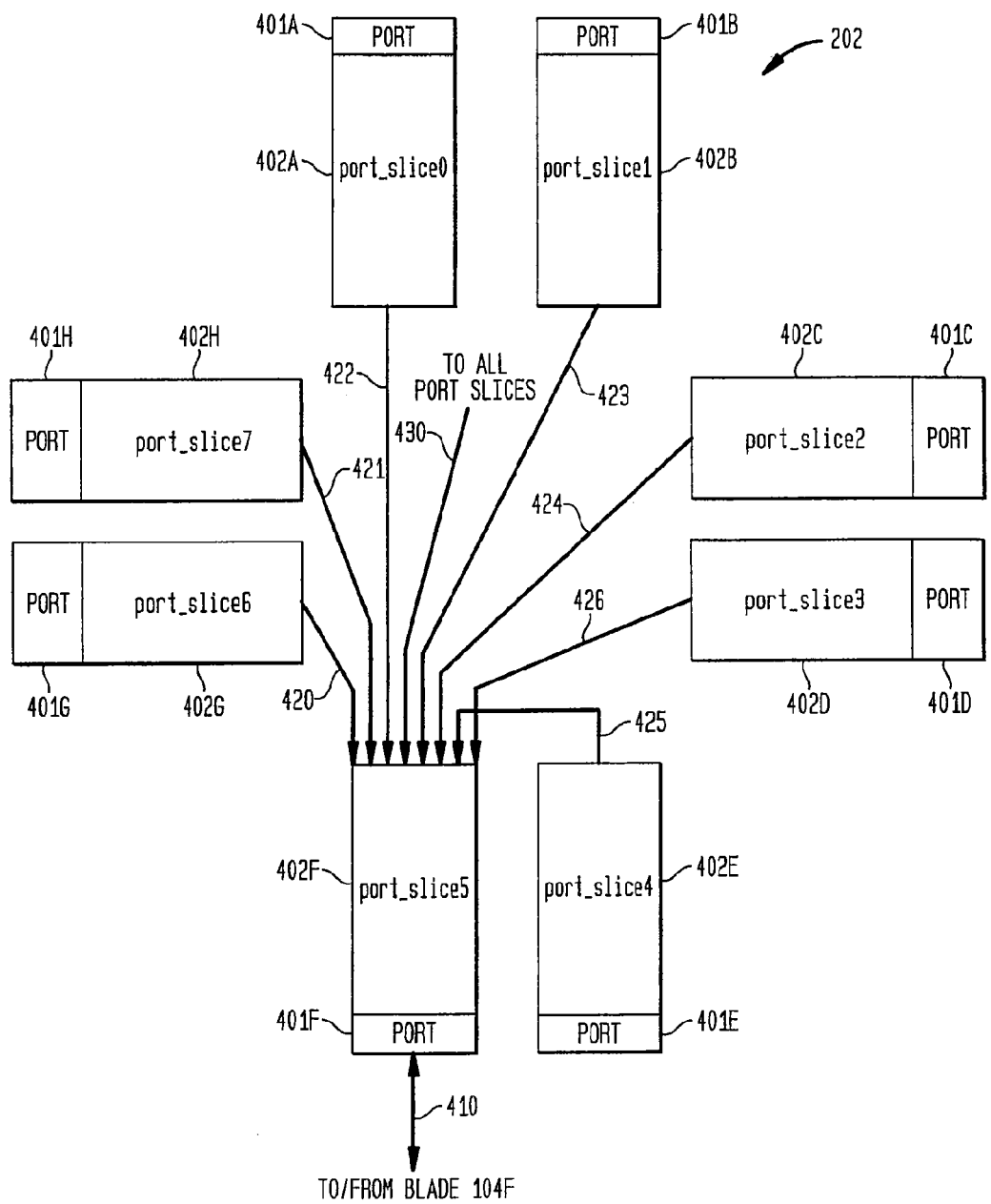
FIG. 4 is a diagram of the architecture of a cross point switch with port slices according to an embodiment of the present invention.

FIG. 4 illustrates the architecture of a cross point 202. Cross point 202 includes eight ports 401A-401H coupled to eight port slices 402A-402H. As illustrated, each port slice 402 is connected by a wire 404 (or other connective media) to each of the other seven port slices 402. Each port slice 402 is also coupled to through a port 401a respective blade 104. To illustrate this, FIG. 4 shows connections for port 401F and port slice 402F (also referred to as port_slice 5). For example, port 401F is coupled via serial link 410 to blade 104F. Serial link 410 can be a 10G full-duplex serial link.

Port slice 402F is coupled to each of the seven other port slices 402A-402E and 402G-402H through links 420-426. Links 420-426 route data received in the other port slices 402A-402E and 402G-402H which has a destination port number (also called a destination slot number) associated with a port of port slice 402F (i.e. destination port number 5). Finally, port slice 402F includes a link 430 that couples the port associated with port slice 402F to the other seven port slices. Link 430 allows data received at the port of port slice 402F to be sent to the other seven port slices. In one embodiment, each of the links 420-426 and 430 between the port slices are buses to carry data in parallel within the cross point 202. Similar connections (not shown in the interest of clarity) are also provided for each of the other port slices 402A-402E, 402G and 402H.

Figure 5:
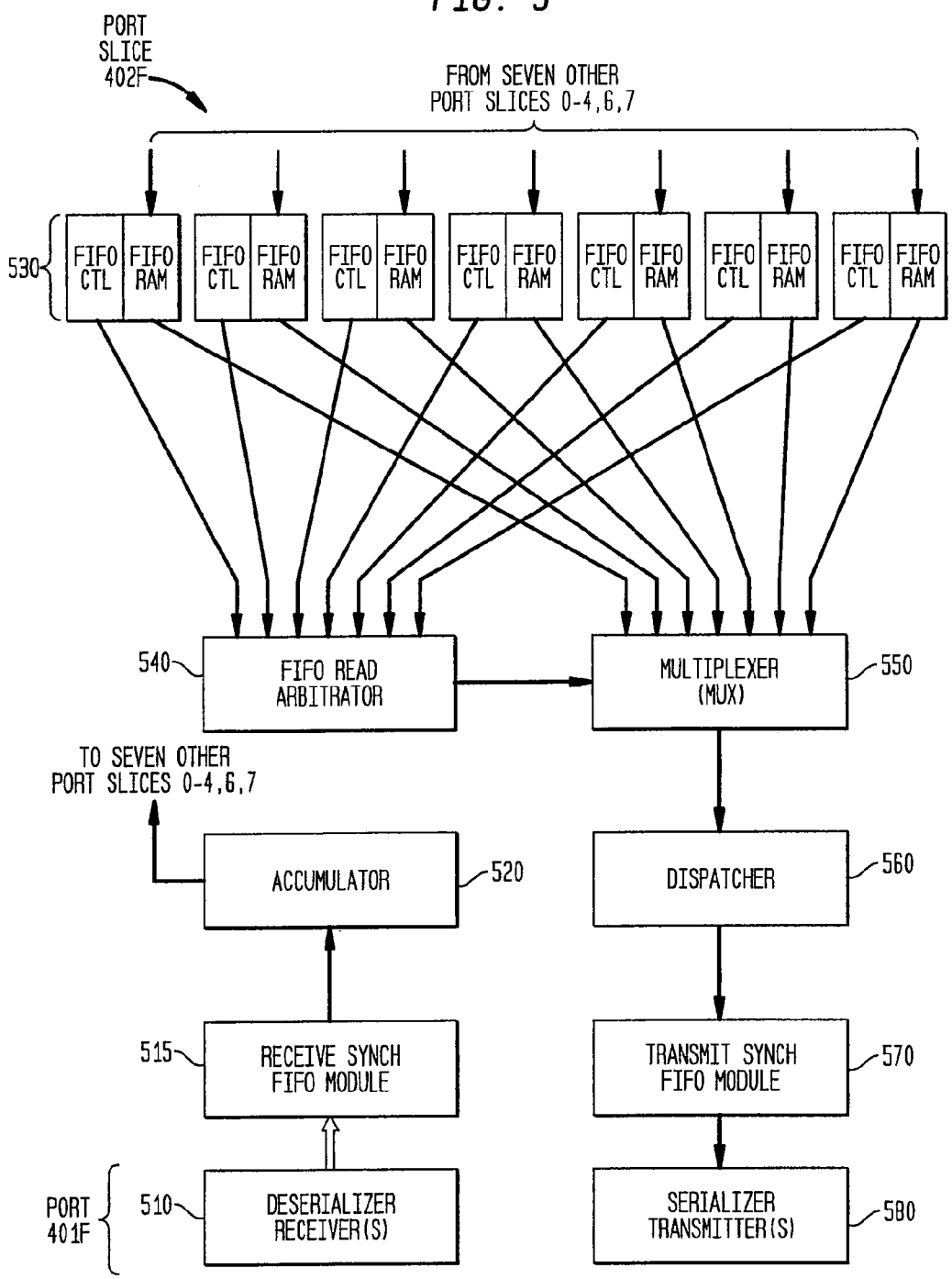
FIG. 5 is a diagram of the architecture of a port slice according to an embodiment of the present invention.

FIG. 5 illustrates the architecture of port 401F and port slice 402F in further detail. The architecture of the other ports 401A-401E, 401G, and 401H and port slices 402A-402E, 402G and 402H is similar to port 401F and port slice 402F. Accordingly, only port 401F and port slice 402F need be described in detail. Port 401F includes one or more deserializer receiver(s) 510 and serializer transmitter(s) 580. In one embodiment, deserializer receiver(s) 510 and serializer transmitter(s) 580 are implemented as serializer/deserializer circuits (SERDES) that convert data between serial and parallel data streams. In embodiments of the invention, port 401F can be part of port slice 402F on a common chip, or on separate chips, or in separate units.

Port slice 402F includes a receive synch FIFO module 515 coupled between deserializer receiver(s) 510 and accumulator 520. Receive synch FIFO module 515 stores data output from deserializer receivers 510 corresponding to port slice 402F. Accumulator 520 writes data to an appropriate data FIFO (not shown) in the other port slices 402A-402E, 402G, and 402H based on a destination slot or port number in a header of the received data.

Port slice 402F also receives data from other port slices 402A-402E, 402G, and 402H. This data corresponds to the data received at the other seven ports of port slices 402A-402E, 402G, and 402H which has a destination slot number corresponding to port slice 402F. Port slice 402F includes seven data FIFOs 530 to store data from corresponding port slices 402A-402E, 402G, and 402H. Accumulators (not shown) in the seven port slices 402A-402E, 402G, and 402H extract the destination slot number associated with port slice 402F and write corresponding data to respective ones of seven data FIFOs 530 for port slice 402F. As shown in FIG. 5, each data FIFO 530 includes a FIFO controller and FIFO random access memory (RAM). The FIFO controllers are coupled to a FIFO read arbitrator 540. FIFO RAMs are coupled to a multiplexer 550. FIFO read arbitrator 540 is further coupled to multiplexer 550. Multiplexer 550 has an output coupled to dispatcher 560. Dispatch 560 has an output coupled to transmit synch FIFO module 570. Transmit synch FIFO module 570 has an output coupled to serializer transmitter(s) 580.

During operation, the FIFO RAMs accumulate data. After a data FIFO RAM has accumulated one cell of data, its corresponding FIFO controller generates a read request to FIFO read arbitrator 540. FIFO read arbitrator 540 processes read requests from the different FIFO controllers in a desired order, such as a round-robin order. After one cell of data is read from one FIFO RAM, FIFO read arbitrator 540 will move on to process the next requesting FIFO controller. In this way, arbitration proceeds to serve different requesting FIFO controllers and distribute the forwarding of data received at different source ports. This helps maintain a relatively even but loosely coupled flow of data through cross points 202.

To process a read request, FIFO read arbitrator 540 switches multiplexer 550 to forward a cell of data from the data FIFO RAM associated with the read request to dispatcher 560. Dispatcher 560 outputs the data to transmit synch FIFO 570. Transmit synch FIFO 570 stores the data until sent in a serial data stream by serializer transmitter(s) 580 to blade 104F.

B. Port Slice Operation with Wide Cell Encoding and Flow Control

According to a further embodiment, a port slice operates with respect to wide cell encoding and a flow control condition. FIGS. 27A-27E show a routine 2700 for processing data in port slice based on wide cell encoding and a flow control condition (steps 2710-2790). In the interest of brevity, routine 2700 is described with respect to an example implementation of cross point 202 and an example port slice 402F. The operation of the other port slices 402A-402E, 402G and 402H is similar.

In step 2710, entries in receive synch FIFO 515 are managed. In one example, receive synch FIFO module 515 is an 8-entry FIFO with write pointer and read pointer initialized to be 3 entries apart. Receive synch FIFO module 515 writes 64-bit data from a SERDES deserialize receiver 510, reads 64-bit data from a FIFO with a clock signal and delivers data to accumulator 520, and maintains a three entry separation between read/write pointers by adjusting the read pointer when the separation becomes less than or equal to 1.

In step 2720, accumulator 520 receives two chunks of 32-bit data are received from receive synch FIFO 515. Accumulator 520 detects a special character K0 in the first bytes of first chunk and second chunk (step 2722). Accumulator 520 then extracts a destination slot number from the state field in the header if K0 is detected (step 2724).

Figure 27A:
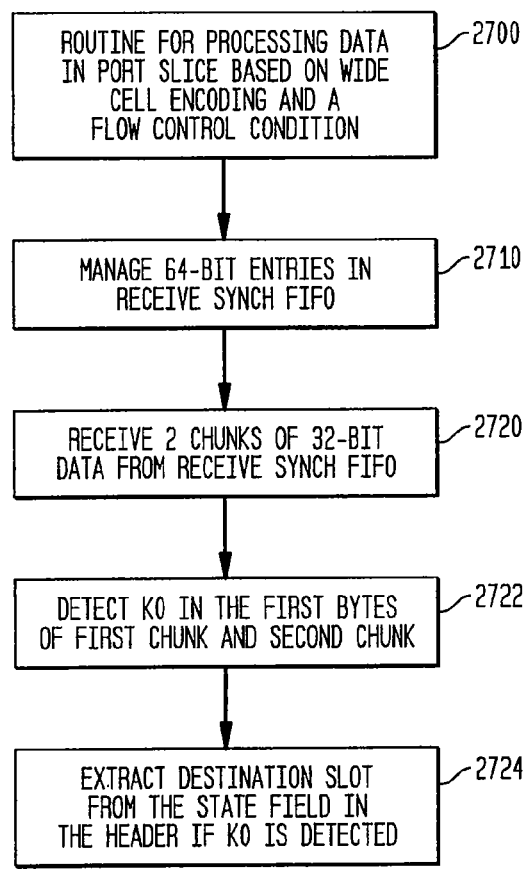
Figure 27B:
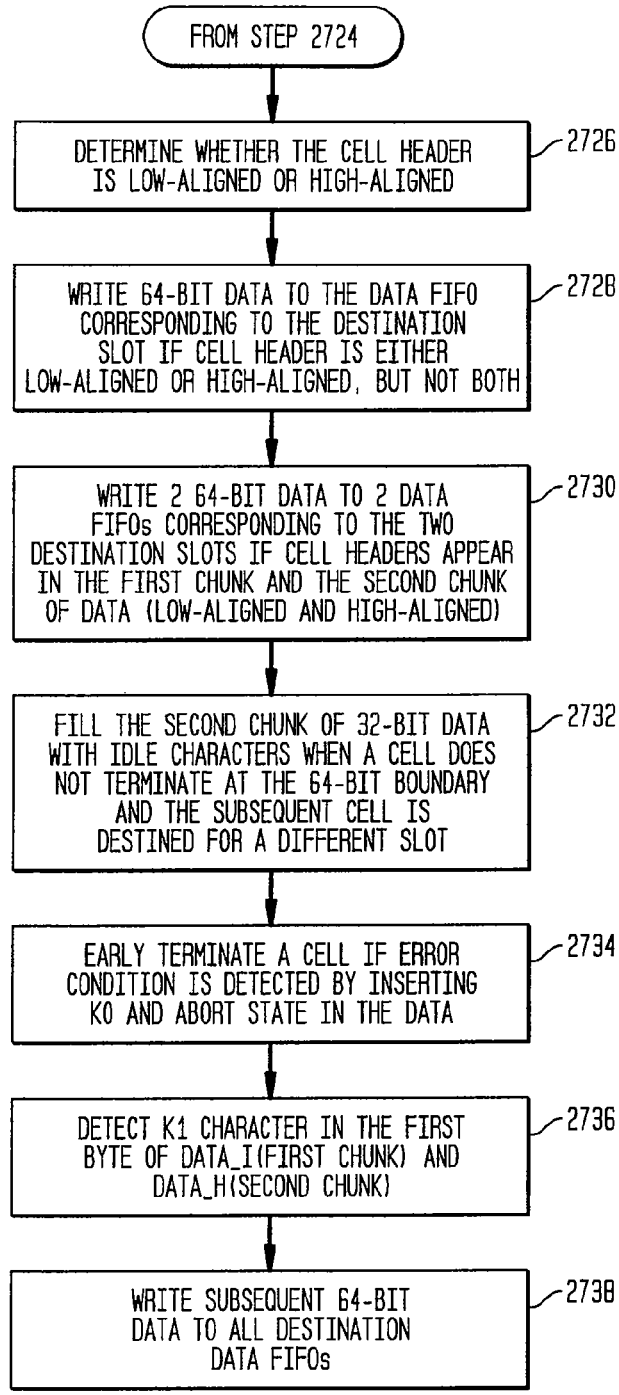

As shown in FIG. 27B, accumulator 520 further determines whether the cell header is low-aligned or high-aligned (step 2726). Accumulator 520 writes 64-bit data to the data FIFO corresponding to the destination slot if cell header is either low-aligned or high-aligned, but not both (step 2728). In step 2730, accumulator 520 writes 2 64-bit data to 2 data FIFOs corresponding to the two destination slots (or ports) if cell headers appear in the first chunk and the second chunk of data (low-aligned and high-aligned). Accumulator 520 then fill the second chunk of 32-bit data with idle characters when a cell does not terminate at the 64-bit boundary and the subsequent cell is destined for a different slot (step 2732). Accumulator 520 performs an early termination of a cell if an error condition is detected by inserting K0 and ABORT state information in the data (step 2734). When accumulator 520 detects a K1 character in the first byte of data_l(first chunk) and data_h (second chunk) (step 2736), and accumulator 520 writes subsequent 64-bit data to all destination data FIFOs (step 2738).

Figure 27C:
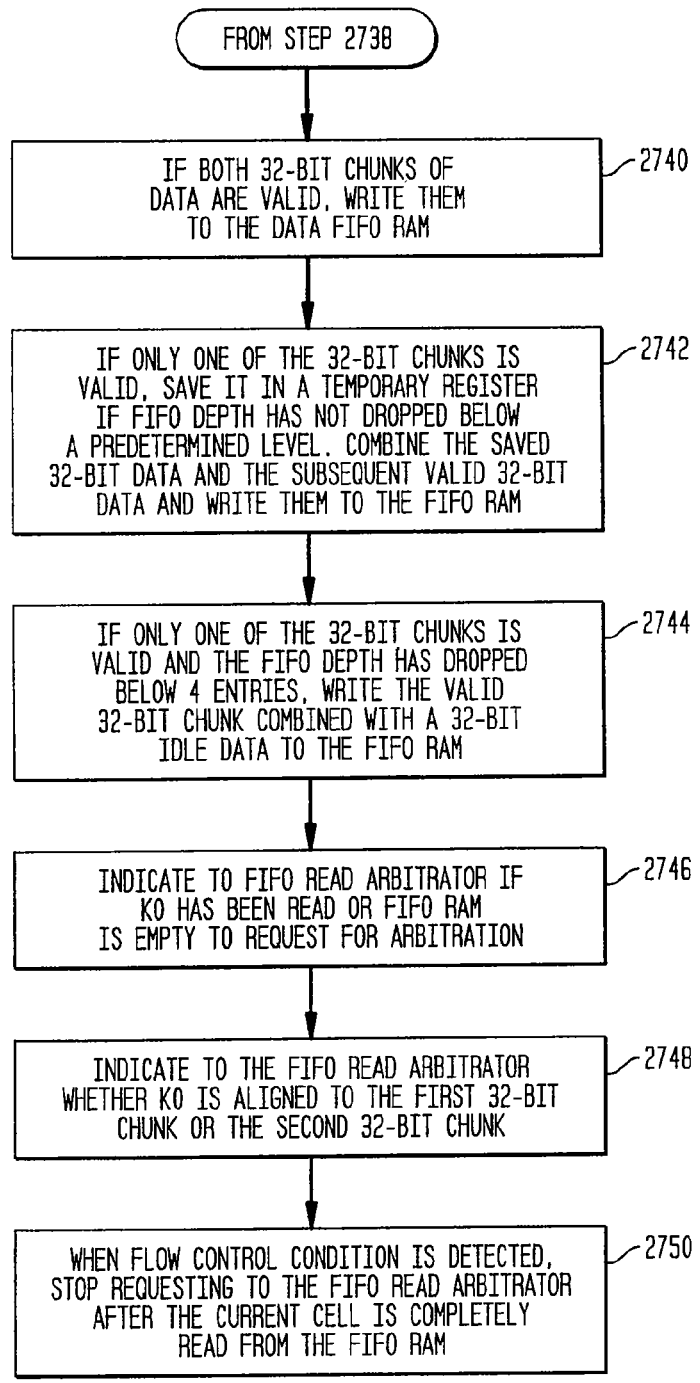

As shown in FIG. 27C, in step 2740, if two 32-bit chunks of data are valid, then they are written to data FIFO RAM in one of data FIFOs 530. In step 2742, if only one of the 32-bit chunks is valid, it is saved in a temporary register if FIFO depth has not dropped below a predetermined level. The saved 32-bit data and the subsequent valid 32-bit data are combined and written to the FIFO RAM. If only one of the 32-bit chunks is valid and the FIFO depth has dropped below 4 entries, the valid 32-bit chunk is combined with 32-bit idle data and written to the FIFO RAM (step 2744).

In step 2746, a respective FIFO controller indicates to FIFO read arbitrator 540 if K0 has been read or FIFO RAM is empty. This indication is a read request for arbitration. In step 2748, a respective FIFO controller indicates to FIFO read arbitrator 540 whether K0 is aligned to the first 32-bit chunk or the second 32-bit chunk. When flow control from an output port is detected (such as when a predetermined flow control sequence of one or more characters is detected), FIFO controller stops requesting the FIFO read arbitrator 540 after the current cell is completely read from the FIFO RAM (step 2750).

Figure 27D:
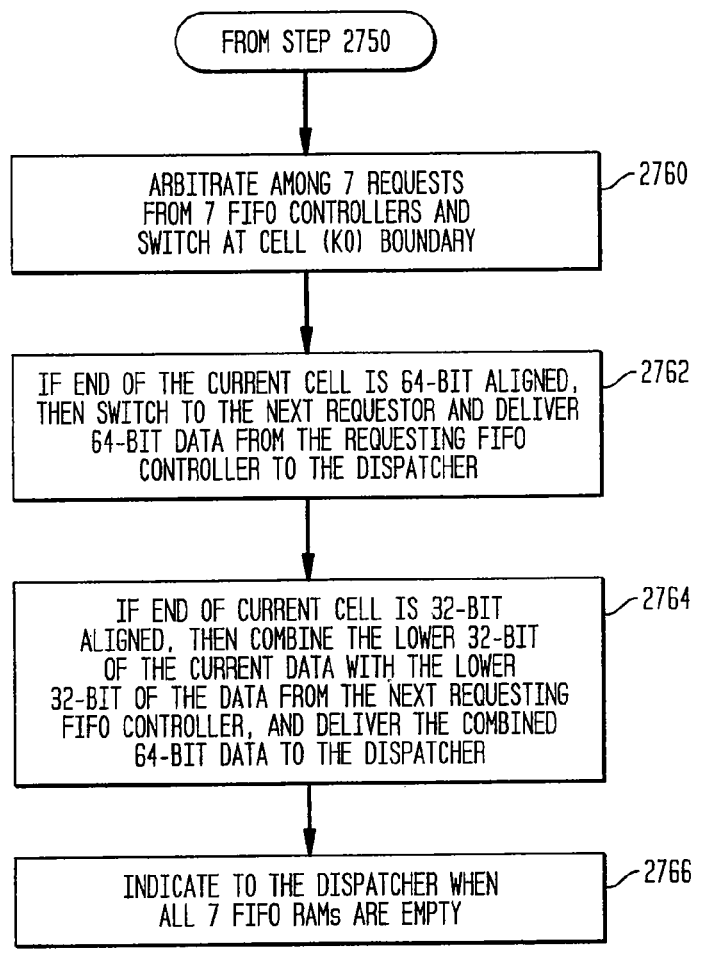

As shown in FIG. 27D, in step 2760, FIFO read arbitrator 540 arbitrates among 7 requests from 7 FIFO controllers and switches at a cell (K0) boundary. If end of the current cell is 64-bit aligned, then FIFO read arbitrator 540 switches to the next requestor and delivers 64-bit data from FIFO RAM of the requesting FIFO controller to the dispatcher 560 (step 2762). If end of current cell is 32-bit aligned, then FIFO read arbitrator 540 combines the lower 32-bit of the current data with the lower 32-bit of the data from the next requesting FIFO controller, and delivers the combined 64-bit data to the dispatcher 560 (step 2764). Further, in step 2766, FIFO read arbitrator 540 indicates to the dispatcher 560 when all 7 FIFO RAMs are empty.

Figure 27E:
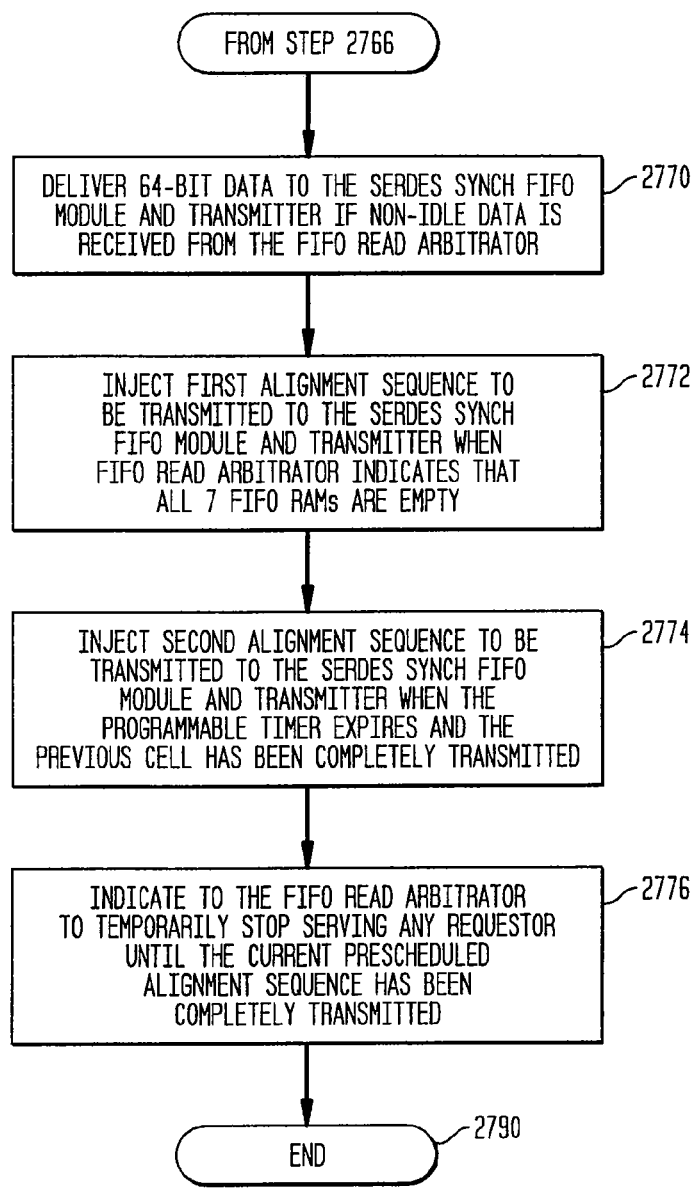

As shown in FIG. 27E, in step 2770, dispatcher 560 delivers 64-bit data to the SERDES synch FIFO module 570 and in turn to serializer transmitter(s) 580, if non-idle data is received from the FIFO read arbitrator 540. Dispatcher 560 injects a first alignment sequence to be transmitted to the SERDES synch FIFO module 570 and in turn to transmitter 580 when FIFO read arbitrator indicates that all 7 FIFO RAMs are empty (step 2772). Dispatcher 560 injects a second alignment sequence to be transmitted to the SERDES synch FIFO module 570 and in turn to transmitter 580 when the programmable timer expires and the previous cell has been completely transmitted (step 2774). Dispatcher 560 indicates to the FIFO read arbitrator 540 to temporarily stop serving any requestor until the current pre-scheduled alignment sequence has been completely transmitted (step 2776). Control ends (step 2790).

C. Backplane Interface Adapter

Figure 6:
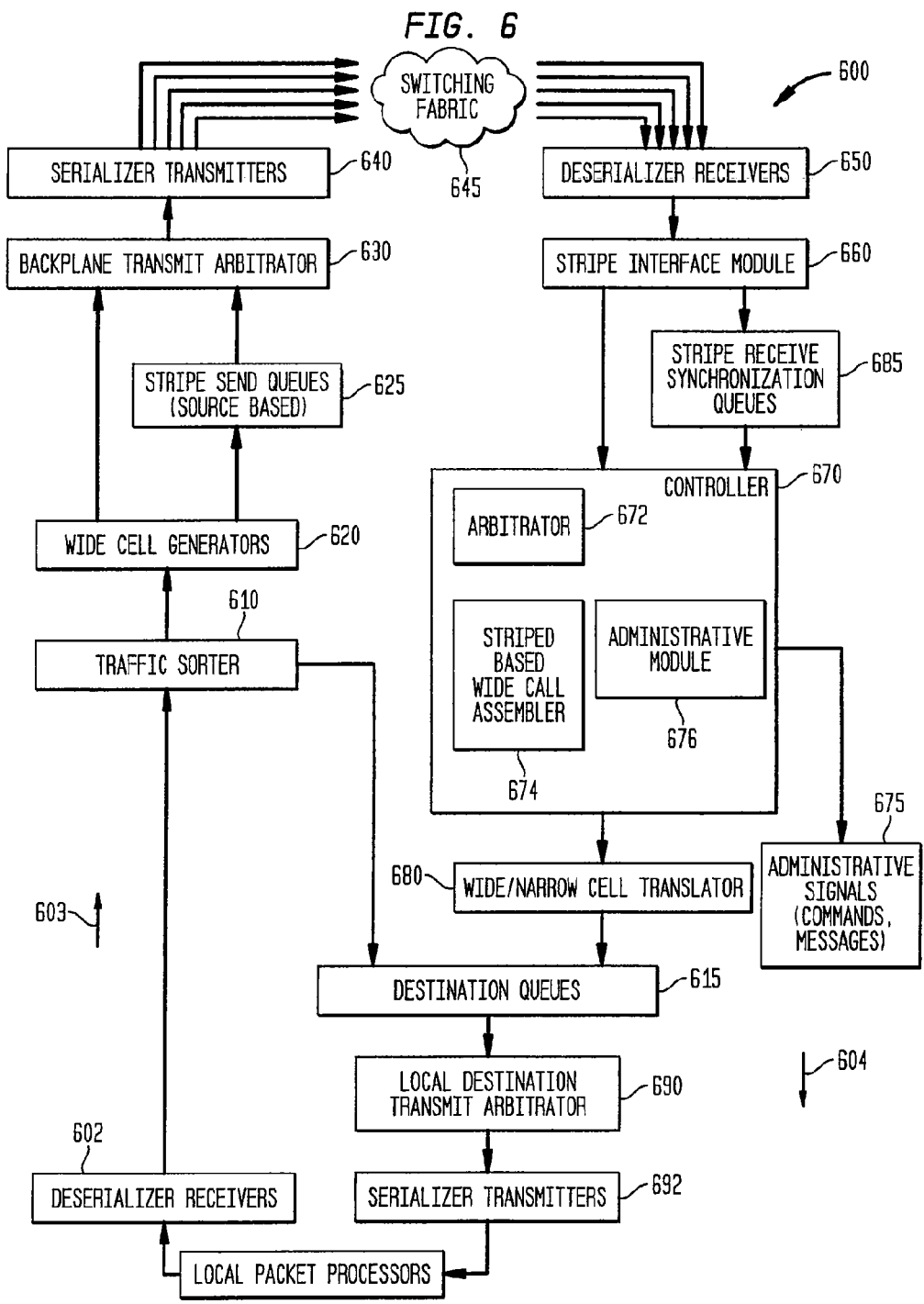
FIG. 6 is a diagram of a backplane interface adapter according to an embodiment of the present invention.
Figure 7:
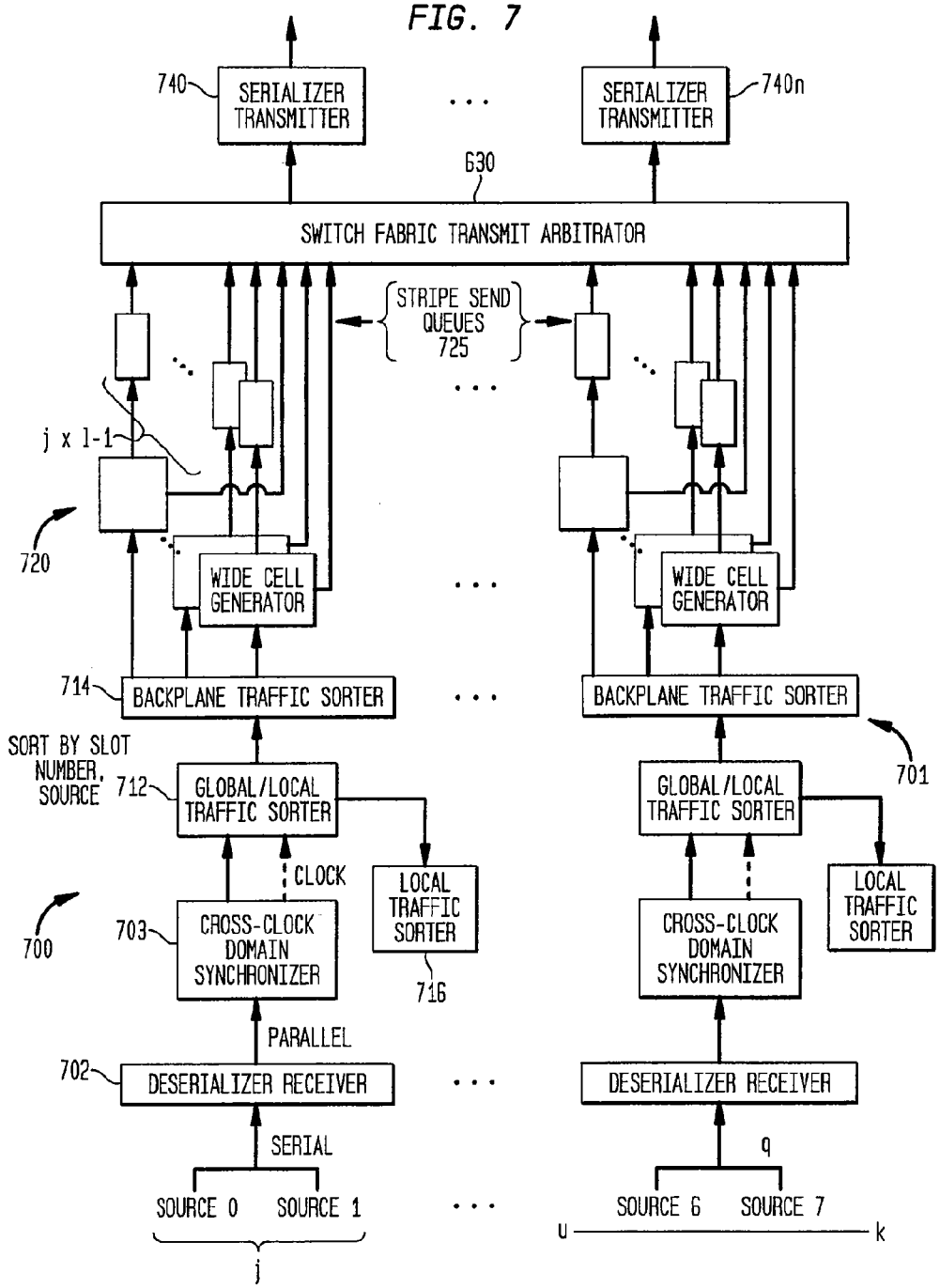
FIG. 7 is a diagram showing a traffic processing path for local serial traffic received at a backplane interface adapter according to an embodiment of the present invention.
Figure 8:
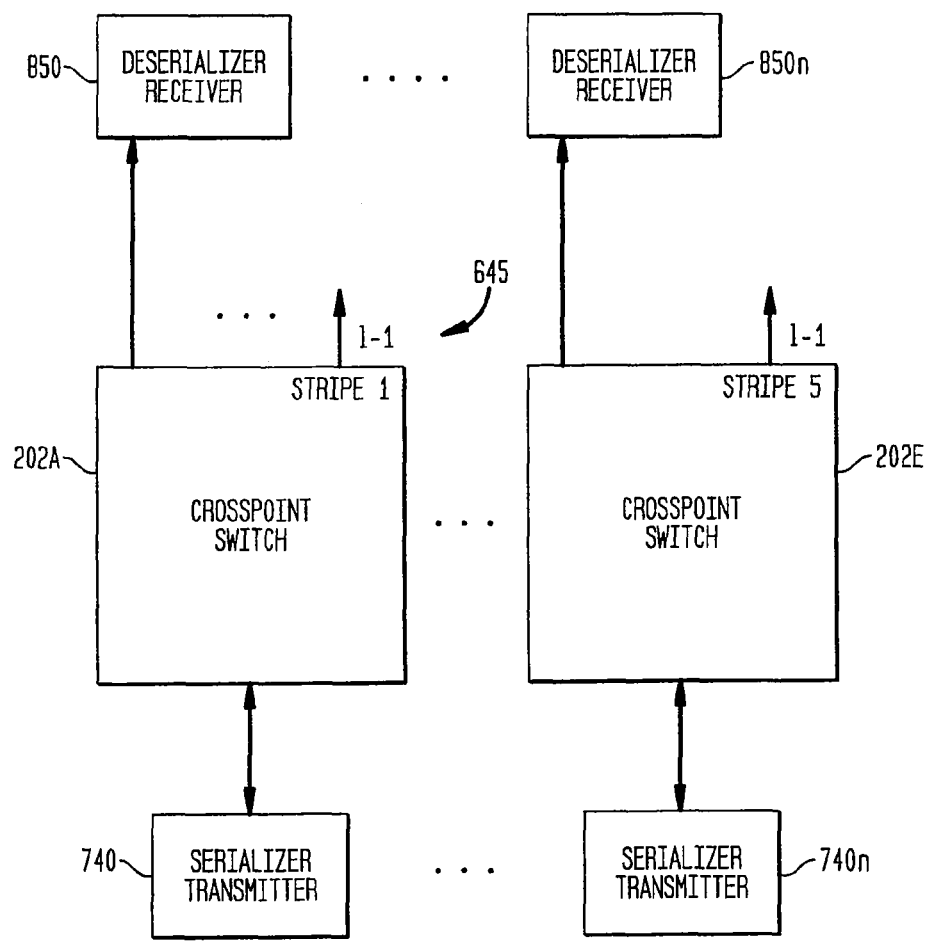
FIG. 8 is a diagram of an example switching fabric coupled to a backplane interface adapter according to an embodiment of the present invention.
Figure 9:
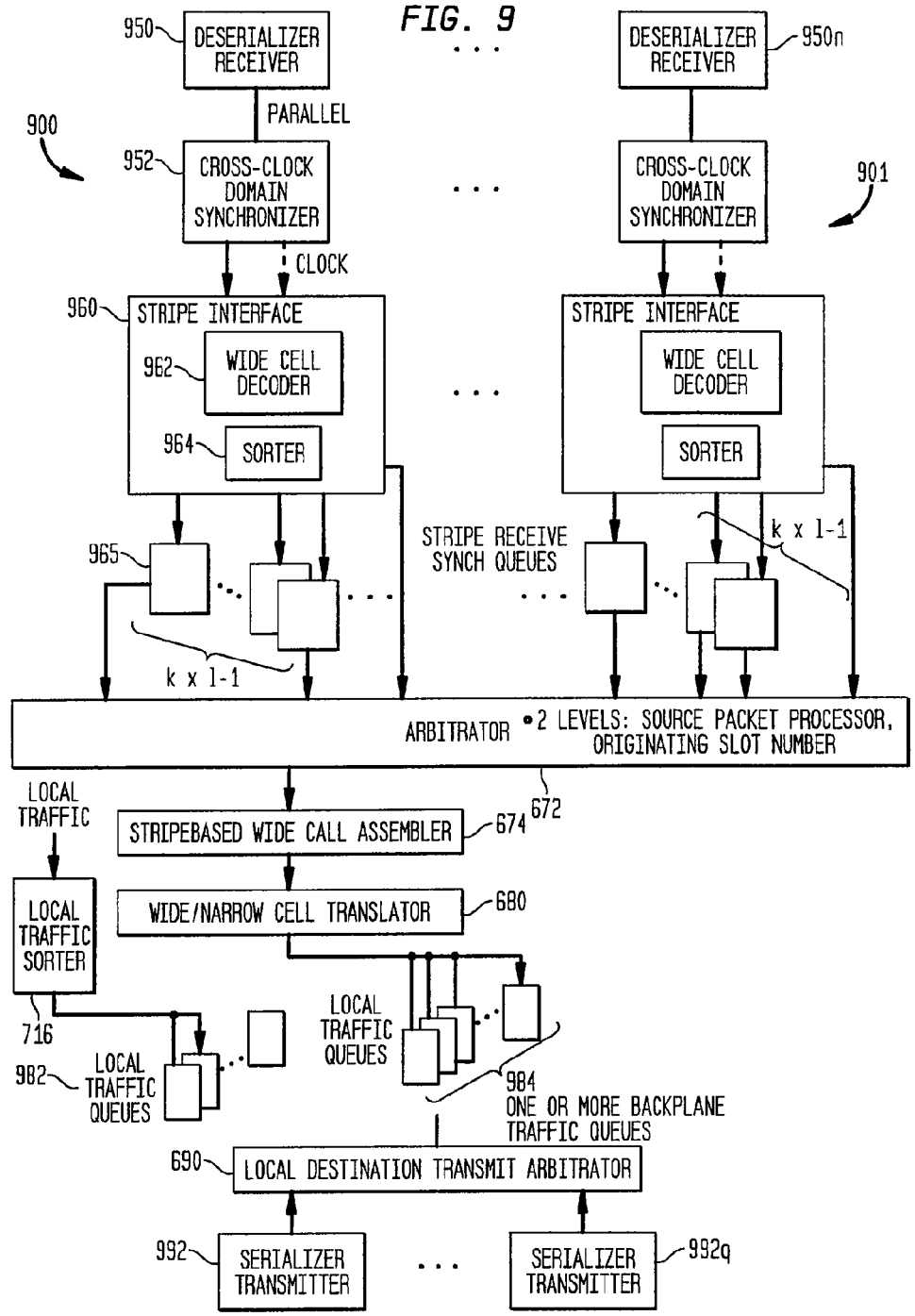
FIG. 9 is a diagram showing a traffic processing path for backplane serial traffic received at the backplane interface adapter according to an embodiment of the present invention.

To describe the structure and operation of the backplane interface adapter reference is made to components shown in FIGS. 6-9. FIG. 6 is a diagram of a backplane interface adapter (BIA) 600 according to an embodiment of the present invention. BIA 600 includes two traffic processing paths 603, 604. FIG. 7 is a diagram showing a first traffic processing path 603 for local serial traffic received at BIA 600 according to an embodiment of the present invention. FIG. 8 is a diagram showing in more detail an example switching fabric 645 according to an embodiment of the present invention. FIG. 9 is a diagram showing a second traffic processing path 604 for backplane serial traffic received at BIA 600 according to an embodiment of the present invention. For convenience, BIA 600 of FIG. 6 will also be described with reference to a more detailed embodiment of elements along paths 603, 604 as shown in FIGS. 7 and 9, and the example switching fabric 645 shown in FIG. 8. The operation of a backplane interface adapter will be further described with respect to routines and example diagrams related to a wide striped cell encoding scheme as shown in FIGS. 11-16.

D. Overall Operation of Backplane Interface Adapter

Figure 10:
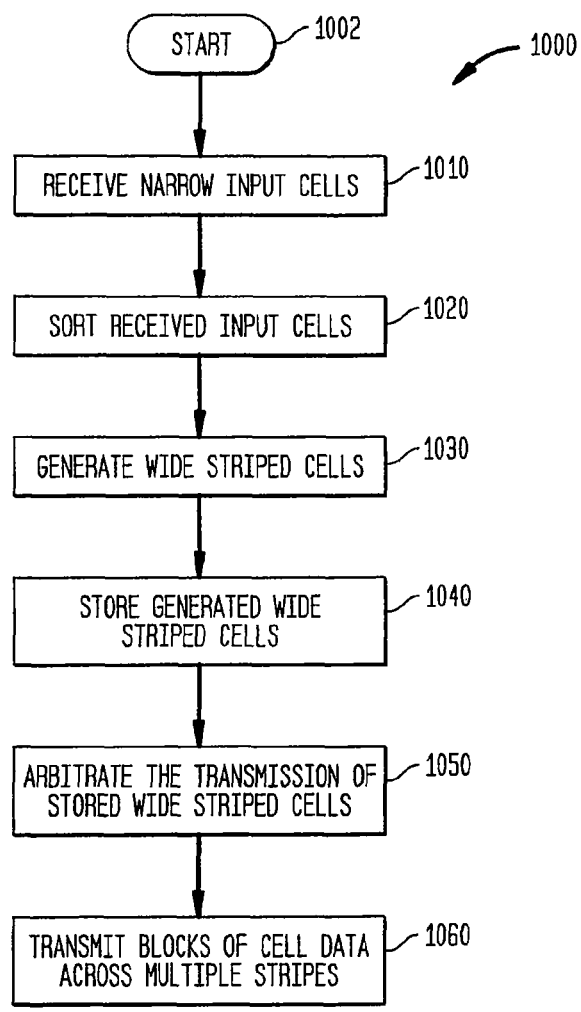
FIG. 10 is a flowchart of operational steps carried out along a traffic processing path for local serial traffic received at a backplane interface adapter according to an embodiment of the present invention.

FIG. 10 is a flowchart of a routine 1000 interfacing serial pipes carrying packets of data in narrow input cells and a serial pipe carrying packets of data in wide striped cells (steps 1010-1060). Routine 1000 includes receiving narrow input cells (step 1010), sorting the received input cells based on a destination slot identifier (1020), generating wide striped cells (step 1030), storing the generated wide striped cells in corresponding stripe send queues based on a destination slot identifier and an originating source packet processor (step 1040), arbitrating the order in which the stored wide striped cells are selected for transmission (step 1050) and transmitting data slices representing blocks of wide cells across multiple stripes (step 1060). For brevity, each of these steps is described further with respect to the operation of the first traffic processing path in BIA 600 in embodiments of FIGS. 6 and 7 below.

Figure 11:
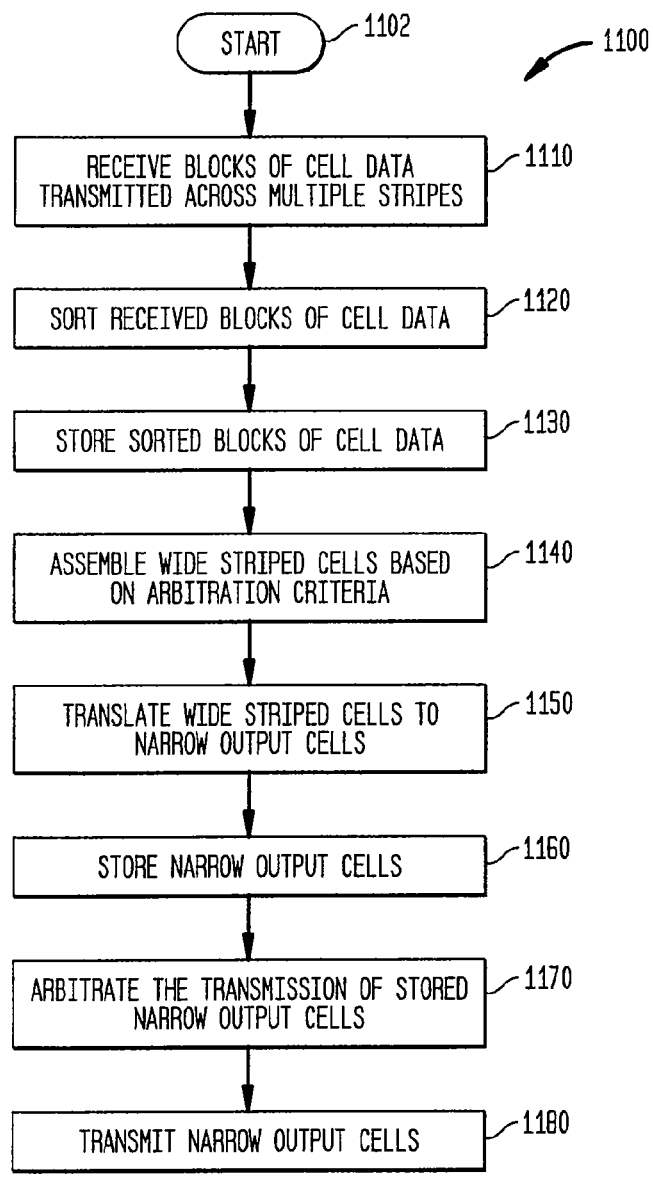
FIG. 11 is a flowchart of operational steps carried out along a traffic processing path for backplane serial traffic received at the backplane interface adapter according to an embodiment of the present invention.

FIG. 11 is a flowchart of a routine 1100 interfacing serial pipes carrying packets of data in wide striped cells to serial pipes carrying packets of data in narrow input cells (steps 1110-1180). Routine 1100 includes receiving wide striped cells carrying packets of data in multiple stripes from a switching fabric (step 1110), sorting the received sub-blocks in each stripe based on source packet processor identifier and originating slot identifier information (step 1120), storing the sorted received sub-blocks in stripe receive synchronization queues (step 1130), assembling wide striped cells in the order of the arbitrating step based on the received sub-blocks of data (step 1140), translating the received wide striped cells to narrow input cells carrying the packets of data (step 1150), storing narrow cells in a plurality of destination queues (step 1160), arbitrating an order in which data stored in the stripe receive synchronization queues is assembled (1170), and transmitting the narrow output cells to corresponding source packet processors (step 1180). In one additional embodiment, further arbitration is performed including arbitrating an order in which data stored in the destination queues is to be transmitted and transmitting the narrow input cells in the order of the further arbitrating step to corresponding source packet processors and/or IBTs. For brevity, each of these steps is described further with respect to the operation of the second traffic processing path in BIA 600 in embodiments of FIGS. 6 and 7 below.

As shown in FIG. 6, traffic processing flow path 603 extends in traffic flow direction from local packet processors toward a switching fabric 645. Traffic processing flow path 604 extends in traffic flow direction from the switching fabric 645 toward local packet processors. BIA 600 includes deserializer receiver(s) 602, traffic sorter 610, wide cell generator(s) 620, stripe send queues 625, switching fabric transmit arbitrator 630 and sterilizer transmitter(s) 640 coupled along path 603. BIA 600 includes deserializer receiver(s) 650, stripe interface module(s) 660, stripe receive synchronization queues 685, controller 670 (including arbitrator 672, striped-based wide cell assemblers 674, and administrative module 676), wide/cell translator 680, destination queues 615, local destination transmit arbitrator 690, and sterilizer transmitter(s) 692 coupled along path 604.

E. First Traffic Processing Path

Deserializer receiver(s) 602 receive narrow input cells carrying packets of data. These narrow input cells are output to deserializer receiver(s) 602 from packet processors and/or from integrated bus translators (IBTs) coupled to packet processors. In one example, four deserializer receivers 602 are coupled to four serial links (such as, links 308A-D, 318A-C described above in FIGS. 3A-3B). As shown in the example of FIG. 7, each deserialize receiver 602 includes a deserializer receiver 702 coupled to a cross-clock domain synchronizer 703. For example, each deserializer receiver 702 coupled to a cross-clock domain synchronizer 703 can be in turn a set of four SERDES deserializer receivers and domain synchronizers carrying the bytes of data in the four lanes of the narrow input cells. In one embodiment, each deserializer receiver 702 can receive interleaved streams of data from two serial links coupled to two sources. FIG. 7 shows one example where four deserializer receivers 702 (q=4) are coupled to two sources (j=2) of a total of eight serial links (k=8). In one example, each deserializer receiver 702 receives a capacity of 10 Gb/s of serial data F. Narrow Cell Format FIG. 13 shows the format of an example narrow cell 1300 used to carry packets of data in the narrow input cells. Such a format can include, but is not limited to, a data cell format received from a XAUI interface. Narrow cell 1300 includes four lanes (lanes 0-3). Each lane 0-3 carries a byte of data on a serial link. The beginning of a cell includes a header followed by payload data. The header includes one byte in lane 0 of control information, and one byte in lane 1 of state information. One byte is reserved in each of lanes 2 and 3. Table 1310 shows example state information which can be used. This state information can include any combination of state information including one or more of the following: a slot number, a payload state, and a source or destination packet processor identifier. The slot number is an encoded number, such as, 00, 01, etc. or other identifier (e.g., alphanumeric or ASCII values) that identifies the blade (also called a slot) towards which the narrow cell is being sent. The payload state can be any encoded number or other identifier that indicates a particular state of data in the cell being sent, such as, reserved (meaning a reserved cell with no data), SOP (meaning, a start of packet cell), data (meaning a cell carrying payload data of a packet), and abort (meaning a packet transfer is being aborted).

G. Traffic Sorting

Traffic sorter 610 sorts received narrow input cells based on a destination slot identifier. Traffic sorter 610 routes narrow cells destined for the same blade as BIA 600 (also called local traffic) to destination queues 615. Narrow cells destined for other blades in a switch across the switching fabric (also called global traffic) are routed to wide cell generators 620.

FIG. 7 shows a further embodiment where traffic sorter 610 includes a global/traffic sorter 712 coupled to a backplane sorter 714. Global/traffic sorter 712 sorts received narrow input cells based on the destination slot identifier. Traffic sorter 712 routes narrow cells destined for the same blade as BIA 600 to destination queues 615. Narrow cells destined for other blades in a switch across the switching fabric (also called global traffic or backplane traffic) are routed to backplane traffic sorter 714. Backplane traffic sorter 714 further sorts received narrow input cells having destination slot identifiers that identify global destination slots into groups based on the destination slot identifier. In this way, narrow cells are grouped by the blade towards which they are traveling. Backplane traffic sorter 714 then routes the sorted groups of narrow input cells of the backplane traffic to corresponding wide cell generators 720. Each wide cell generator 720 then processes a corresponding group of narrow input cells. Each group of narrow input cells represents portions of packets sent from two corresponding interleaved sources (j=2) and destined for a respective blade. In one example, 56 wide cell generators 720 are coupled to the output of four backplane traffic sorters 714. The total of 56 wide cell generators 720 is given by 56=q*j*l−1, where j=2 sources, l=8 blades, and q=four serial input pipes and four deserializer receivers 702.

H. Wide Striped Cell Generation

Wide cell generators 620 generate wide striped cells. The wide striped cells carry the packets of data received by BIA 600 in the narrow input cells. The wide cells extend across multiple stripes and include in-band control information in each stripe. In the interest of brevity, the operation of wide cell generators 620, 720 is further described with respect to a routine 1200 in FIG. 12. Routine 1200 however is not intended to be limited to use in wide cell generator 620, 720 and may be used in other structure and applications.

Figure 12:
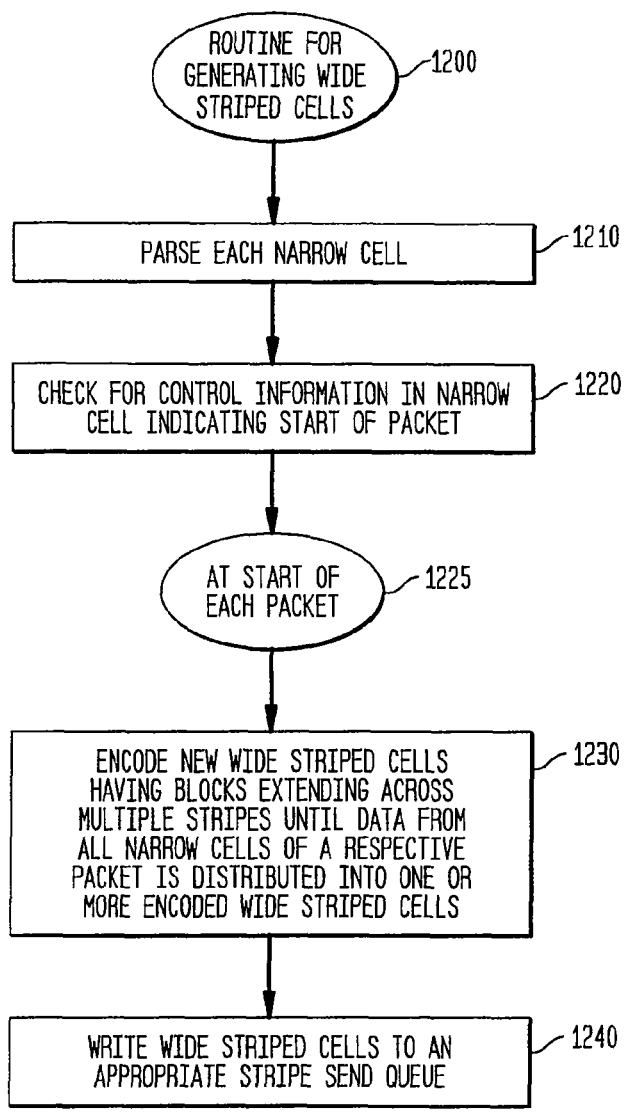
FIG. 12 is a flowchart of a routine for generating wide striped cells according to an embodiment of the present invention.

FIG. 12 shows a routine 1200 for generating wide striped cell generation according to the present invention (steps 1210-1240). In one embodiment, each wide cell generator(s) 620, 720 perform steps 1210-1240. In step 1210, wide cell generator 620, 720 parse each narrow input cell to identify a header. When control information is found in a header, a check is made to determine whether the control information indicates a start of packet (step 1220). For example, to carry out steps 1210 and 1220, wide cell generator 620, 720 can read lane 0 of narrow cell 1300 to determine control information indicating a start of packet is present. In one example, this start of packet control information is a special control character K0.

For each detected packet (step 1225), steps 1230-1240 are performed. In step 1230, wide cell generator 620, 720 encodes one or more new wide striped cells until data from all narrow input cells of the packet is distributed into the one or more new wide striped cells. This encoding is further described below with respect to routine 1400 and FIGS. 15A-D, and 16.

In step 1230, wide cell generator 620 then writes the one or more new wide striped cells into a plurality of send queues 625. In the example of FIG. 7, a total of 56 wide cell generators 720 are coupled to 56 stripes send queues 725. In this example, the 56 wide cell generators 720 each write newly generated wide striped cells into respective ones of the 56 stripe send queues 725.

I. Encoding Wide Striped Cells

According to a further feature of the present invention, system and method for encoding wide striped cells is provided. In one embodiment, wide cell generators 620, 720 each generate wide striped cells which are encoded (step 1230). FIG. 14 is a flowchart of a routine 1400 for encoding wide striped cells according to an embodiment of the present invention (steps 1410-1460).

J. Initial Block Encoding

In step 1410, wide cell generator 620, 720 encodes an initial block of a start wide striped cell with initial cell encoding information. The initial cell encoding information includes control information (such as, a special K0 character) and state information provided in each sub-block of an initial block of a wide striped cell. FIG. 15A shows the encoding of an initial block in a wide striped cell 1500 according to an embodiment of the present invention. The initial block is labeled as cycle 1. The initial block has twenty bytes that extend across five stripes 1-5. Each stripe has a sub-block of four bytes. The four bytes of a sub-block correspond to four one byte lanes. In this way, a stripe is a data slice of a sub-block of a wide cell. A lane is a data slice of one byte of the sub-block. In step 1410, then control information (K0) is provided all each lane 0 of the stripes 1-5. State information is provided in each in each lane 1 of the stripes 1-5. Also, two bytes are reserved in lanes 2 and 3 of stripe 5.

FIG. 15B is a diagram illustrating state information used in a wide striped cell according to an embodiment of the present invention. As shown in FIG. 15B, state information for a wide striped cell can include any combination of state information including one or more of the following: a slot number, a payload state, and reserved bits. The slot number is an encoded number, such as, 00, 01, etc. or other identifier (e.g., alphanumeric or ASCII values) that identifies the blade (also called a slot) towards which the wide striped cell is being sent. The payload state can be any encoded number or other identifier that indicates a particular state of data in the cell being sent, such as, reserved (meaning a reserved cell with no data), SOP (meaning a start of packet cell), data (meaning a cell carrying payload data of a packet), and abort (meaning a packet transfer is being aborted). Reserved bits are also provided.

In step 1420, wide cell generator(s) 620, 720 distribute initial bytes of packet data into available space in the initial block. In the example wide striped cell 1500 shown in FIG. 15A, two bytes of data D0, D1 are provided in lanes 2 and 3 of stripe 1, two bytes of data D2, D3 are provided in lanes 2 and 3 of stripe 2, two bytes of data D4, D5 are provided in lanes 2 and 3 of stripe 3, and two bytes of data D6, D7 are provided in lanes 2 and 3 of stripe 4.

In step 1430, wide cell generator(s) 620, 720 distribute remaining bytes of packet data across one or more blocks in of the first wide striped cell (and subsequent wide cells). In the example wide striped cell 1500, maximum size of a wide striped cell is 160 bytes (8 blocks) which corresponds to a maximum of 148 bytes of data. In addition to the data bytes D0-D7 in the initial block, wide striped cell 1500 further has data bytes D8-D147 distributed in seven blocks (labeled in FIG. 15A as blocks 2-8).

In general, packet data continues to be distributed until an end of packet condition is reached or a maximum cell size is reached. Accordingly, checks are made of whether a maximum cell size is reached (step 1440) and whether the end of packet is reached (step 1450). If the maximum cell size is reached in step 1440 and more packet data needs to be distributed then control returns to step 1410 to create additional wide striped cells to carry the rest of the packet data. If the maximum cell size is not reached in step 1440, then an end of packet check is made (step 1450). If an end of packet is reached then the current wide striped cell being filled with packet data is the end wide striped cell. Note for small packets less than 148 bytes, than only one wide striped cell is needed. Otherwise, more than one wide striped cells are used to carry a packet of data across multiple stripes. When an end of packet is reached in step 1450, then control proceeds to step 1460.

K. End of Packet Encoding

In step 1460, wide cell generator(s) 620, 720 further encode an end wide striped cell with end of packet information that varies depending upon the degree to which data has filled a wide striped cell. In one encoding scheme, the end of packet information varies depending upon a set of end of packet conditions including whether the end of packet occurs in an initial cycle or subsequent cycles, at a block boundary, or at a cell boundary.

FIG. 15C is a diagram illustrating end of packet encoding information used in an end wide striped cell according to an embodiment of the present invention. A special character byte K1 is used to indicate end of packet. A set of four end of packet conditions are shown (items 1-4). The four end of packet conditions are whether the end of packet occurs during the initial block (item 1) or during any subsequent block (items 2-4). The end of packet conditions for subsequent blocks further include whether the end of packet occurs within a block (item 2), at a block boundary (item 3), or at a cell boundary (item 4). As shown in item 1 of FIG. 15C, when the end of packet occurs during the initial block, control and state information (K0, state) and reserved information are preserved as in any other initial block transmission. K1 bytes are added as data in remaining data bytes.

As shown in item 2 of FIG. 15C, when the end of packet occurs during a subsequent block (and not at a block or cell boundary), K1 bytes are added as data in remaining data bytes until an end of a block is reached. In FIG. 15C, item 2, an end of packet is reached at data byte D33 (stripe 2, lane 1 in block of cycle 3). K1 bytes are added for each lane for remainder of block. When the end of packet occurs at a block boundary of a subsequent block (item 3), K1 bytes are added as data in an entire subsequent block. In FIG. 15C, item 3, an end of packet is reached at data byte D27 (end of block of block 2). K1 bytes are added for each lane for entire block (block 3). When the end of packet occurs during a subsequent block but at a cell boundary (item 4), one wide striped cell having an initial block with K1 bytes added as data is generated. In FIG. 15D, item 4, an end of packet is reached at data byte D147 (end of cell and end of block for block 8). One wide striped cell consisting of only an initial block with normal control, state and reserved information and with K1 bytes added as data is generated. As shown in FIG. 15D, such an initial block with K1 bytes consists of stripes 1-5 with bytes as follows: stripe 1 (K0, state, K1,K1), stripe 2 (K0,state, K1,K1), stripe3 (K0, state, K1,K1), stripe 4 (K0,state, K1,K1), stripe 5 (K0,state, reserved, reserved).

L. Switching Fabric Transmit Arbitration

In one embodiment, BIA 600 also includes switching fabric transmit arbitrator 630. Switching fabric transmit arbitrator 630 arbitrates the order in which data stored in the stripe send queues 625, 725 is sent by transmitters 640, 740 to the switching fabric. Each stripe send queue 625, 725 stores a respective group of wide striped cells corresponding to a respective originating source packet processor and a destination slot identifier. Each wide striped cell has one or more blocks across multiple stripes. During operation the switching fabric transmit arbitrator 630 selects a stripe send queue 625, 725 and pushes the next available cell to the transmitters 640, 740. In this way one full cell is sent at a time. (Alternatively, a portion of a cell can be sent.) Each stripe of a wide cell is pushed to the respective transmitter 640, 740 for that stripe. In one example, during normal operation, a complete packet is sent to any particular slot or blade from a particular packet processor before a new packet is sent to that slot from different packet processors. However, the packets for the different slots are sent during an arbitration cycle. In an alternative embodiment, other blades or slots are then selected in a round-robin fashion.

M. Cross Point Processing of Stripes including Wide Cell Encoding

In on embodiment, switching fabric 645 includes a number n of cross point switches 202 corresponding to each of the stripes. Each cross point switch 202 (also referred to herein as a cross point or cross point chip) handles one data slice of wide cells corresponding to one respective stripe. In one example, five cross point switches 202A-202E are provided corresponding to five stripes. For clarity, FIG. 8 shows only two of five cross point switches corresponding to stripes 1 and 5. The five cross point switches 202 are coupled between transmitters and receivers of all of the blades of a switch as described above with respect to FIG. 2. For example, FIG. 8 shows cross point switches 202 coupled between one set of transmitters 740 for stripes of one blade and another set of receivers 850 on a different blade.

The operation of a cross point 202 and in particular a port slice 402F is now described with respect to an embodiment where stripes further include wide cell encoding and a flow control indication.

Port slice 402F also receives data from other port slices 402A-402E, 402G, and 402H. This data corresponds to the data received at the other seven ports of port slices 402A-402E, 402G, and 402H which has a destination slot number corresponding to port slice 402F. Port slice 402F includes seven data FIFOs 530 to store data from corresponding port slices 402A-402E, 402G, and 402H. Accumulators (not shown) in the seven port slices 402A-402E, 402G, and 402H extract the destination slot number associated with port slice 402F and write corresponding data to respective ones of seven data FIFOs 530 for port slice 402F. As shown in FIG. 5, each data FIFO 530 includes a FIFO controller and FIFO random access memory (RAM). The FIFO controllers are coupled to a FIFO read arbitrator 540. FIFO RAMs are coupled to a multiplexer 550. FIFO read arbitrator 540 is further coupled to multiplexer 550. Multiplexer 550 has an output coupled to dispatcher 560. Dispatch 560 has an output coupled to transmit synch FIFO module 570. Transmit synch FIFO module 570 has an output coupled to serializer transmitter(s) 580.

During operation, the FIFO RAMs accumulate data. After a data FIFO RAM has accumulated one cell of data, its corresponding FIFO controller generates a read request to FIFO read arbitrator 540. FIFO read arbitrator 540 processes read requests from the different FIFO controllers in a desired order, such as a round-robin order. After one cell of data is read from one FIFO RAM, FIFO read arbitrator 540 will move on to process the next requesting FIFO controller. In this way, arbitration proceeds to serve different requesting FIFO controllers and distribute the forwarding of data received at different source ports. This helps maintain a relatively even but loosely coupled flow of data through cross points 202.

To process a read request, FIFO read arbitrator 540 switches multiplexer 550 to forward a cell of data from the data FIFO RAM associated with the read request to dispatcher 560. Dispatcher 560 outputs the data to transmit synch FIFO 570. Transmit synch FIFO 570 stores the data until sent in a serial data stream by serializer transmitter(s) 580 to blade 104F.

Cross point operation according to the present invention is described further below with respect to a further embodiment involving wide cell encoding and flow control.

N. Second Traffic Processing Path

FIG. 6 also shows a traffic processing path for backplane serial traffic received at backplane interface adapter 600 according to an embodiment of the present invention. FIG. 9 further shows the second traffic processing path in even more detail.

As shown in FIG. 6, BIA 600 includes one or more deserialize receivers 650, wide/narrow cell translators 680, and serializer transmitters 692 along the second path. Receivers 650 receive wide striped cells in multiple stripes from the switching fabric 645. The wide striped cells carry packets of data. In one example, five deserializer receivers 650 receive five sub-blocks of wide striped cells in multiple stripes. The wide striped cells carrying packets of data across the multiple stripes and including originating slot identifier information. In one digital switch embodiment, originating slot identifier information is written in the wide striped cells as they pass through cross points in the switching fabric as described above with respect to FIG. 8.

Translators 680 translate the received wide striped cells to narrow input cells carrying the packets of data. Serializer transmitters 692 transmit the narrow input cells to corresponding source packet processors or IBTs.

BIA 600 further includes stripe interfaces 660 (also called stripe interface modules), stripe receive synchronization queues (685), and controller 670 coupled between deserializer receivers 650 and a controller 670. Each stripe interface 660 sorts received sub-blocks in each stripe based on source packet processor identifier and originating slot identifier information and stores the sorted received sub-blocks in the stripe receive synchronization queues 685.

Controller 670 includes an arbitrator 672, a striped-based wide cell assembler 674, and an administrative module 676. Arbitrator 672 arbitrates an order in which data stored in stripe receive synchronization queues 685 is sent to striped-based wide cell assembler 674. Striped-based wide cell assembler 674 assembles wide striped cells based on the received sub-blocks of data. A narrow/wide cell translator 680 then translates the arbitrated received wide striped cells to narrow input cells carrying the packets of data. Administrative module 676 is provided to carry out flow control, queue threshold level detection, and error detection (such as, stripe synchronization error detection), or other desired management or administrative functionality.

A second level of arbitration is also provided according to an embodiment of the present invention. BIA 600 further includes destination queues 615 and a local destination transmit arbitrator 690 in the second path. Destination queues 615 store narrow cells sent by traffic sorter 610 (from the first path) and the narrow cells translated by the translator 680 (from the second path). Local destination transmit arbitrator 690 arbitrates an order in which narrow input cells stored in destination queues 690 is sent to serializer transmitters 692. Finally, serializer transmitters 692 then transmit the narrow input cells to corresponding IBTs and/or source packet processors (and ultimately out of a blade through physical ports).

FIG. 9 further shows the second traffic processing path in even more detail. BIA 600 includes five groups of components for processing data slices from five slices. In FIG. 9 only two groups 900 and 901 are shown for clarity, and only group 900 need be described in detail with respect to one stripe since the operations of the other groups is similar for the other four stripes.

In the second traffic path, deserializer receiver 950 is coupled to cross clock domain synchronizer 952. Deserializer receiver 950 converts serial data slices of a stripe (e.g., sub-blocks) to parallel data. Cross clock domain synchronizer 952 synchronizes the parallel data.

Stripe interface 960 has a decoder 962 and sorter 964 to decode and sort received sub-blocks in each stripe based on source packet processor identifier and originating slot identifier information. Sorter 964 then stores the sorted received sub-blocks in stripe receive synchronization queues 965. Five groups of 56 stripe receive synchronization queues 965 are provided in total. This allows one queue to be dedicated for each group of sub-blocks received from a particular source per global blade (up to 8 source packet processors per blade for seven blades not including the current blade).

Arbitrator 672 arbitrates an order in which data stored in stripe receive synchronization queues 685 sent to striped-based wide cell assembler 674. Striped-based wide cell assembler 674 assembles wide striped cells based on the received sub-blocks of data. A narrow/wide cell translator 680 then translates the arbitrated received wide striped cells to narrow input cells carrying the packets of data as described above in FIG. 6.

Destination queues include local destination queues 982 and backplane traffic queues 984. Local destination queues 982 store narrow cells sent by local traffic sorter 716. Backplane traffic queues 984 store narrow cells translated by the translator 680. Local destination transmit arbitrator 690 arbitrates an order in which narrow input cells stored in destination queues 982, 984 is sent to serializer transmitters 992. Finally, serializer transmitters 992 then transmit the narrow input cells to corresponding IBTs and/or source packet processors (and ultimately out of a blade through physical ports).

O. Cell Boundary Alignment

FIG. 15D is a diagram illustrating an example of a cell boundary alignment condition during the transmission of wide striped cells in multiple stripes according to an embodiment of the present invention. A K0 character is guaranteed by the encoding and wide striped cell generation to be present every 8 blocks for any given stripe. Cell boundaries among the stripes themselves can be out of alignment. This out of alignment however is compensated for and handled by the second traffic processing flow path in BIA 600.

P. Packet Alignment

Figure 16:
FIG. 16 is a diagram illustrating an example of a packet alignment condition during the transmission of wide striped cells in multiple stripes according to an embodiment of the present invention.

FIG. 16 is a diagram illustrating an example of a packet alignment condition during the transmission of wide striped cells in multiple stripes according to an embodiment of the present invention. Cell can vary between stripes but all stripes are essentially transmitting the same packet or nearby packets. Since each cross point arbitrates among its sources independently, not only can there be a skew in a cell boundary, but there can be as many as seven cell time units (time to transmit cells) of skew between a transmission of a packet on one serial link verus its transmission on any other link. This also means that packets may be interlaced with other packets in the transmission in multiple stripes over the switching fabric.

Q. Wide Striped Cell Size at Line Rate

In one example, a wide cell has a maximum size of eight blocks (160 bytes) which can carry 148 bytes of payload data and 12 bytes of in-band control information. Packets of data for full-duplex traffic can be carried in the wide cells at a 50 Gbps rate through the digital switch.

R. IBT and Packet Processing

The integrated packet controller (IPC) and integrated giga controller (IGC) functions are provided with a bus translator, described above as the IPC/IGC Bus Translator (IBT) 304. In one embodiment, the IBT is an ASIC that bridges one or more IPC/IC ASIC. In such an embodiment, the IBT translates two ⅘ gig parallel stream into one 10 Gbps serial stream. The parallel interface can be the backplane interface of the IPC/IGC ASICs. The one 10 Gbps serial stream can be further processed, for example, as described herein with regard to interface adapters and striping.

Additionally, IBT 304 can be configured to operate with other architectures as would be apparent to one skilled in the relevant art(s) based at least on the teachings herein. For example, the IBT 304 can be implemented in packet processors using 10GE and OC-192 configurations. The functionality of the IBT 304 can be incorporated within existing packet processors or attached as an add-on component to a system.

Figure 17:
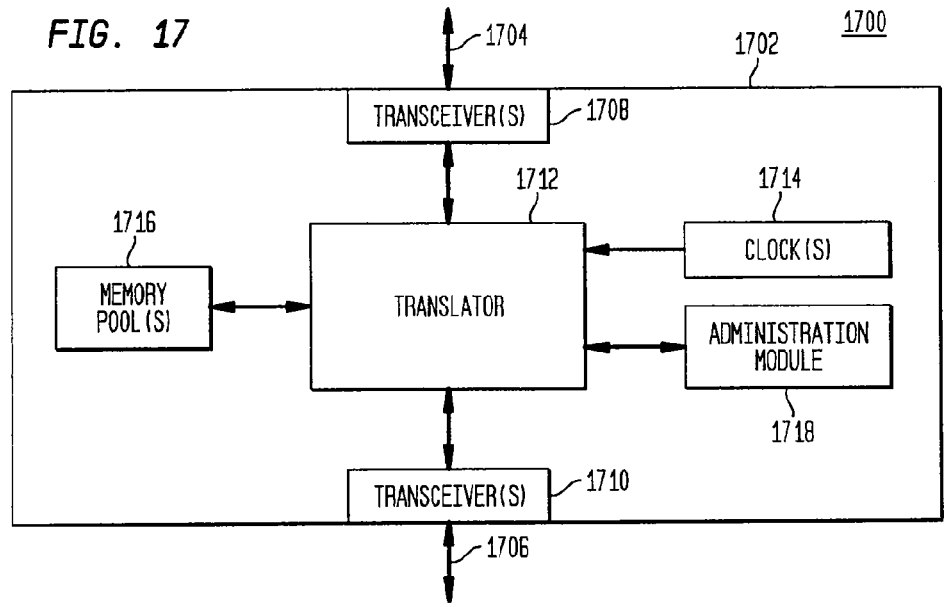
FIG. 17 illustrates a block diagram of a bus translator according to one embodiment of the present invention.

In FIG. 17, a block diagram 1700 illustrates the components of a bus translator 1702 according to one embodiment of the present invention. The previously described IBT 304 can be configured as the bus translator 1702 of FIG. 17. For example, IBT 304 can be implemented to include the functionality of the bus translator 1702.

More specifically, the bus translator 1702 translates data 1704 into data 1706 and data 1706 into data 104. The data 1706 is received by transceiver(s) 1710 is forwarded to a translator 1712. The translator 1712 parses and encodes the data 1706 into a desired format.

Here, the translator 1712 translates the data 1706 into the format of the data 1704. The translator 1712 is managed by an administration module 1718. One or more memory pools 1716 store the information of the data 1706 and the data 1704. One or more clocks 1714 provide the timing information to the translation operations of the translator 1712. Once the translator 1712 finishes translating the data 1706, it forwards the newly formatted information as the data 1704 to the transceiver(s) 1708. The transceiver(s) 1708 forward the data 1704.

As one skilled in the relevant art would recognize based on the teachings described herein, the operational direction of bus translator 1702 can be reversed and the data 1704 received by the bus translator 1702 and the data 1706 forwarded after translation.

For ease of illustration, but without limitation, the process of translating the data 1706 into the data 1704 is herein described as receiving, reception, and the like. Additionally, for ease of illustration, but without limitation, the process of translating the data 1704 into the data 1706 is herein described as transmitting, transmission, and the like.

Figure 18:
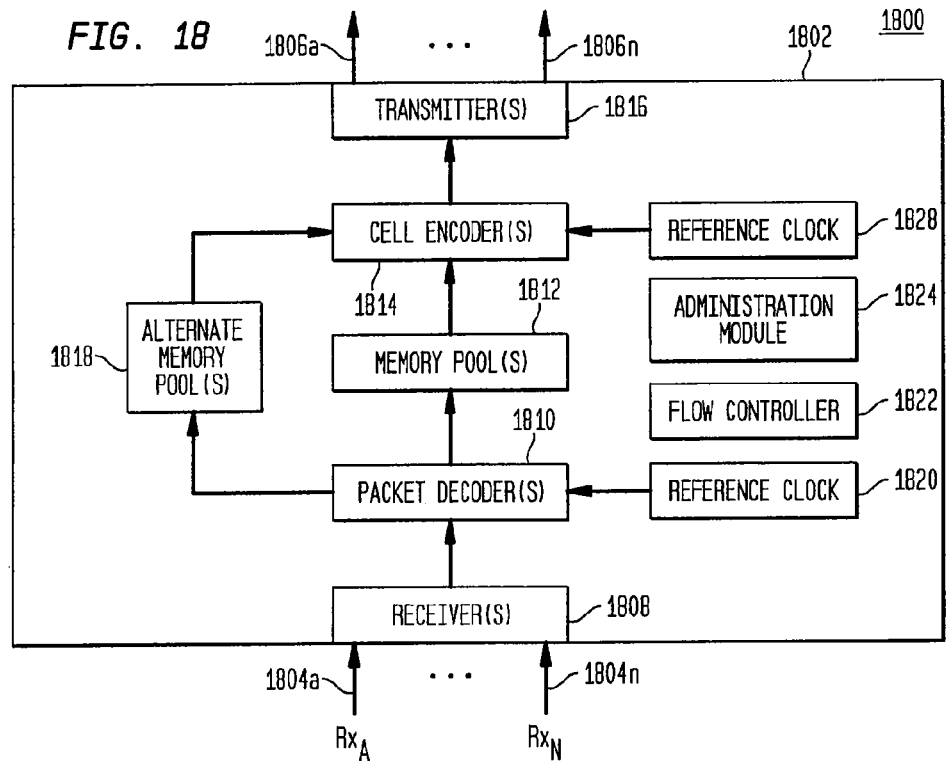
FIG. 18 illustrates a block diagram of the reception components according to one embodiment of the present invention.

In FIG. 18, a block diagram of the reception components according to one embodiment of the present invention. In one embodiment, bus translator 1802 receives data in the form of packets from interface connections 1804*a-n*. The interface connections 1804*a-n* couple to one or more receivers 1808 of bus translator 1802. Receivers 1808 forward the received packets to one or more packet decoders 1810. In one embodiment, the receiver(s) 1808 includes one or more physical ports. In an additional embodiment, each of receivers 1808 includes one or more logical ports. In one specific embodiment, the receiver(s) 1808 consists of four logical ports.

The packet decoders 1810 receive the packets from the receivers 1808. The packet decoders 1810 parse the information from the packets. In one embodiment, as is described below in additional detail, the packet decoders 1810 copy the payload information from each packet as well as the additional information about the packet, such as time and place of origin, from the start of packet (SOP) and the end of packet (EOP) sections of the packet. The packet decoders 1810 forward the parsed information to memory pool(s) 1812. In one embodiment, the bus translator 1802 includes more than one memory pool 1812. In an alternative embodiment, alternate memory pool(s) 1818 can be sent the information. In an additional embodiment, the packet decoder(s) 1810 can forward different types of information, such as payload, time of delivery, origin, and the like, to different memory pools of the pools 1812 and 1818.

Reference clock 1820 provides timing information to the packet decoder(s) 1810. In one embodiment, reference clock 1820 is coupled to the IPC/IGC components sending the packets through the connections 1804*a-n*. In another embodiment, the reference clock 1820 provides reference and timing information to all the parallel components of the bus translator 1802.

Cell encoder(s) 1814 receives the information from the memory pool(s) 1812. In an alternative embodiment, the cell encoder(s) 1814 receives the information from the alternative memory pool(s) 1818. The cell encoder(s) 1814 formats the information into cells.

In the description that follows, these cells are also referred to as narrow cells. Furthermore, the cell encoder(s) 1814 can be configured to format the information into one or more cell types. In one embodiment, the cell format is a fixed size. In another embodiment, the cell format is a variable size.

The cell format is described in detail below with regard to cell encoding and decoding processes of FIGS. 22, 23A-B, 24, and 25A-B.

The cell encoder(s) 1814 forwards the cells to transmitter(s) 1816. The transmitter(s) 1816 receive the cells and transmit the cells through interface connections 1806*a-n*.

Reference clock 1828 provides timing information to the cell encoder(s) 1814. In one embodiment, reference clock 1828 is coupled to the interface adapter components receiving the cells through the connections 1806*a-n*. In another embodiment, the reference clock 1828 provides reference and timing information to all the serial components of the bus translator 1802.

Flow controller 1822 measures and controls the incoming packets and outgoing cells by determining the status of the components of the bus translator 1802 and the status of the components connected to the bus translator 1802. Such components are previously described herein and additional detail is provided with regard to the interface adapters of the present invention.

In one embodiment, the flow controller 1822 controls the traffic through the connection 1806 by asserting a ready signal and de-asserting the ready signal in the event of an overflow in the bus translator 1802 or the IPC/IGC components further connected.

Administration module 1824 provides control features for the bus translator 1802. In one embodiment, the administration module 1824 provides error control and power-on and reset functionality for the bus translator 1802.

Figure 19:
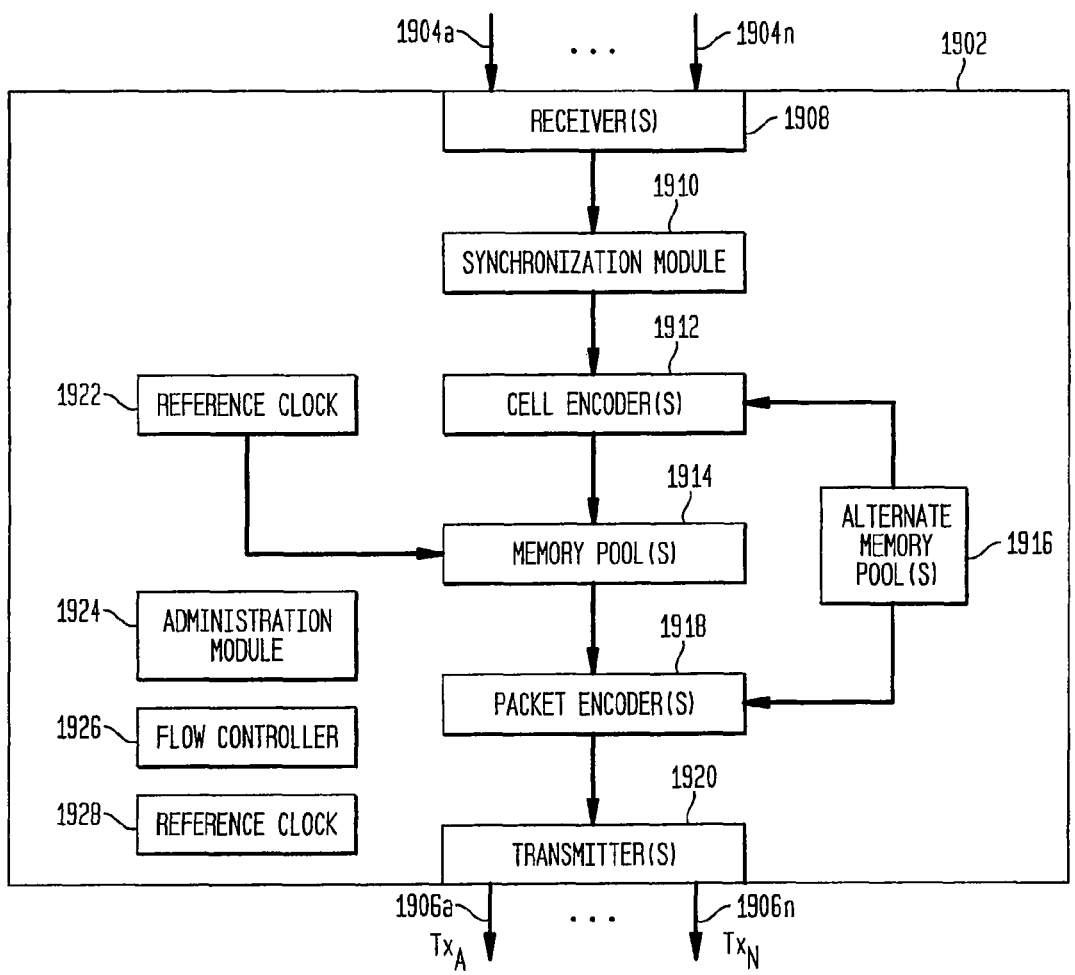
FIG. 19 illustrates a block diagram of the transmission components according to one embodiment of the present invention.

FIG. 19 illustrates a block diagram of the transmission components according to one embodiment of the present invention. In one embodiment, bus translator 1902 receives data in the form of cells from interface connections 1904*a-n*. The interface connections 1904*a-n* couple to one or more receivers 1908 of bus translator 1902. In one embodiment, the receiver(s) 1908 include one or more physical ports. In an additional embodiment, each of receivers 1908 includes one or more logical ports. In one specific embodiment, the receiver(s) 1908 consists of four logical ports. Receivers 1908 forward the received cells to a synchronization module 1910. In one embodiment, the synchronization module 1910 is a FIFO used to synchronize incoming cells to the reference clock 1922. It is noted that although there is no direct arrow shown in FIG. 19 from reference clock 1922 to synchronization module 1910, the two module can communicate such that the synchronization module is capable of synchronizing the incoming cells. The synchronization module 1910 forwards the one or more cell decoders 1912.

The cell decoders 1912 receive the cells from the synchronization module 1910. The cell decoders 1912 parse the information from the cells. In one embodiment, as is described below in additional detail, the cell decoders 1912 copy the payload information from each cell as well as the additional information about the cell, such as place of origin, from the slot and state information section of the cell.

In one embodiment, the cell format can be fixed. In another embodiment, the cell format can be variable. In yet another embodiment, the cells received by the bus translator 1902 can be of more than one cell format. The bus translator 1902 can be configured to decode these cell format as one skilled in the relevant art would recognize based on the teachings herein. Further details regarding the cell formats is described below with regard to the cell encoding processes of the present invention.

The cell decoders 1912 forward the parsed information to memory pool(s) 1914. In one embodiment, the bus translator 1902 includes more than one memory pool 1914. In an alternative embodiment, alternate memory pool(s) 1916 can be sent the information. In an additional embodiment, the cell decoder(s) 1912 can forward different types of information, such as payload, time of delivery, origin, and the like, to different memory pools of the pools 1914 and 1916.

Reference clock 1922 provides timing information to the cell decoder(s) 1912. In one embodiment, reference clock 1922 is coupled to the interface adapter components sending the cells through the connections 1904a-n. In another embodiment, the reference clock 1922 provides reference and timing information to all the serial components of the bus translator 1902.

Packet encoder(s) 1918 receive the information from the memory pool(s) 1914. In an alternative embodiment, the packet encoder(s) 1918 receive the information from the alternative memory pool(s) 1916. The packet encoder(s) 1918 format the information into packets.

The packet format is determined by the configuration of the IPC/IGC components and the requirements for the system.

The packet encoder(s) 1918 forwards the packets to transmitter(s) 1920. The transmitter(s) 1920 receive the packets and transmit the packets through interface connections 1906a-n.

Reference clock 1928 provides timing information to the packet encoder(s) 1918. In one embodiment, reference clock 1928 is coupled to the IPC/IGC components receiving the packets through the connections 1906a-n. In another embodiment, the reference clock 1928 provides reference and timing information to all the parallel components of the bus translator 1902.

Flow controller 1926 measures and controls the incoming cells and outgoing packets by determining the status of the components of the bus translator 1902 and the status of the components connected to the bus translator 1902. Such components are previously described herein and additional detail is provided with regard to the interface adapters of the present invention.

In one embodiment, the flow controller 1926 controls the traffic through the connection 1906 by asserting a ready signal and de-asserting the ready signal in the event of an overflow in the bus translator 1902 or the IPC/IGC components further connected.

Administration module 1924 provides control features for the bus translator 1902. In one embodiment, the administration module 1924 provides error control and power-on and reset functionality for the bus translator 1902.

Figure 20:
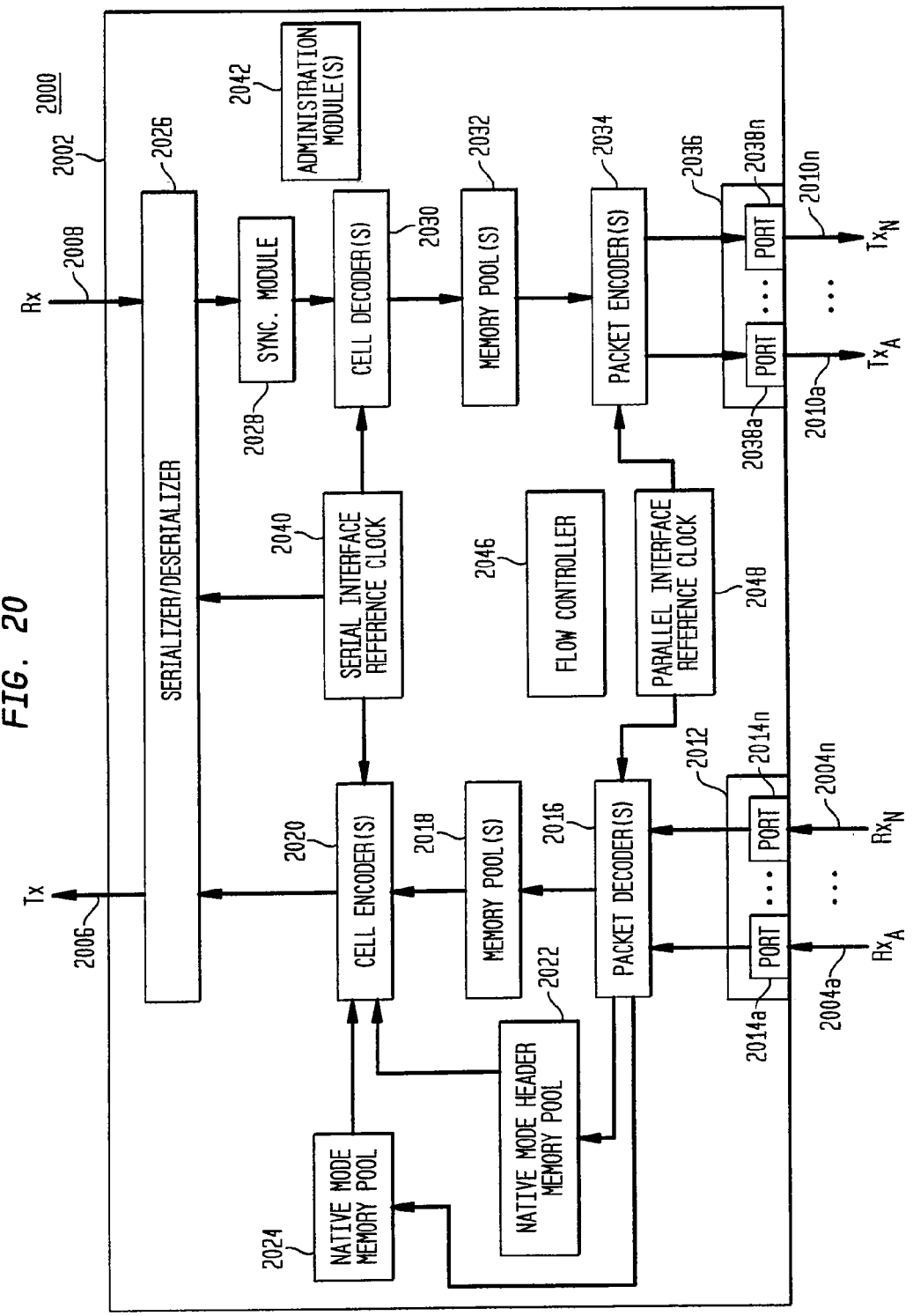
FIG. 20 illustrates a detailed block diagram of the bus translator according to one embodiment of the present invention.

In FIG. 20, a detailed block diagram of the bus translator according to one embodiment, is shown. Bus translator 2002 incorporates the functionality of bus translators 1802 and 1902.

In terms of packet processing, packets are received by the bus translator 2002 by receivers 2012. The packets are processed into cells and forwarded to a serializer/deserializer (SERDES) 2026. SERDES 2026 acts as a transceiver for the cells being processed by the bus translator 2002. The SERDES 2026 transmits the cells via interface connection 2006.

In terms of cell processing, cells are received by the bus translator 2002 through the interface connection 2008 to the SERDES 2026. The cells are processed into packets and forwarded to transmitters 2036. The transmitters 2036 forward the packets to the IPC/IGC components through interface connections 2010a-n.

The reference clocks 2040 and 2048 are similar to those previously described in FIGS. 18 and 19. The reference clock 2040 provides timing information to the serial components of the bus translator 2002. As shown, the reference clock 2040 provides timing information to the cell encoder(s) 2020, cell decoder(s) 2030, and the SERDES 2026. The reference clock 2048 provides timing information to the parallel components of bus translator 2002. As shown, the reference clock 2048 provides timing information to the packet decoder(s) 2016 and packet encoder(s) 2034.

The above-described separation of serial and parallel operations is a feature of embodiments of the present invention. In such embodiments, the parallel format of incoming and leaving packets at ports 2014a-n and 2038a-b, respectively, is remapped into a serial cell format at the SERDES 2026.

Furthermore, according to embodiments of the present invention, the line rates of the ports 2014a-n have a shared utilization limited only by the line rate of output 2006. Similarly for ports 2038a-n and input 2008.

Figure 21A:
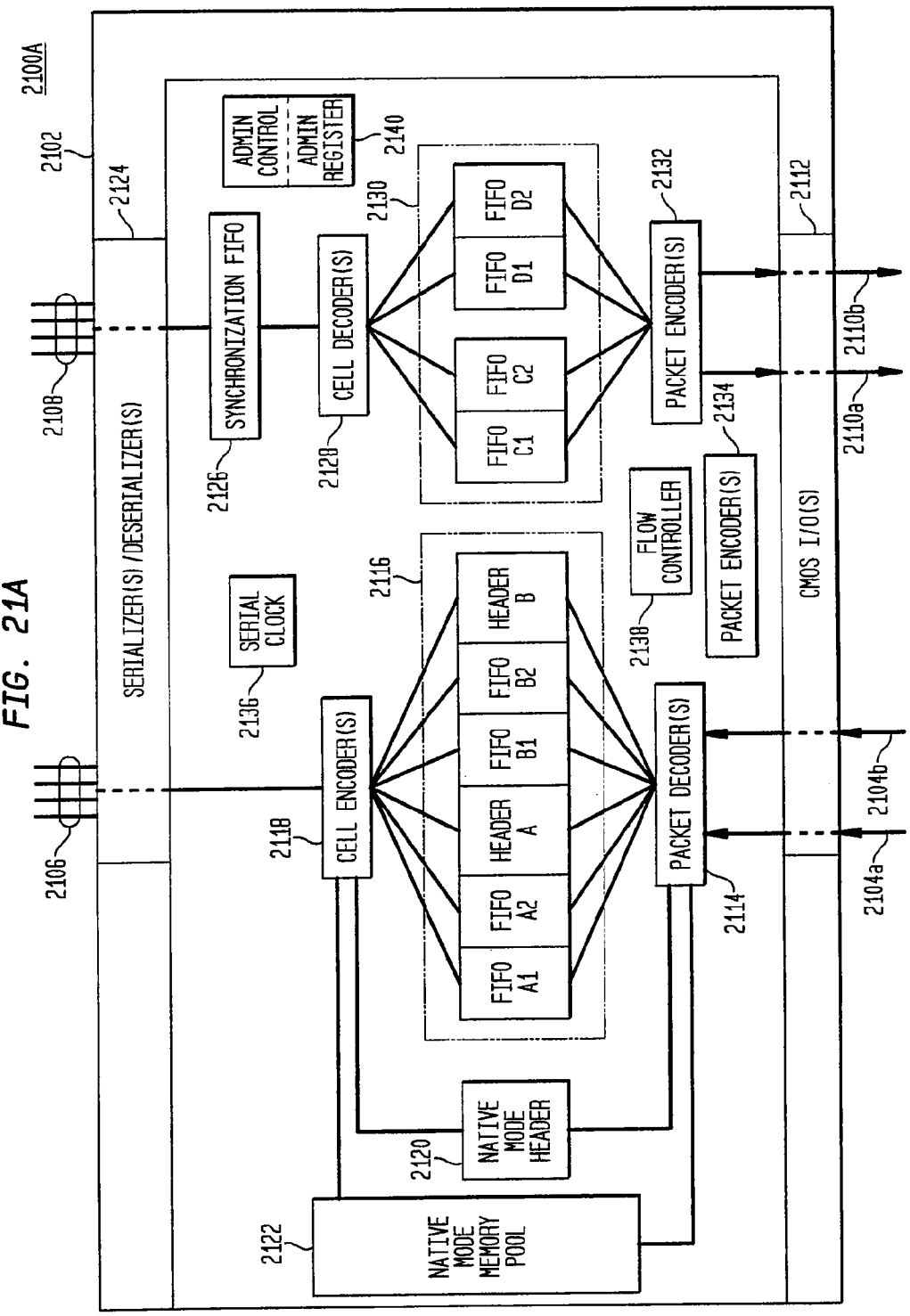
FIG. 21A illustrates a detailed block diagram of the bus translator according to another embodiment of the present invention.
Figure 21B:
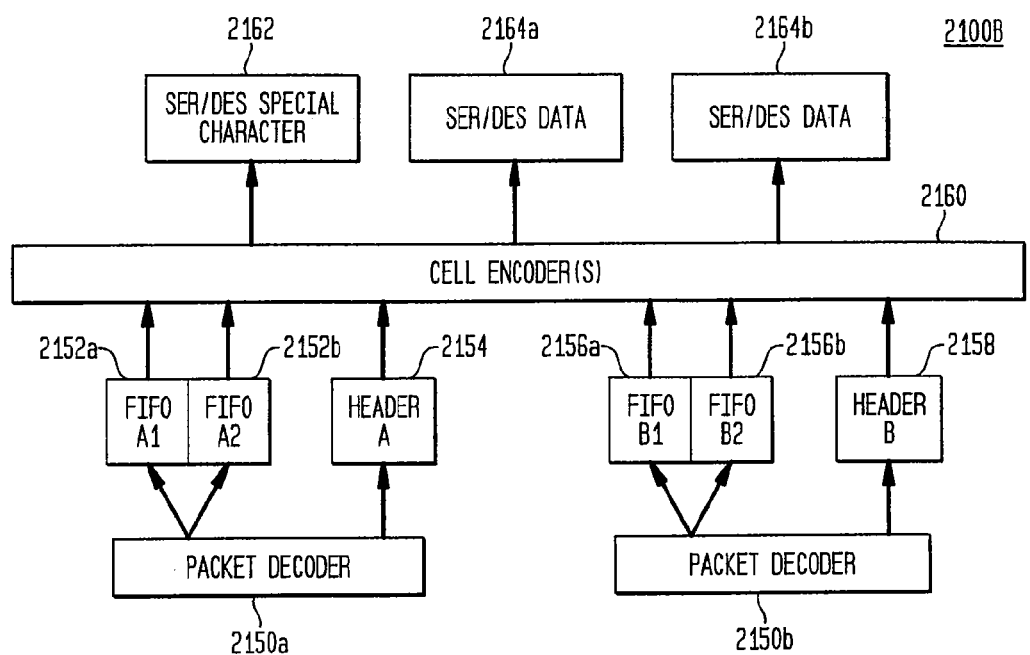
FIG. 21B shows a functional block diagram of the data paths with reception components of the bus translator according to one embodiment of the present invention.
Figure 21C:
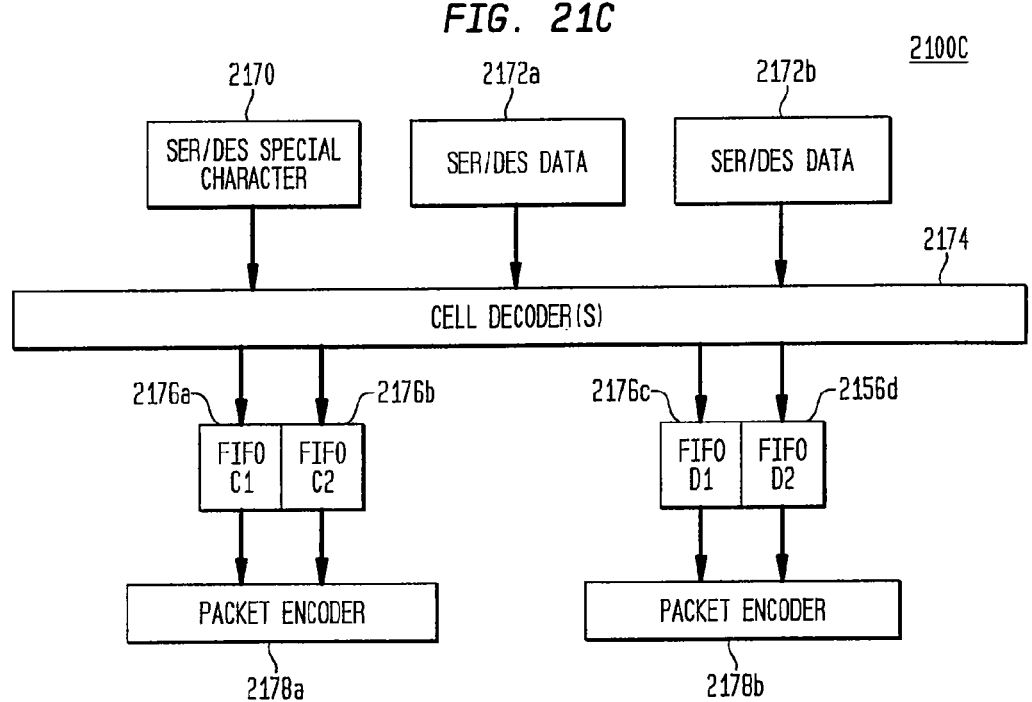
FIG. 21C shows a functional block diagram of the data paths with transmission components of the bus translator according to one embodiment of the present invention.
Figure 21D:
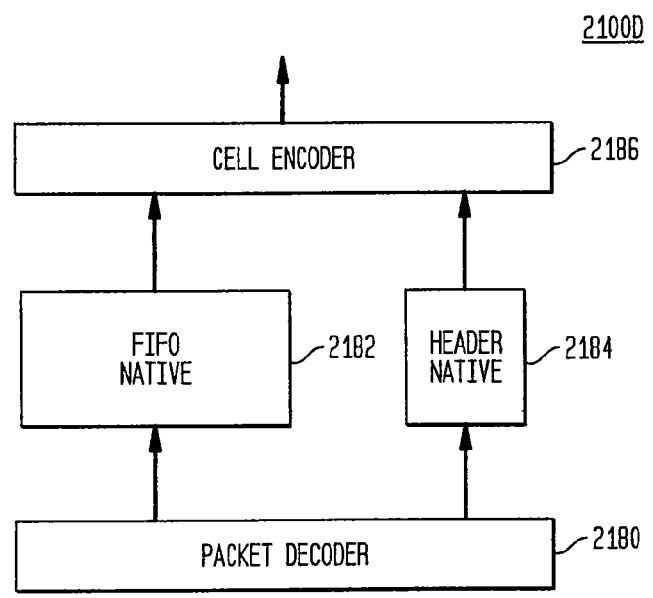
FIG. 21D shows a functional block diagram of the data paths with native mode reception components of the bus translator according to one embodiment of the present invention.
Figure 21E:
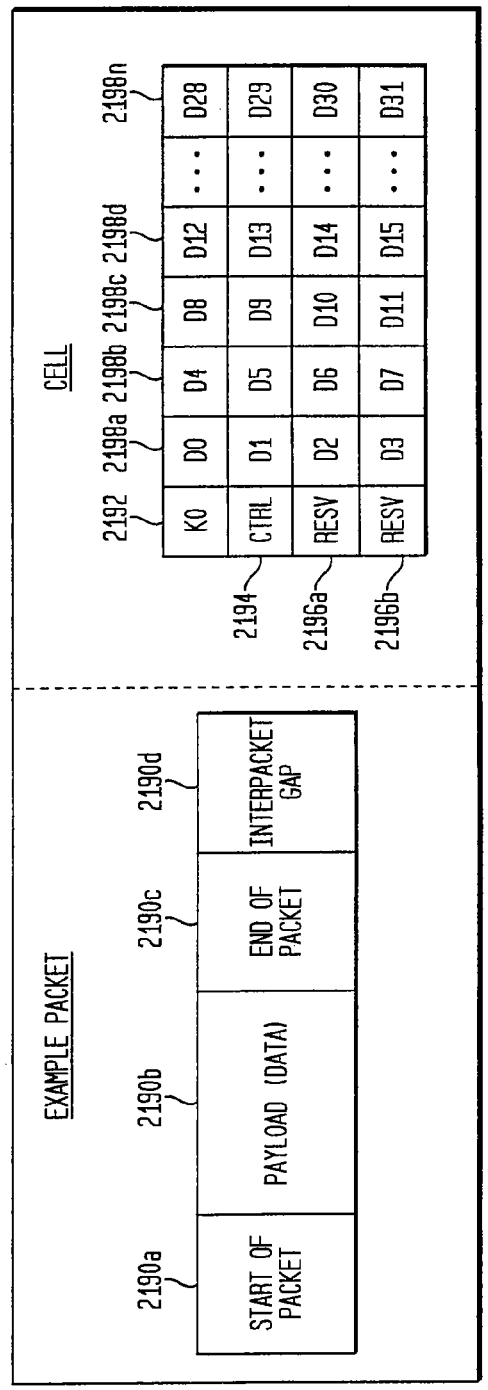
FIG. 21E shows a block diagram of a cell format according to one embodiment of the present invention.

The remapping of parallel packets into serial cells is described in further detail herein, more specifically with regard to FIG. 21E.

In FIG. 21A, a detailed block diagram of the bus translator, according to another embodiment of the present invention, is shown. The receivers and transmitters of FIGS. 18, 19, and 20 are replaced with CMOS I/Os 2112 capable of providing the same functionality as previously described. The CMOS I/Os 2112 can be configured to accommodate various numbers of physical and logical ports for the reception and transmission of data.

Administration module 2140 operates as previously described. As shown, the administration module 2140 includes an administration control element and an administration register. The administration control element monitors the operation of the bus translator 2102 and provides the reset and power-on functionality as previously described with regard to FIGS. 18, 19, and 20. The administration register caches operating parameters such that the state of the bus translator 2102 can be determined based on a comparison or look-up against the cached parameters.

The reference clocks 2134 and 2136 are similar to those previously described in FIGS. 18, 19, and 20. The reference clock 2136 provides timing information to the serial components of the bus translator 2102. As shown, the reference clock 2136 provides timing information to the cell encoder(s) 2118, cell decoder(s) 2128, and the SERDES 2124. The reference clock 2134 provides timing information to the parallel components of bus translator 2102. As shown, the reference clock 2134 provides timing information to the packet decoder(s) 2114 and packet encoder(s) 2132.

As shown in FIG. 21A, memory pool 2116 includes two pairs of FIFOs. Each FIFO pair with a header queue. The memory pool 2116 performs as previously described memory pools in FIGS. 18 and 20. In one embodiment, payload or information portions of decoded packets is stored iii one or more FIFOs and the timing, place of origin, destination, and similar information is stored in the corresponding header queue.

Additionally, memory pool 2130 includes two pairs of FIFOs. The memory pool 2130 performs as previously described memory pools in FIGS. 19 and 20. In one embodiment, decoded cell information is stored in one or more FIFOs along with corresponding timing, place of origin, destination, and similar information.

Interface connections 2106 and 2108 connect previously described interface adapters to the bus translator 2102 through the SERDES 2124. In one embodiment, the connections 2106 and 2108 are serial links. In another embodiment, the serial links are divided four lanes.

In one embodiment, the bus translator 2102 is an IBT 304 that translates one or more 4 Gbps parallel IPC/IGC components into four 3.125 Gbps serial XAUI interface links or lanes. In one embodiment, the back planes are the IPC/IGC interface connections. The bus translator 2102 formats incoming data into one or more cell formats.

In one embodiment, the cell format can be a four byte header and a 32 byte data payload. In a further embodiment, each cell is separated by a special K character into the header. In another embodiment, the last cell of a packet is indicated by one or more special K1 characters.

The cell formats can include both fixed length cells and variable length cells. The 36 bytes (4 byte header plus 32 byte payload) encoding is an example of a fixed length cell format. In an alternative embodiment, cell formats can be implemented where the cell length exceeds the 36 bytes (4 bytes+ 32 bytes) previously described.

In FIG. 21B, a functional block diagram shows the data paths with reception components of the bus translator. Packet decoders 2150*a-b* forward packet data to the FIFOs and headers in pairs. For example, packet decoder 2150*a* forwards packet data to FIFO 2152*a-b* and side-band information to header 2154. A similar process is followed for packet decoder 2150*b*. Packet decoder 2150*b* forwards packet data to FIFO 2156*a-b* and side-band information to header 2158. Cell encoder(s) 2160 receive the data and control information and produce cells to serializer/deserializer (SERDES) circuits, shown as their functional components SERDES special character 2162, and SERDES data 2164*a-b*. The SERDES special character 2162 contains the special characters used to indicate the start and end of a cell's data payload. The SERDES data 2164*a-b* contains the data payload for each cell, as well as the control information for the cell. Cell structure is described in additional detail below, with respect to FIG. 21E.

The bus translator 2102 has memory pools 2116 to act as internal data buffers to handle pipeline latency. For each IPC/IGC component, the bus translator 2102 has two data FIFOs and one header FIFO, as shown in FIG. 21A as the FIFOs of memory pool 2116 and in FIG. 21B as elements 2152*a-b*, 2154, 2156*a-b*, and 2158. In one embodiment, side band information is stored in each of the headers A or B. 32 bytes of data is stored in one or more of the two data FIFOs A1, A2, or B1, B2 in a ping-pong fashion. The ping-pong fashion is well-known in the relevant art and involves alternating fashion.

In one embodiment, the cell encoder 2160 merges the data from each of the packet decoders 2150*a-b* into one 10 Gbps data stream to the interface adapter. The cell encoder 2160 merges the data by interleaving the data at each cell boundary. Each cell boundary is determined by the special K characters.

According to one embodiment, the received packets are 32 bit aligned, while the parallel interface of the SERDES elements is 64 bit wide.

In practice it can be difficult to achieve line rate for any packet length. Line rate means maintaining the same rate of output in cells as the rate at which packets are being received. Packets can have a four byte header overhead (SOP) and a four byte tail overhead (EOP). Therefore, the bus translators 2102 must parse the packets without the delays of typical parsing and routing components. More specifically, the bus translators 2102 formats parallel data into cell format using special K characters, as described in more detail below, to merge state information and slot information (together, control information) in band with the data streams. Thus, in one embodiment, each 32 bytes of cell data is accompanied by a four byte header.

FIG. 21C shows a functional block diagram of the data paths with transmission components of the bus translator according to one embodiment of the present invention. Cell decoder(s) 2174 receive cells from the SERDES circuit. The functional components of the SERDES circuit include elements 2170, and 2172*a-b*. The control information and data are parsed from the cell and forward to the memory pool(s). In one embodiment, FIFOs are maintained in pairs, shown as elements 2176*a-b* and 2176*c-d*. Each pair forwards control information and data to packet encoders 2178*a-b*.

FIG. 21D shows a functional block diagram of the data paths with native mode reception components of the bus translator according to one embodiment of the present invention. In one embodiment, the bus translator 2102 can be configured into native mode. Native mode can include when a total of 10 Gbps connections are maintained at the parallel end (as shown by CMOS I/Os 2112) of the bus translator 2102. In one embodiment, due to the increased bandwidth requirement (from 8 Gbps to 10 Gbps), the cell format length is no longer fixed at 32 bytes. In embodiments where 10 Gbps traffic is channeled through the bus translator 2102, control information is attached when the bus translator 2102 receives a SOP from the device(s) on the 10 Gbps link. In an additional embodiment, when the bus translator 2102 first detects a data transfer and is, therefore, coming to an operational state from idle, it attaches control information.

In an additional embodiment, as shown in FIG. 21D, two separate data FIFOs are used to temporarily buffer the up-linking data; thus avoiding existing timing paths.

Although a separate native mode data path is not shown for cell to packet translation, one skilled in the relevant art would recognize how to accomplish it based at least on the teachings described herein. For example, by configuring two FIFOs for dedicated storage of 10 Gbps link information. In one embodiment, however, the bus translator 2102 processes native mode and non-native mode data paths in a shared operation as shown in FIGS. 19, 20, and 21. Headers and idle bytes are stripped from the data stream by the cell decoder(s), such as decoder(s) 2103 and 2174. Valid data is parsed and stored, and forwarded, as previously described, to the parallel interface.

In an additional embodiment, where there is a zero body cell format being received by the interface adapter or BIA, the IBT 304 holds one last data transfer for each source slot. When it receives the EOP with the zero body cell format, the last one or two transfers are released to be transmitted from the parallel interface.

S. Narrow Cell and Packet Encoding Processes

FIG. 21E shows a block diagram of a cell format according to one embodiment of the present invention. FIG. 21E shows both an example packet and a cell according to the embodiments described herein. The example packet shows a start of packet 2190*a*, payload containing data 2190*b*, end of packet 2190*c*, and inter-packet gap 2190*c*.

According to one embodiment of the present invention, the cell includes a special character K0 2190; a control information 2194; optionally, one or more reserved 2196*a-b*; and data 2198*a-n*. In an alternate embodiment, data 2198*a-n* can contain more than D0-D31.

In one embodiment, the four rows or slots indicated in FIG. 21E illustrate the four lanes of the serial link through which the cells are transmitted and/or received.

As previously described herein, the IBT 304 transmits and receives cells to and from the BTA 302 through the XAUI interface. The IBT 304 transmits and receives packets to and from the IPC/IGC components, as well as other controller components (i.e., 10GE packet processor) through a parallel interface. The packets are segmented into cells which consist of a four byte header followed by 32 bytes of data. The end of packet is signaled by K1 special character on any invalid data bytes within four byte of transfer or four K1 on all XAUI lanes. In one embodiment, each byte is serialized onto one XAUI lane. The following table illustrates in a right to left formation a byte by byte representation of a cell according to one embodiment of the present invention:

| Lane0 | Lane1 | Lane2 | Lane3 |
|-------|-------|-------|-------|
| K0 | State | Reserved | Reserved |
| D0 | D1 | D2 | D3 |
| D4 | D5 | D6 | D7 |
| D8 | D9 | D10 | D11 |
| D12 | D13 | D14 | D15 |
| • | • | • | • |
| • | • | • | • |
| • | • | • | • |
| D28 | D29 | D30 | D31 |

The packets are formatted into cells that consist of a header plus a data payload. The 4 bytes of header takes one cycle or row on four XAUI lanes. It has K0 special character on Lane 0 to indicate that current transfer is a header. The control information starts on Lane 1 of a header.

In one embodiment, the IBT 304 accepts two IPC/IGC back plane buses and translates them into one 10 Gbps serial stream.

Figure 22:
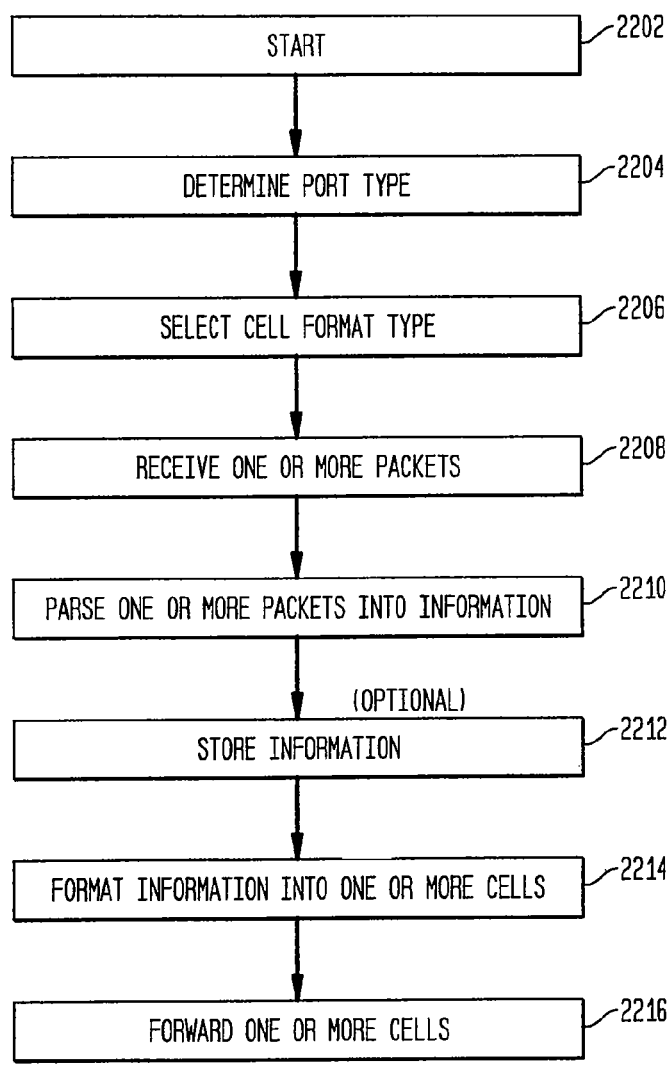
FIG. 22 illustrates a flow diagram of the encoding process of the bus translator according to one embodiment of the present invention.

In FIG. 22, a flow diagram of the encoding process of the bus translator according to one embodiment of the present invention is shown. The process starts at step 2202 and immediately proceeds to step 2204.

In step 2204, the IBT 304 determines the port types through which it will be receiving packets. In one embodiment, the ports are configured for 4 Gbps traffic from IPC/IGC components. The process immediately proceeds to step 2206.

In step 2206, the IBT 304 selects a cell format type based on the type of traffic it will be processing. In one embodiment, the IBT 304 selects the cell format type based in part on the port type determination of step 2204. The process immediately proceeds to step 2208.

In step 2208, the IBT 304 receives one or more packets from through its ports from the interface connections, as previously described. The rate at which packets are delivered depends on the components sending the packets. The process immediately proceeds to step 2210.

In step 2210, the IBT 304 parses the one or more packets received in step 2208 for the information contained therein. In one embodiment, the packet decoder(s) of the IBT 304 parse the packets for the information contained within the payload section of the packet, as well as the control or routing information included with the header for that each given packet. The process immediately proceeds to step 2212.

In step 2212, the IBT 304 optionally stores the information parsed in step 2210. In one embodiment, the memory pool(s) of the IBT 304 are utilized to store the information. The process immediately proceeds to step 2214.

In step 2214, the IBT 304 formats the information into one or more cells. In one embodiment, the cell encoder(s) of the IBT 304 access the information parsed from the one or more packets. The information includes the data being trafficked as well as slot and state information (i.e., control information) about where the data is being sent. As previously described, the cell format includes special characters which are added to the information. The process immediately proceeds to step 2216.

In step 2216, the IBT 304 forwards the formatted cells. In one embodiment, the SERDES of the IBT 304 receives the formatted cells and serializes them for transport to the BIA 302 of the present invention. The process continues until instructed otherwise.

In FIGS. 23A-B, a detailed flow diagram shows the encoding process of the bus translator according to one embodiment of the present invention. The process of FIGS. 23A-B begins at step 2302 and immediately flows to step 2304.

In step 2304, the IBT 304 determines the port types through which it will be receiving packets. The process immediately proceeds to step 2306.

In step 2306, the IBT 304 determines if the port type will, either individually or in combination, exceed the threshold that can be maintained. In other words, the IBT 304 checks to see if it can match the line rate of incoming packets without reaching the internal rate maximum. If it can, then the process proceeds to step 2310. In not, then the process proceeds to step 2308.

In step 2308, given that the IBT 304 has determined that it will be operating at its highest level, the IBT 304 selects a variable cell size that will allow it to reduce the number of cells being formatted and forwarded in the later steps of the process. In one embodiment, the cell format provides for cells of whole integer multiples of each of the one or more packets received. In another embodiment, the IBT 304 selects a cell format that provides for a variable cell size that allows for maximum length cells to be delivered until the packet is completed. For example, if a given packet is 2.3 cell lengths, then three cells will be formatted, however, the third cell will be a third that is the size of the preceding two cells. The process immediately proceeds to step 2312.

In step 2310, given that the IBT 304 has determined that it will not be operating at its highest level, the IBT 304 selects a fixed cell size that will allow the IBT 304 to process information with lower processing overhead. The process immediately proceeds to step 2312.

In step 2312, the IBT 304 receives one or more packets. The process immediately proceeds to step 2314.

In step 2314, the MT 304 parses the control information from each of the one or more packets. The process immediately proceeds to step 2316.

In step 2316, the IBT 304 determines the slot and state information for each of the one or more packets. In one embodiment, the slot and state information is determined in part from the control information parsed from each of the one or more packets. The process immediately proceeds to step 2318.

In step 2318, the MT 304 stores the slot and state information. The process immediately proceeds to step 2320.

In step 2320, the IBT 304 parses the payload of each of the one or more packets for the data contained therein. The process immediately proceeds to step 2322.

In step 2322, the IBT 304 stores the data parsed from each of the one or more packets. The process immediately proceeds to step 2324.

In step 2324, the IBT 304 accesses the control information. In one embodiment, the cell encoder(s) of the IBT 304 access the memory pool(s) of the IBT 304 to obtain the control information. The process immediately proceeds to step 2326.

In step 2326, the MT 304 accesses the data parsed from each of the one or more packets. In one embodiment, the cell encoder(s) of the MT 304 access the memory pool(s) of the IBT 304 to obtain the data. The process immediately proceeds to step 2328.

In step 2328, the IBT 304 constructs each cell by inserting a special character at the beginning of the cell currently being constructed. In one embodiment, the special character is K0. The process immediately proceeds to step 2330.

In step 2330, the IBT 304 inserts the slot information. In one embodiment, the JET 304 inserts the slot information into the next lane, such as space 2194. The process immediately proceeds to step 2332.

In step 2332, the IBT 304 inserts the state information. In one embodiment, the IBT 304 inserts the state information into the next lane after the one used for the slot information, such as reserved 2196a. The process immediately proceeds to step 2334.

In step 2334, the IBT 304 inserts the data. The process immediately proceeds to step 2336.

In step 2336, the IBT 304 determines if there is additional data to be formatted. For example, if there is remaining data from a given packet. If so, then the process loops back to step 2328. If not, then the process immediately proceeds to step 2338.

In step 2338, the IBT 304 inserts the special character that indicated the end of the cell transmission (of one or more cells). In one embodiment, when the last of a cells is transmitted, the special character is K1. The process proceeds to step 2340.

In step 2340, the IBT 304 forwards the cells. The process continues until instructed otherwise.

In FIG. 24, a flow diagram illustrates the decoding process of the bus translator according to one embodiment of the present invention. The process of FIG. 24 begins at step 2402 and immediately proceeds to step 2404.

In step 2404, the IBT 304 receives one or more cells. In one embodiment, the cells are received by the SERDES of the IBT 304 and forwarded to the cell decoder(s) of the IBT 304. In another embodiment, the SERDES of the IBT 304 forwards the cells to a synchronization buffer or queue that temporarily holds the cells so that their proper order can be maintained. These steps are described below with regard to steps 2406 and 2408. The process immediately proceeds to step 2406.

In step 2406, the IBT 304 synchronizes the one or more cells into the proper order. The process immediately proceeds to step 2408.

In step 2408, the IBT 304 optionally checks the one or more cells to determine if they are in their proper order.

In one embodiment, steps 2506, 2508, and 2510 are performed by a synchronization FIFO. The process immediately proceeds to step 2410.

In step 2410, the IBT 304 parses the one or more cells into control information and payload data. The process immediately proceeds to step 2412.

In step 2412, the IBT 304 stores the control information payload data. The process immediately proceeds to step 2414.

In step 2414, the IBT 304 formats the information into one or more packets. The process immediately proceeds to step 2416.

In step 2416, the IBT 304 forwards the one or more packets. The process continues until instructed otherwise.

In FIGS. 25A-B, a detailed flow diagram of the decoding process of the bus translator according to one embodiment of the present invention is shown. The process of FIGS. 25A-B begins at step 2502 and immediately proceeds to step 2504.

In step 2504, the IBT 304 receives one or more cells. The process immediately proceeds to step 2506.

In step 2506, the IBT 304 optionally queues the one or more cells. The process immediately proceeds to step 2508.

In step 2508, the IBT 304 optionally determines if the cells are arriving in the proper order. If so, then the process immediately proceeds to step 2512. If not, then the process immediately proceeds to step 2510.

In step 2510, The IBT 304 holds one or more of the one or more cells until the proper order is regained. In one embodiment, in the event that cells are lost, the IBT 304 provides error control functionality, as described herein, to abort the transfer and/or have the transfer re-initiated. The process immediately proceeds to step 2514.

In step 2512, the IBT 304 parses the cell for control information. The process immediately proceeds to step 2514.

In step 2514, the IBT 304 determines the slot and state information. The process immediately proceeds to step 2516.

In step 2516, the IBT 304 stores the slot and state information. The process immediately proceeds to step 2518.

In one embodiment, the state and slot information includes configuration information as shown in the table below:

| Field | Name | Description |
| --- | --- | --- |
| State[3:0] | Slot Number | Destination slot number from IBT to SBIA. IPC can address 10 slots(7 remote, 3 local) and IGC can address 14 slots (7 remote and 7 local) |
| State [5:4] | Payload State | Encode payload state:<br>00 - RESERVED<br>01 - SOP<br>10 - DATA<br>11 - ABORT |
| State[6] | Source/Destination IPC | Encode source/destination IPC id number:<br>0 - to/from IPC0<br>1 - to/from IPC1 |
| State [7] | Reserved | Reserved |

In one embodiment, the IBT 304 has configuration registers. They are used to enable Backplane and IPC/IGC destination slots.

In step 2518, the IBT 304 parses the cell for data. The process immediately proceeds to step 2520.

In step 2520, the IBT 304 stores the data parsed from each of the one or more cells. The process immediately proceeds to step 2522.

In step 2522, the IBT 304 accesses the control information. The process immediately proceeds to step 2524.

In step 2524, the IBT 304 access the data. The process immediately proceeds to step 2526.

In step 2526, the IBT 304 forms one or more packets. The process immediately proceeds to step 2528.

In step 2528, the MT 304 forwards the one or more packets. The process continues until instructed otherwise.

T. Administrative Process and Error Control

This section describes potential error conditions that might occur in serial links and cross-point switches in the backplane as well as various error control embodiments of the present invention. Various recovery and reset routines of the present invention are also described.

The routines described herein are generally designed to detect, prevent, and recover from errors of the following nature:

1) Link Error—Link error occurs as a result of a bit error or a byte alignment problem within a SERDES. Since the clock is recovered from the data stream, there is a possibility of a byte alignment problem if there isn't enough data transition. Bit error can also occur as a result of external noise on the line. The SERDES can also detect exception conditions such as SOP characters in lane 1 and can mark them as link errors.

2) Lane Synchronization Error—The lane is defined as one serial link among the four serial links that make up the 10 Gbps SERDES. As described elsewhere herein, there are four deep FIFOs within the SERDES core to compensate for any transmission line skew and synchronize the lanes such as to present a unified 10 Gbps stream to the core logic. There are possible cases where the FIFOs might overflow or underflow, which can result in lane synchronization error. There are also scenarios when a lane synchronization sequence might determine a possible alignment problem.

3) Stripe Synchronization Error—Stripe synchronization error refers to any error in the flow of wide cells of data sent across multiple stripes through the switching fabric according to the invention. Such stripe synchronization errors (also referred to as stripe synchronization error conditions or simply error conditions) can be due to a link error in a serial pipe leading to or from a cross-point, or to an error in the cross-point itself.

In one embodiment, a receiving BIA contains deep FIFOs (such as 56 or 64 FIFOs) that are sorted according to sending source and stripe. Stripe synchronization errors can be detected by monitoring the FIFOs and detecting an overflow and/or underflow of one or more FIFOs within the striped data paths. In other scenarios, the stripes may become completely out of synchronization. In one recovery embodiment, some or all of the XPNT modules would arbitrate independently, as the XPNT modules operate independently, as described elsewhere herein, to clear the FIFOs affected and recover from a known state.

Additional error conditions and combinations of error conditions are possible, as would be apparent to one skilled in the relevant art(s) based at least on the teachings herein.

The routines for detection and prevention of these error conditions are summarized immediately below and described with respect to detailed embodiments of the present invention thereafter.

In general, the present invention can manage the bus translator as illustrated in FIG. 26. In FIG. 26, a flow diagram shows the administrating process of the bus translator according to one embodiment of the present invention. The process of FIG. 26 begins at step 2602 and immediately proceeds to step 2604.

In step 2604, the IBT 304 determines the status of its internal components. The process immediately proceeds to step 2606.

In step 2606, the IBT 304 determines the status of its links to external components. The process immediately proceeds to step 2608.

In step 2608, the IBT 304 monitors the operations of both the internal and external components. The process immediately proceeds to step 2610.

In step 2610, the IBT 304 monitors the registers for administrative commands. The process immediately proceeds to step 2612.

In step 2612, the IBT 304 performs resets of given components as instructed. The process immediately proceeds to step 2614.

In step 2614, the IBT 304 configures the operations of given components. The process continues until instructed otherwise.

In one embodiment, any errors are detected on the receiving side of the BIA 302 are treated in a fashion identical to the error control methods described herein for errors received on the XPNT 202 from the BIA 302. In operational embodiments where the destination slot cannot be known under certain conditions by the BIA 302, the following process is carried out by BIA 302:

a. Send an abort of packet (AOP) to all slots.
b. Wait for error to go away, that is, when buffers are cleared or flushed.
c. Once buffers are clear, sync to the first K0 token with SOP to begin accepting data.

In the event that an error is detected on the receiving side of the IBT 304, it is treated as if the error was seen by the BIA 302 from IBT 304. The following process will be used:

a. Send an AOP to all slots of down stream IPC/IGC to terminate any packet in progress.
b. Wait for buffers to fill and clear error causing data.
c. Sync to K0 token after error goes away (after buffers are flushed) to begin accepting data.

(1) BIA Administrative Module

In one embodiment, administrative module 676 of FIG. 6 provides the monitoring, detection and correction functionality of the present invention. As Among other things, administrative module 676 handles stripe synchronization errors. As shown in FIG. 28A, administrative module 676 can include a level monitor 2806, a stripe synchronization error detector 2808, a control character (K2) presence tracker 2810, and a flow controller 2812. Level monitor 2806 checks FIFOs and determines the amount of data within each FIFO and/or within a group of FIFOs associated with a particular stripe and source (such as a slot or a particular source packet processor of a slot).

Stripe synchronization error detector 2808 detects stripe synchronization errors based on the conditions of the FIFOs monitored by level monitor 2806. A stripe synchronization error can be any error in the flow of wide cells of data sent across multiple stripes through the switching fabric according to the invention. Such stripe synchronization errors can be due to a link error in a serial pipe leading to or from a cross-point, or to an error in the cross-point itself. For clarity, a link error in a serial pipe leading from a sending BIA to a cross-point is referred to as an "incoming link error", and a link error in a serial pipe leading from a cross-point to a receiving BIA is referred to as an "outgoing link error." When a stripe synchronization error is detected, stripe synchronization error detector 2808 sends a signal to flow controller 2812. Flow controller 2812 then initiates an appropriate recovery routine to re-synchronize data flow across the stripes in the switching fabric. Among other things, such a recovery routine can involve sending control characters (such as special K2 characters) across the stripes in the switching fabric. Control character (K2) presence tracker 2810 monitors special K2 characters received in the data flow at a BIA. Flow controller 2812 also provides control logic for the administrative module 676 and the modules therein. Flow controller 2812 allows the modules of the administrative module 676 to perform their functions as described herein by the transmitter and receiving information regarding the status of the various FIFOs, BIAs, XPNTs, and other components of the present invention. Examples of detection and recovery from stripe synchronization errors are described further below with respect to FIG. 28B.

FIG. 28B is a diagram that illustrates a switch 2800B having slots 2852, 2854 coupled through five cross points (sXPNTs) 2856A-E to a slot 2858 according to the present invention. Slot 2858 includes a set of sync-receive queues of FIFOs 2860. Serial link 2853 couples slot 2852 and cross point 2856A. Serial link 2857 couples cross point 2856A and slot 2858. Slots 2852, 2854 are also referred to as slot 0 and slot 1, respectively, and slot 2858 is also referred to as slot 2. For clarity, only three slots are shown in this example; however, additional slots can be added.

Consider an example where wide cells of data are sent from slots 0 and 1 across stripes 0-4 through respective cross points 2856A-E to slot 2858. One type of error can occur when link 2853 between the slot0 2852 to xpnt0 2856A is broken. In such an event, xpnt0 2856A will detect a broken link which will result in it sending an error signal back to the source slot0 2852. This will cause the slot0 2852 to stop sending traffic and send out a K2 sequence. The xpnt0 2856A can also send an abort cell (AOP) to all the destinations in order to notify them that an error has occurred. In one embodiment, this is done as soon as error is detected.

In other embodiments, there is, momentarily, a situation where xpnt1 2856B through xpnt4 2856E are still sending data from slot0 2852 and slot1 2854 to slot2 2858, while xpnt0 2856A is sending data only from slot1 2854 because link 2853 is broken between slot0 2852 and xpnt0 2856A. This can cause a sync queue in slot2 2858 that corresponds to the stripe0/slot1 link to overflow since it will receive more data from slot1 2854 than the other stripes and an underflow for the queue in slot2 2858 that corresponds to stripe0/slot0 2852 since that link is broken. FIG. 31 shows an example of how such an error condition in an incoming link 2853 is evident in the levels of data present in FIFOs 2862 in slot 2. FIG. 31 shows ten FIFOs 2862 sorted by stripe and source slot. In this example, five stripes 0-4 and two slots 0 and 1 are shown. As shown in FIG. 31, the incoming link error causes a sync queue in slot2 2858 that corresponds to the stripe0/slot1 link to overflow since it will receive more data from slot1 2854 than the other stripes and an underflow for the queue in slot2 2858 that corresponds to stripe0/slot0 2852 since link 2853 is broken.

Administrative module 676 can detect this type of stripe synchronization error condition as follows. Level monitor 2806 monitors the levels of each of the FIFOs 2862. Stripe synchronization error detector 2808 then detects the presence of any overflow and/or underflow condition in the levels of the sorted FIFOs. In this example of an incoming link error, stripe synchronization error detector 2808 would detect the occurrence of the underflow condition in the FIFO for stripe0/slot0 and the overflow condition in the FIFO for stripe0/slot1. Stripe synchronization error detector 2808 sends a signal to flow controller 2812. Flow controller 2812 then initiates an appropriate recovery routine to re-synchronize data flow across the stripes in the switching fabric. Among other things, such a recovery routine can involve sending control characters (such as a special K2 characters) from slot0 across the stripes in the switching fabric. Control character (K2) presence tracker 2810 monitors special K2 characters received in the data flow at a BIA.

In the embodiment described above, when the slot 2852 is able to, it sends out a K2 sequence that will allow the queues to sync up. The sync is done at the first K0 character that comes from slot0 2852 with SOP, in other words, sync to 1st new packet after K2. Since the sync queue corresponding to slot 1/stripe0 in slot2 2858 can overflow, there will be a flow control event sent from slot2 2858 to xpnt0 2856A to stop sending data from slot1 2854 thus allowing the traffic from slot1 2854 not to be effected as a result of the slot0 2852 link failure and maintain synchronization for data from slot1 2854.

In another example, where the XPNT0 2856A goes down and is no longer operational. In such a case, the switch shown in FIG. 28B breaks down. The overall system can still function in the presence of a redundant switch fabric and the redundant fabric transceiver (RFT) of the present invention, as described below. In such a case, the RFT can detect the link failure and follows the steps outlined in the below to switch over to the fabric of an alternative switch.

Still another example is when the link 2857 between xpnt0 2856A to slot2 2858 is broken. In such a case, the BIA at slot2 detects the break. In one embodiment, a RFT of the BIA detects the break, as described below with respect to embodiments of the present invention. Flow controller 2812 of the BIA sends a flow control event/signal back to the xpnt0 2856A which will get propagated back to slot0 2852, slot1 2854, and any slots present in the system. This can cause the source slots to stop sending traffic to slot2 2858. These slots can still send traffic to other destination slots, similar to slot2 2858. In the meantime, the BIA will abort any partial packets that it has received and wait for the K2 sequence to recover the link. As described herein, it will sync to the first SOP following a K2. The presence of a first SOP following a K2 can be detected by control character presence tracker 2810.

The functionality of the administrative module 676 is further described with respect to FIG. 29. In FIG. 29, a flow diagram illustrating a routine for maintaining synchronization of striped cell traffic is described.

In step 2902, module 676 sends a common control character in striped cells in all the lanes for a predetermined number of cycles. In one embodiment, a number of the common control characters are sent through the system.

In step 2904, module 676 evaluates the common control characters received in stripe receive synchronization queues. The module 676 evaluates the received common control characters to determine whether the system is re-synchronized.

In step 2906, the module 676 determines the re-synchronization condition. If the system is re-synchronized, then the routine proceeds to step 2910. If not, then the system proceeds to step 2908. In one embodiment, the module 676 determines if the FIFOs are all empty or cleared at the same time. In another embodiment, the module 676 is checks the state bits for each of the FIFOs.

In step 2908, the module 676 generates an error messages or other administrative signal. In one embodiment, the module 676 generates an error message such that the other components of the system begin recovery measures anew.

In step 2910, the module 676 returns to step 2902 and awaits reception of an error condition or other administrative command to begin routine 2900.

Another routine of the module 676 is illustrated in FIG. 30. In FIG. 30, a flow diagram (routine) 3000 shows a routine for detecting out of synchronization traffic flow through a cross point switch in a backplane switching fabric. In one embodiment, the routine 3000 allows the module 676 to determine when routine 2900 is required.

In step 3002, the module 676 monitors the levels of stripe receive synchronization queues. In one embodiment, level monitor 2806 performs this function within the module 676.

In step 3004, the module 676 determines whether an out of synchronization queue threshold, such as, an overflow and/or underflow condition, is detected. In one embodiment, stripe synchronization error detector 2808 performs this function within the module 676. If so, then the process proceeds to step 3006. If not, then the process proceeds to step 3002. In one embodiment, the module 676 transmits a no error message or signal that can be received by other systems and logged for future reference.

In step 3006, the module 676 generates an out of synchronization message or other administrative signal that alerts the other components of the present invention that synchronization has been lost. In one embodiment, flow controller 2812 sends a signal back to the transmitting SXPNT which is further sent back to the RFT, which can then instantiate the K2 sequence of the present invention, as described elsewhere herein.

In step 3008, the module 676 initiates a re-synchronization routine for striped cell traffic across all lanes. In one embodiment, the module 676 initiates the routine of FIG. 29.

Administrative module 676, and any of a level monitor 2806, a stripe synchronization error detector 2808, a control character (K2) presence tracker 2810, and a flow controller 2812, can be implemented in software, firmware, hardware or any combination thereof. Further, the functionality carried out in administrative module 676, and each of level monitor 2806, stripe synchronization error detector 2808, control character (K2) presence tracker 2810, and flow controller 2812, is described for convenience with respect to modules or blocks; however, the boundaries of such modules and distribution of functionality there between is illustrative and not intended to limit the present invention. Indeed, the functionality of administrative module 676, and each of level monitor 2806, stripe synchronization error detector 2808, control character (K2) presence tracker 2810, and flow controller 2812, can be combined into one module or distributed across any combination of modules.

(2) Redundant Fabric Transceivers

Additional detailed embodiments of the present invention are described immediately herein with respect to the implementation of one or more redundant fabric transceivers (RFTs) that implement the features of module 676.

According to embodiments of the present invention, RFT ASICs are a bridge between one SBIA ASIC and two switching fabric modules (SFMs) in order to provide switching redundancy in the switching system described herein.

FIGS. 32A-B show the basic connections of a switch fabric. In FIG. 32A, a diagram 3200A shows a non-redundant switching system. The blade A 3202 communicates with blade B 3206 through switch A 3204. Both blades A and B handle ingress and egress traffic. In FIG. 32B, a diagram 3200B shows a redundant switching system. The blade A 3202 communicates with blade B 3206 through two switches, A & B, 3204 and 3205 respectively. Multiplexer (MUX) 3208 selects between the two signals from switches 3204 and 3205.

In the redundant switching case of FIG. 32B, the fabric active 3210 provides a signal to all the slave modules (ingress and egress). In one embodiment, point-to-point serial links are used on the backplane. This redundant approach uses twice the serial links as a non-redundant approach. Thus, the ingress module 3202 sends incoming traffic to the active SFM and sends idle traffic patterns to the standby SFM. In an embodiment, the active SFM would be switch 3204 and the standby SFM would be switch 3205. The egress blade 3206 would receive two data paths of traffic from these SFMs. The egress blade 3206 would be able to select the active signals as instructed by the fabric active 3210.

Thus, the RFT of the present invention provides redundant switching and is capable of performing the following tasks: i) operations as a multiplexer and de-multiplexer; ii) sorting of traffic based on encoded source/destination slot information in order to handle flow control; iii) flow control generation; iv) SERDES; and v) error handling. As such, the RFT is an implementation of the present invention that performs the previously detailed features described herein with regard to the module 676.

FIG. 33A shows a detailed diagram 3300A showing one embodiment where the RFT is implemented in a redundant system. As shown, switching blade (SFM-A) 3302 and switching blade (SFM-B) 3304 are coupled to backplane 3306, which is in turn coupled to Ingress/Egress Blade (Slave Module) 3308. Each of blades 3302 and 3304 include SXP-NTs for transmitting and receiving data through data paths. As shown in FIG. 33A, blade 3302 includes SXPNTs 3310A-E, and blade 3304 includes SXPNTs 3312A-E. Each of the groups of SXPNTs 3310A-E and 3312A-E are coupled, respectively, to data paths 3311A-E and 3313A-E through the backplane connection 3306 to one or more RFTs 3316A-E within the blade 3308.

Within the blade 3308, in one embodiment, there is one RFT for each stripe received. The RFTs 3316A-E forward the received data to a SBIA 3320. In an alternative embodiment, one RFT provides a bridge for the XAUI links (e.g., 15 links, 10 links from the two switching blades, and 5 links the SBIA). Such an implementation would likely require several dozen SERDES, since one reliable embodiment calls for four SERDES for each XAUI link). Furthermore, using a single RFT may introduce vulnerability to the system as the one RFT would handle all traffic. Therefore, the illustrated embodiment of five RFT modules provides a logical division of the processing workload.

FIG. 33B shows a diagram 3300B of a RFT, according to one embodiment of the present invention. In FIG. 33B, RFT 3300B is shown implemented as RFT 3316A would be implemented, with respect to stripe0 traffic from SXPNTs 3310A and 3312A. As described elsewhere herein, the SERDES 3350 and 3352 provide the data interface and route traffic to SYNCHQ FIFOs 3354 and 3356, respectively, as shown in FIG. 33B.

In one embodiment, the received serial data is converted to parallel data by the SERDES, as described elsewhere herein. Along with the data, a clock can be recovered from the incoming data stream. Thus, each SERDES will generate a clock recovered from the data. In one embodiment, the FIFOs 3354 and 3356 provide clock compensation for transmit and receiving data by adding and/or removing idle characters to/from the FIFO data stream. Both FIFOs 3354 and 3356 feed into MUX 3358. MUX 3358 combines the incoming traffic and splits the outgoing traffic and provides both data/control signals and flow control signals for redundant stripes.

In one embodiment, all traffic is routed into a symmetric architecture for uplink/downlink logic. This architecture is shown in FIG. 33B by components 3360, 3362, and 3364, and also by 3366, 3368, and 3370. Both BIA_RX 3370 and BP_RX 3360 receive de-serialized and synchronized packet data from FIFOs. SYNCQ FIFO 3372 performs the same functions as FIFOs 3354 and 3356 described above, but with respect to SERDES 3374. BIA_RX 3370 sorts the data into seven logic data queues in the UPLINK_RAM 3368 based on the encoded destination slot number (e.g., the seven queues are used to sort packets with different destinations). Similarly, BP_RX sorts data into DOWNLINK_RAM 3362 based on encoded source slot number.

In one embodiment, any latency in the SERDES 3350, 3352, and 3374 is compensated for by throttling the traffic at the seven logic data queues described above.

Both BIA_TX 3364 and BP_TX 3366 modules arbitrate the read operation from the downlink/uplink ram, 3362 and 3368, respectively, and compose data for transmission.

RFT registers 3376 provides access to internal registers that can be managed from module 676. The operations of the modules of RFT 3300B depend on the parameters set in the registers of module 3376. In one embodiment, the module 3376 provides the module 676 with information about the status of the modules of the RFT 3300B.

As described above with respect to FIG. 33A, the backplane provides the connection between switching fabric modules and the slave modules. In one embodiment, this connection can include of the following signals: i) Serial TX and RX pairs; ii) flow control data and sync; iii) control signals, such as, but not limited to cross point error signal, intercept signal, and fabric active signal; and iv) clock distribution.

The packet-encoding scheme is described in detail with respect to sections I and J above, and the striping scheme is illustrated with respect to FIG. 15A. With particular attention to the RFT, the processes of FIGS. 26, 29, and 30 are described with respect to the RFT of the present invention.

In one embodiment, the maximum size of a payload for transfer in the backplane is 160 bytes (148 bytes of data max, 10 bytes of "Start of Cell" (SOC) control information, and 2 bytes reserved. A complete 160-byte transfer, in this embodiment, is referred to as a "cell," as described elsewhere herein cells are not limited by this embodiment. Thus, a cycle is a single 3.2 ns clock pulse (i.e. 312.5 MHZ). The cell transfer can accomplished (as shown in FIG. 15A) in 20 byte "blocks," in 8 consecutive cycles.

The "state" byte can be assigned as shown in the following table:

| Field | Name | Description |
|---|---|---|
| State [3:0] | SlotNumber | Destination slot number for sBIA to sXPNT and Source Slot Number for sXPNT to sBIA. sBIA will send IDLE packets to slot 7 |
| State [5:4] | PayloadState | Encode payload state:<br>00 - RESERVED<br>01 - SOP<br>10 - DATA<br>11 - ABORT |
| State [7] | Reserved | Reserved |

It is noted that the information in this table is similar to the previously described with respect to FIGS. 25A-B above, with respect to MT to BIA. Here is a discussion of BIA to XPNT. In embodiments, there can be reserved three special K characters for the encoding scheme: K0 (SOC); K1 (EOP); and K2 (stripe sync).

K0 indicates "start of cell" that is the first block of a cell across all five stripes.

K1 indicates "end of packet" that can appear in any block of a cell. It is transparent to RFT and SXPNT.

K2 is used to encode the stripe synchronization sequence. Stripe synchronization requires a K2 character to be sent across all lanes and all stripes. In one embodiment, the special character is sent 112 times. After that, all stripes of the sync queues are marked as "in sync." The number 112 is chosen because it matches, in this embodiment, the depth of the sync queues, thus, if there is any data left in the queue after the final K2 character is detected, this can be considered a stripe synchronization error. The present invention is not limited by this embodiment, and the sync queues can be of a different depth.

As one skilled in the relevant art would recognize based on the teachings described herein, the feature for implementing the special characters is to fill/flush the sync queues. In the one embodiment, the SBIA will send out 112 times the pattern shown in FIG. 34A.

In one embodiment, the state field is encoded with the source slot number as well as 1 bit used to tell whether the cell is toward the beginning or end of the sequence. For example, the state field can be encoded with the source slot number as well as 1 bit used to tell whether the cell is within the first 96 (of 112) transfers of the stripe sequence or whether this is the last 16 (of 112) K 2 transfer after which valid data follows.

A routine for K2 sequence synchronization is illustrated in flow chart 3450 in FIG. 34B. In order to synchronize the five stripes in the SBIA, the K2 sequence needs to arrive in the consecutive cycles. To guarantee this, the following routine is initiated.

In step 3452, the source SBIA checks the RFT/SXPNT for a ready state.

In step 3454, the RFT/SXPNT returns its state. If it is ready, then the routine proceeds to step 3456. If it is not ready, then the routine returns to prior to step 3452. In one embodiment, the source SBIA can re-check after a predetermined period of time.

In step 3456, the source SBIA sends Idle characters to the RFT/SXPNT. In one embodiment, the source SBIA sends enough idle characters to give the destination SBIA enough time to drain any remaining data from its buffers. In an embodiment, the source SBIA sends 768×2 words of idle characters.

In step 3458, the source SBIA sends special characters (K2) to the RFT/SXPNT. In one embodiment, the FIFOs in the RFT/SXPNT for the source slot should be empty by the time the K2s are sent. When it receives the K2 sequence, if the FIFO is not empty, then it will treat the sequence as an error in the SBIA received data. Once the RFT receives the data successfully, it checks to see if the SXPNT is ready to receive the data before sending the K2 sequence. In one embodiment, once the K2 sequence is sent from the RFT to the SXPNT, it won't stop until the whole sequence is sent. In one embodiment, 112 words of K2 characters are sent.

Steps 3460, 3462, and 3464 illustrate the above-mentioned contingency.

In step 3466, the source SBIA sends more idle characters to the RFT/SXPNT in order to clear any remaining K2 characters from the buffers. In one embodiment, the source SBIA sends 512×2 words of idle characters.

In one embodiment, the routine 3450 is executed by the module 676 periodically in order to clear the FIFOs and re-synchronize the systems of the present invention.

The discussion of FIG. 34B highlights the importance of the clock for the SXPNT and SBIA, because it should maintain stringent jitter and rising time requirements to properly execute the routine 3450. Additionally, the striped nature of the RFTs and SXPNTs requires that synchronization be maintained at all times. Therefore, the routines described herein, and the various embodiments thereof for error detection and recovery are particularly important.

In embodiments of the present invention, both synchronous and asynchronous systems can be implemented. In a synchronous system, all the blades including fabric use the same clock source. The clock source can sit on the fabric and be distributed to the slave modules across the backplane so that the backplane will serve as a purely passive component.

In one embodiment of the redundant switch fabric system, two system clocks can be fed into one slave module from two switch fabric modules. The circuitry on the slave module would serve as the master clock. If the master clock fails in a fail-over event, then the other clock will become the master clock and the switching should be transparent for the components on the slave module.

In an asynchronous system, the system de-couples the clock domain between blades, which means every blade now has its own clock source. The motivation to design an asynchronous system is to eliminate the stringent jitter requirement imposed by a MUX delivered clock signal. However, it creates a new problem with respect to re-synchronization of the interface signals on both ends (at the slave modules).

For the SERDES signals, as previously described above, there is some built-in capability to do RX clock compensation when TX and RX are using different clock sources. However, enabling the RX compensation can increase the latency inside the SERDES.

In terms of the flow control signals mentioned above, the system implements control logic on the fabric to decode a time-division multiplexed (TDM) signal to parallel signal to eliminate the need of a central ready synchronization signal. A detailed embodiment is described below.

For a synchronous flow control implementation, the flow control information that passes between the SXPNT and RFT is TDM and requires a common sync signal to define the start of the time slot. A central synchronization signal that tracks the clock distribution increases the robustness of the system.

FIG. 35 illustrates a block diagram 3500 of a synchronous flow control embodiment that includes RFTs. Blade module 3502 includes five SXPNTs 3508A-E. Flow controller module 3506 generates various signals as described herein. In one embodiment, the module 3506 provides a clock signal to the components of the system. Blade module 3504 receives signals across the backplane connection to the RFTs 3510A-E. The RFTs send and receive signals to/from the SBIA 3512. The flow controller module 3504 is connected across the backplane to each of the RFTs 3510A-E and the SBIA 3512.

In one embodiment, there are two sets of flow control signals across back plane. In other embodiments, more than two signals used for flow control. In the former embodiment, the following ready signals can be implemented:

a) Receive Ready: each SBIA 3512 has a dedicated 1-bit ready signal for each RFT 3510A-E to stop a particular stripe from sending packets from each of the specific slots. Each RFT 3510A-E also sends a dedicated 1-bit ready signal to control the receiving of packets from the specific source SXPNT 3508A-E based on the available space in the internal receive FIFO (e.g., downlink ram); and b) Transmit Ready: each SXPNT has a dedicated 2-bit ready signal for each RFT 3510A-E to notify the congestion situation at destination slots. Every SBIA 3512 also receives 2-bit ready signal from each RFT 3510A-E to stop the traffic for the destination slots.

In one embodiment, a common synchronization signal is used to synchronize all of the transmit and receive ready signals between RFT/SXPNT and RFT/SBIA. For example, and not by way of limitation, the transmit ready signal uses 2-bit to encode 7 states in four slots (8 cycles) and receive ready uses only one bit to encode 7 states in 7 slots (14 cycles). The common synchronization can be a synchronization pulse at every 56 cycles that is the minimum common multiple of 8 and 14. Of course, the present invention is not limited to these cycle counts, as one skilled in the relevant art(s) would recognize that different durations can be implemented.

In one embodiment, the time slot for each state can be set at 78.125 MHz if that frequency is half of the core frequency, i.e., if the core frequency is at 156.25 MHz. The motivation to use a two-cycle approach for the time slot unit is that it gives a 2 cycle margin to the wire/cell delay between SBIA and SXPNT ready registers.

FIG. 36 shows a time flow diagram of how an SBIA can interpret the ready signal from the SXPNT. The sync pulse is used to reset the internal counter in both SBIA and SXPNT. When the counter has the value of 55 or 0, as indicated for example purposes in FIG. 36, the SXPNT will send out the ready state corresponding to slots 1 and 0 internally. When counter is equal to 1 or 2, the SXPNT will encode the slot 2 and 3 ready signals and so on. The pattern repeats itself every 8 cycles. In other words, every slot is encoded 7 times between two sync pulses In a detailed embodiment, three cycles later the ready state shows across the backplane. Then the SBIA adds another two cycles of latency to the ready signal. Thus the ready signal is latched inside the SBIA when the count is equal to 5. This will ensure that the path is a true multi-cycle path from SXPNT to SBIA.

When the RFT is placed between the SBIA and the SXPNT, the flow control operation remains the same. However, the latency of SBIA/RFT and SXPNT/RFT is programmable to leave additional margins in the hardware trace. Thus, in embodiments of the present invention, offset can be introduced to predetermine the latency levels of the system and thus better predict the operating parameters of the system.

Similar to FIG. 35, FIG. 37 illustrates the switching system of the present invention with asynchronous flow control. System 3700 includes blade module 3702 with SXPNTs 3708A-E and blade module 3704 with RFTs 3714A-E. In one embodiment, as in FIG. 35, flow controller modules 3706 and 3707 are able to provide clock signals to the components of the system.

The flow control between SXPNTs 3708A-E and RFTs 3714A-E can be changed to asynchronous via control logic modules 3710 in blade 3702 and module 3712 in blade 3704. In one embodiment, the control logic module 3710 sits on the fabric and interfaces with the SXPNTs 3708A-E for the synchronous flow control interface. The control logic module 3710 can receive, interpret, and transmit various signals. In one embodiment, the module 3710 performs the following operations:

a) Decode a 2-bit transmit ready signal into 7-bit ready signal from each SXPNT 3708A-E and combine them to generate a 7-bit transmit slot ready signal to each RFT 3714A-E.

By "combine" is meant that if any SXPNT is not ready for a specific slot, no RFT is allowed to send packets for that slot. This is different than the synchronous system that has independent flow control between stripes; and b) Receive the 7-bit receive slot ready from the RFT that is also a combined ready signal from the 5 stripes and encoded to a 1-bit receive ready signal for the 5 SXPNT.

With respect to the RFT embodiments described herein, the error conditions that might occur with serial links and in the backplane, as well as preventive and recovery measures are described. Additionally, embodiments for fail-over procedures to change from one switch blade to another are described.

The RFT module of the present invention can be on the receiving end of the errors described above. The type of errors that can be detected by the RFT chips includes:

a) Link error: This can be the result of a bit error or byte alignment error. In one embodiment, the SERDES should send an "/E" special character (error notification character) on the parallel data path to indicate the link error.

b) Lane synchronization error: This is a result of a synchronization FIFO overflow/underflow. In one embodiment, the SERDES should send a "GLINK" signal to indicate the receiving lane sync error.

c) Format error: This is a result of incorrect formatted cell. In one embodiment, a "/K0" special character that appears in lanes other than lane 0 would indicate the format error.

d) XPNT error. This is a wire or signal from the five SXPNT chips. In one embodiment, it indicates that SXPNT has an error or problems with receiving data.

The RFT error-handling routines are consistent with the routines previously described (e.g., the routines of FIGS. 29, 30, and 34B).

In one embodiment, from SBIA to RFT: the RFT detects an error in the received data from the SBIA. The errors can include link error, lane synchronization error and format error. Once the error is detected, the following procedure (steps 1-4) can be applied to recover from the error.

1) Send an RFT error signal to the SBIA. The SBIA will stop sending data at a cell boundary and repeat lane sync sequence until RFT error is de-asserted by the RFT. In one embodiment, once de-asserted, stripe synchronization sequence will be sent out for all slots (e.g., as described with respect to FIG. 34B).

2) Send AOP to all slots and flush uplink RAM. When there is error detected in received data, the encoded destination slot may be malfunctioning. Thus, the abort is sent to all the destination slots to discard the packets sent earlier.

3) Wait for buffers to clear, and thus, the error to be clear.

4) Wait for Stripe Sync Sequence and SOP to start accepting data.

In one embodiment, from SXPNT to RFT: The RFT detects the error in the received data from one of the SXPNTs to which is it connected. The errors can include link error, lane synchronization error and format error. Once one or more errors is detected, the following procedure can be applied to recover from the error(s).

1) Stop the SXPNT from receiving any more data at this slot.

2) Send AOP to the SBIA for all slots and flush the downlink RAM.

3) Wait for buffer to clear, and thus, the error to be clear.

4) Wait for Stripe Sync sequence and SOP to start accepting data.

In embodiments of the present invention, the RFT error signal notifies the SBIA that its RFT is under error condition so that the SBIA will stop packet transmission to RFT. This signal includes the following error notifications:

a) Cross point error: This is the wired or result from 5 SXPNT on the active switching module.

b) Fabric Active Error: The error occurs when "Fabric Active" signals are either active or inactive at both sides at the same time.

c) The link error, lane sync error or format error detected in received data from SBIA.

In the event that an error is detected in or considered to be switching module related, the module 676 has the capability to disable the current switching module and enable the standby switching module to keep the system's processes active.

In one embodiment, when the RFT detects an error in the received data from the SXPNT, it can generate an interrupt signal to disrupt the flow control monitored within module 676. The module 676 then reads the status registers in the SXPNT and the RFT to determine what kind of error occurred and which routine to instantiate to correct for it.

The errors that can generate the interrupt signal can be predetermined by programming an interrupt mask register within the RFT. These errors can include, but are not limited to: a) Core to SERDES sync FIFO overflow; b) SERDES to Core sync FIFO overflow; c) link is down; e) Code error, and/or format error; and f) XPNT error. Additional errors can be monitored and predetermined as one skilled in the relevant art(s) would recognize based on at least the teaching described herein.

The module 676 collects the interrupt signals from all slave modules and, in one embodiment, the module 676 also collects another 2-bit "Fabric Present" signal to start its fail-over decision procedure. The "Fabric Present" signal can indicate that the corresponding switching module is in place. For example, if a user unplugs one switching module, then the corresponding "Fabric Present" will get de-asserted.

The module 676 uses the 2-bit "Fabric Active" to tell all slave modules which switch module to direct the traffic. In one embodiment, to initiate the fail-over procedure, the module 676 first resets the standby switch module and inverts the 2-bit signal.

In the redundant switching embodiments, the network switch has one active/working switching blade and one idle/standby switching blade. According to these embodiments, the RFT can send packets to the active blade and can send idle characters to the idle blade. When the module 676 detects the failure of the working switching blade or the working switching blade is unplugged, the RFT will be notified the fail-over situation by the system using 2-bit "Fabric Active" signal. When the fail-over occurs, the new switching blade is assumed to be in the initial state after reset. The module 676 checks the status of the new switching blade before it issues a fail-over command.

The RFT always sends the lane sync sequence to the standby switching blade to maintain a healthy link. Thus, when fail-over occurs, no time is needed to activate the standby switching blade.

When fail-over occurs, the fail-over procedure can be performed to make sure the safe transition to another switching blade. The following are two example routines detailing specific embodiments of the routines described herein.

In one embodiment, the SBIA to RFT: RFT detects the fail-over by monitoring "Fabric Active" signals:

1) Send RFT error signal to SBIA. SBIA will stop sending data at cell boundary and repeat lane sync sequence until RFT error signal is de-asserted. Once de-asserted, stripe sync sequence will be sent out for all slots.

2) Flush uplink RAM.

3) Wait for buffer to clear, and thus, the error to clear.

4) Wait for Stripe Sync sequence and SOP to start accepting data.

In one embodiment, the SXPNT to RFT: RFT detects fail-over by monitoring "Fabric Active" signals:

1) Send AOP to SBIA for all slots and flush downlink RAM. When SBIA receives AOP, it will discard received data before the stripes sync.

2) Wait for buffer to clear, and thus, the error to clear.

3) Wait for Stripe Sync sequence and SOP to start accepting data.

According to a feature of the present invention, a hitless switch-over of the blades of the system is possible. The word "hitless" means there in no packet loss due to fabric change. Under normal conditions, a user might still want to change the fabric for a better or more robust performance. In this case, the user would want to avoid any unnecessary packet drops. Additionally, another reason to use the upgrade procedure is to do fabric testing. At least two procedures can be used to perform the switch-over: debug and production.

In one embodiment, a first procedure allows the module 676 to control the switch-over event through register programming:

1) First, the module 676 sets '1' to "Fabric enable mode" and "Hitless enable mode" bit in Configuration register. This will allow the module 676 to enable new fabric and hitless mode through register programming.

2) The module 676 sets "Hitless Enable" bit in RFT "Configuration" register. This will put the RFT in the mode for no loss switch-over.

3) Then the module 676 disables the BIA receiver by setting bits in, for example, the RFT register accordingly. This will throttle the SBIA and prevent it from sending more cells to the RFT.

4) After a certain amount of time (long enough to drain all the packets in SXPNT and RFT buffers, the module 676 can determine the duration, as described previously herein.), the module 676 selects the new fabric by setting "Fabric Active" bits in RFT register.

5) The module 676 then clears the bits so that the SBIA can continue (be set to enabled) sending new cells to the RFT. The RFT will forward the cells to new fabric without dropping any data.

6) The module 676 clears "Hitless Enable" bit to put the RFT in fail-over mode.

In another embodiment, the following routine is used as second procedure. In one embodiment, the switch-over timer to drain packets in the RFT/SXPNT buffers is located in the RFT and the SBIA traffic throttling is done automatically, as described above. In this embodiment, the module 676 does not need to intervene:

1) First, in one hardware embodiment of the present invention, a command input pin can be driven "high" to enable the hitless switch-over. It is also noted that, in one software embodiment, a "Hitless enable mode" bit and/or "switch delay enable" bit in Configuration register can also set to enable the hitless switch-over.

2) Prior to any throttling, the module 676 can determine the value of "Switch Delay Counter" register. This is used to program the switch-over timer when "Fabric Active" signals toggled.

3) The "Fabric Active" input pin is toggled in all the RFTs, each RFT throttles the SBIA traffic and continues sending packets to the old switching fabric until the switch-over timer expires.

4) After the timer expires, both RFT and SXPNT should have sent all the packets in the internal buffers. RFT will activate new fabric and start sending/receiving packets to/from new switching fabric.

5) In the above embodiment, the command input pin is driven "low" to disable hitless switch-over.

It is noted that in both fail-over and switch-over cases, the module 676 is suggested to reset the new fabric first before the change. Because the SXPNT will generate the AOP for all slots after the reset (because the links go down), the module 676 can allow enough time before it changes the switch fabric.

U. Reset and Recovery Procedures

The following reset procedure will be followed to get the SERDES in sync. An external reset will be asserted to the SERDES core when a reset is applied to the core. The duration of the reset pulse for the SERDES need not be longer than 10 cycles. After reset pulse, the transmitter and the receiver of the SERDES will sync up to each other through defined procedure. It is assumed that the SERDES will be in sync once the core comes out of reset. For this reason, the reset pulse for the core must be considerably greater than the reset pulse for the SERDES core.

The core will rely on software interaction to get the core in sync. Once the BIA 302, 600, IBT 304, and XPNT 202 come out of reset, they will continuously send lane synchronization sequence. The receiver will set a software visible bit stating that its lane is in sync. Once software determines that the lanes are in sync, it will try to get the stripes in sync. This is done through software which will enable continuously sending of stripe synchronization sequence. Once again, the receiving side of the BIA 302 will set a bit stating that it is in sync with a particular source slot. Once software determines this, it will enable transmit for the BIA 302, XPNT 202 and IBT 304.

The management software residing on management blade is in charge of the system maintenance work. According to embodiments of the present invention, module 676 provides instantiation and access for the management software. In an additional embodiment, the management blade includes a dedicated reset signal for each slave module and switching module.

In one embodiment, the following reset procedure can be performed at system reboot:

1) An external reset will be asserted to the SERDES core when a reset is applied to the core. The duration of the reset pulse for the SERDES needs to be longer than 32 cycles (for 156 MHz clock).

2) After reset pulse, the transmitter and the receiver of the SERDES will sync up to each other through defined procedure. It can be assumed that the SERDES will be in sync once the core comes out of reset. For this reason, the reset pulse for the core must be considerably greater than the reset pulse for the SERDES core.

3) The core will rely on the module 676 for interaction to get the core in sync. Once the BIA, IBT, and XPNT come out of reset, they will continuously send lane synchronization sequence.

4) SERDES makes the lane synchronization status visible to the module 676.

5) Once the module 676 determines that the lanes are in sync, it will try to get the stripes in sync. This is done through software that will enable continuously sending of stripe synchronization sequence.

6) Once again, the receiving side of the BIA will set a bit stating that it is in sync with a particular source slot.

7) Once the module 676 determines this, it will enable transmit for the BIA, XPNT and IBT.

Similar to the SBIA/SXPNT reset procedure, the RFT allows the module 676 to reset each of its three 10 Gbps SERDES individually. When the SERDES gets reset, the link will go down and the received data from SERDES will be corrupted. The error recovery process can be the same as the link error handling described previously.

To reduce the packet loss due to reset, the following procedure will be applied:

a) Stop sending data to the transmitting SERDES at the cell boundary.

b) Send lane sync sequence during SERDES reset.

c) Start sending data (SERDES is out of reset state).

The RFT has three SERDES but, in one embodiment, only two SERDES are forwarding packets with one SERDES in standby mode. If user only installs one switching fabric in the chassis, the redundant SERDES does not have its corresponding SERDES Transceiver. Thus, the link for the redundant SERDES will always be down. If the user does not plan to put the switching fabric in the chassis, the user can power down the redundant SERDES to save energy, cycles, and processing overhead. To do this, the module 676 can access the "Power Control" register within the registers of the RFT.

IV. CONTROL LOGIC

Functionality described above with respect to the operation of switch 100 can be implemented in control logic. Such control logic can be implemented in software, firmware, hardware or any combination thereof.

V. CONCLUSION

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method comprising:
distributing, by a transmitter device, blocks of data across a plurality of stripes, the distributing comprising inserting, between the blocks of data, control information in each stripe at a predetermined data interval, the control information being operable for synchronizing the plurality of stripes at a receiver device; and
transmitting, by the transmitter device, the plurality of stripes in parallel to the receiver device.

2. A transmitter device comprising:
one or more hardware control components configurable to:
distribute blocks of data across a plurality of stripes, the distributing comprising inserting, between the blocks of data, control information in each stripe at a predetermined data interval, the control information being operable for synchronizing the plurality of stripes at a receiver device; and
transmit the plurality of stripes in parallel to the receiver device.

3. The method of claim 2 wherein the blocks of data originate from one or more data streams received at the transmitter device.

4. The method of claim 3 wherein the one or more data streams comprise more than 40 gigabits per second (Gbps) of data traffic.

5. The method of claim 3 wherein the one or more data streams comprise a plurality of data packets.

6. The method of claim 1 wherein each block of data has a fixed size.

7. The method of claim 6 wherein the fixed size is equal to or greater than 32 bits.

8. The method of claim 1 wherein the blocks of data are distributed across the plurality of stripes in a round-robin fashion.

9. The method of claim 1 wherein the predetermined data interval is equal to or greater than 32 bytes on each stripe.

10. The method of claim 1 further comprising:
receiving the plurality of stripes at the receiver device; and
synchronizing, by the receiver device, the plurality of stripes using the control information in each stripe.

11. The method of claim 10 wherein synchronizing the plurality of stripes comprising aligning the plurality of stripes to eliminate skew between the stripes.

12. The method of claim 11 wherein aligning the plurality of stripes comprises storing the blocks of data in each stripe in one or more synchronization queues.

13. The method of claim 10 further comprising assembling one or more data streams based on the synchronized plurality of stripes.

14. The method of claim 13 wherein assembling the one or more data streams comprises arbitrating an order in which blocks of data from the synchronized plurality of stripes are combined.

15. The transmitter device of claim 2 wherein the transmitter device is a network device.

16. The transmitter device of claim 2 wherein the transmitter device is a component of a network device configured to interconnect a link layer device of the network device with a physical transport medium.

17. A method comprising:
receiving, by a network device, a plurality of stripes, each stripe including blocks of data and control information interspersed between the blocks of data at a predetermined data interval; and
synchronizing, by the network device, the plurality of stripes using the control information in each stripe.

18. The method of claim 17 wherein synchronizing the plurality of stripes comprising aligning the plurality of stripes to eliminate skew between the stripes.

19. The method of claim 17 further comprising assembling one or more data streams based on the synchronized plurality of stripes.

20. The method of claim 19 wherein the one or more data streams comprise more than 40 gigabits per second (Gbps) of data traffic.

21. A receiver device comprising:
one or more hardware control components configurable to:
receive a plurality of stripes, each stripe including blocks of data and control information interspersed between the blocks of data at a predetermined data interval; and
synchronize the plurality of stripes using the control information in each stripe.

22. The receiver device of claim 21 wherein the receiver device is a network device.

23. The receiver device of claim 21 wherein the receiver device is a component of a network device configured to interconnect a physical transport medium with a link layer device of the network device.

* * * * *